United States Patent
Lee

(10) Patent No.: US 11,489,957 B2
(45) Date of Patent: Nov. 1, 2022

(54) ELECTRONIC DEVICE, EXTERNAL ELECTRONIC DEVICE, AND METHOD FOR CONTROLLING EXTERNAL ELECTRONIC DEVICE BY USING ELECTRONIC DEVICE

(71) Applicant: Samsung Electronics Co., Ltd., Gyeonggi-do (KR)

(72) Inventor: Seungyup Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/280,273

(22) PCT Filed: Jul. 25, 2019

(86) PCT No.: PCT/KR2019/009267
§ 371 (c)(1),
(2) Date: Mar. 26, 2021

(87) PCT Pub. No.: WO2020/075960
PCT Pub. Date: Apr. 16, 2020

(65) Prior Publication Data
US 2022/0006894 A1    Jan. 6, 2022

(30) Foreign Application Priority Data
Oct. 10, 2018 (KR) ..................... 10-2018-0120623

(51) Int. Cl.
*H04M 1/72415*  (2021.01)
*H04M 1/72469*  (2021.01)
(Continued)

(52) U.S. Cl.
CPC ...... *H04M 1/72415* (2021.01); *G06F 3/0346* (2013.01); *G06F 3/0484* (2013.01);
(Continued)

(58) Field of Classification Search
CPC .. G06F 3/0488; G06F 3/04883; G06F 3/0484; G08C 2201/30; H04M 1/72415; H04M 1/72412; H04M 1/725
See application file for complete search history.

(56) References Cited

U.S. PATENT DOCUMENTS 9,030,611 B2    5/2015  Bae
9,813,759 B2   11/2017  Klein et al.
(Continued)

FOREIGN PATENT DOCUMENTS

KR         10-0986619 B1       10/2010
KR       10-2013-0129220 A     11/2013
(Continued)

*Primary Examiner* — Gerald Johnson
(74) *Attorney, Agent, or Firm* — Cha & Reiter, LLC

(57) ABSTRACT

In an electronic device and a method for operation of the electronic device according to various embodiments, the electronic device may comprise: a communication module for transmitting/receiving data to or from an external electronic device; a display; a memory in which to store commands to execute on the external electronic device a function mapped onto a user input and state information of the external electronic device; and a processor, wherein the processor is configured to: control the communication module to establish a connection to the external electronic device; receive first state information of the external electronic device from the external electronic device; receive a first user input to a certain area of the display; select a first command corresponding to characteristics of the first user input and the first state information from the commands stored in the memory; and control the external electronic device such that a function corresponding to the first command is executed. Various other embodiments are also possible.

11 Claims, 44 Drawing Sheets

(51) Int. Cl.
*G06F 3/0346* (2013.01)
*G06F 3/0484* (2022.01)
*G06F 3/04883* (2022.01)
*H04M 1/725* (2021.01)

(52) U.S. Cl.
CPC ........ *G06F 3/04883* (2013.01); *H04M 1/725* (2013.01); *H04M 1/72469* (2021.01)

(56) References Cited

U.S. PATENT DOCUMENTS

| | | |
|---|---|---|
| 2012/0154293 A1 | 6/2012 | Hinckley et al. |
| 2012/0319951 A1 | 12/2012 | Lee |
| 2016/0062467 A1 | 3/2016 | Buxton et al. |
| 2016/0104371 A1* | 4/2016 | Selfe ................ G08C 17/02 340/4.32 |
| 2016/0351047 A1 | 12/2016 | Han et al. |
| 2017/0011210 A1* | 1/2017 | Cheong ............. A61B 5/681 |
| 2018/0188944 A1 | 7/2018 | Cho |

FOREIGN PATENT DOCUMENTS

| | | |
|---|---|---|
| KR | 10-2015-0072766 A | 6/2015 |
| KR | 10-2015-0099324 A | 8/2015 |
| KR | 10-2016-0069672 A | 6/2016 |
| KR | 10-2018-0079702 A | 7/2018 |

\* cited by examiner

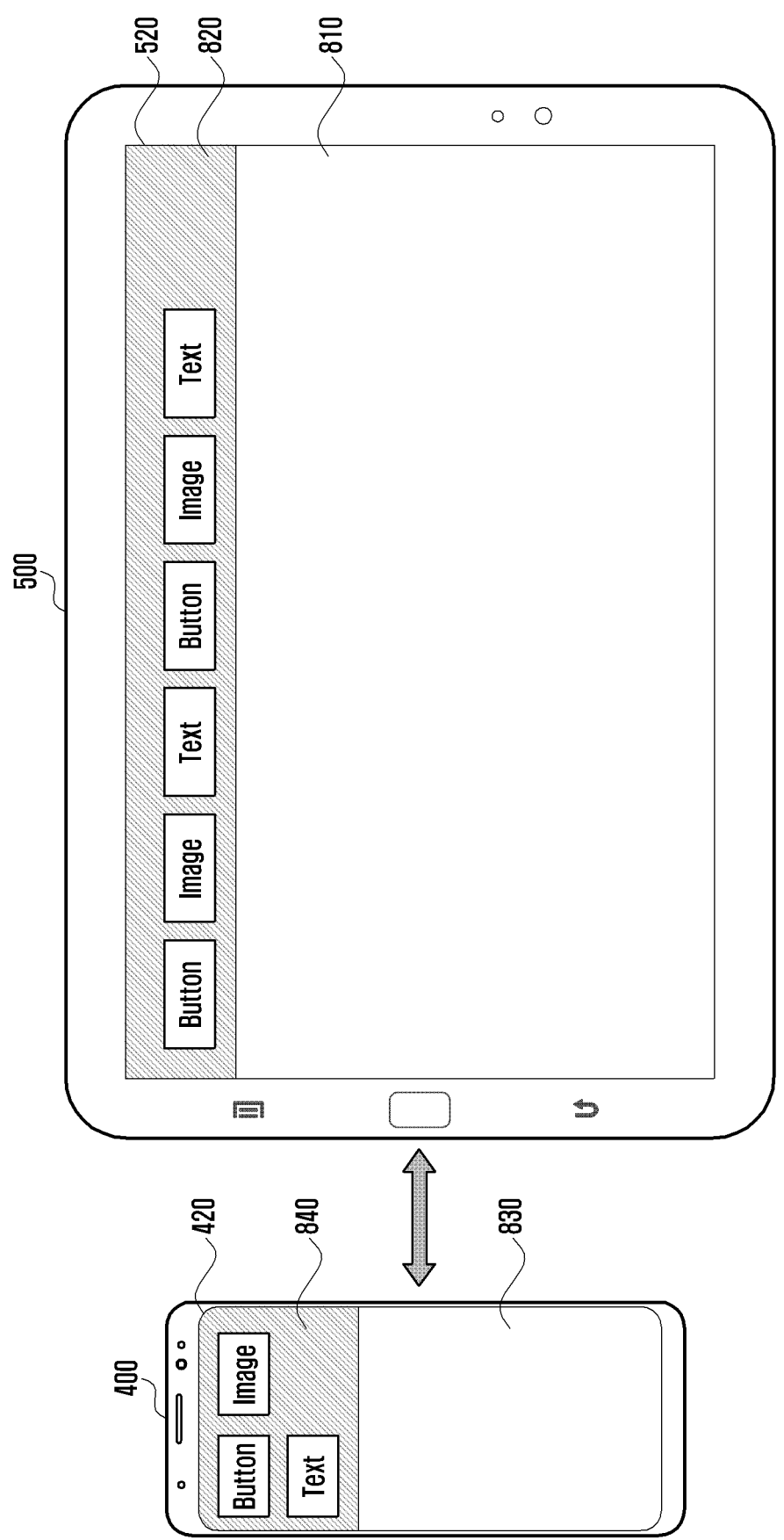

FIG. 15A
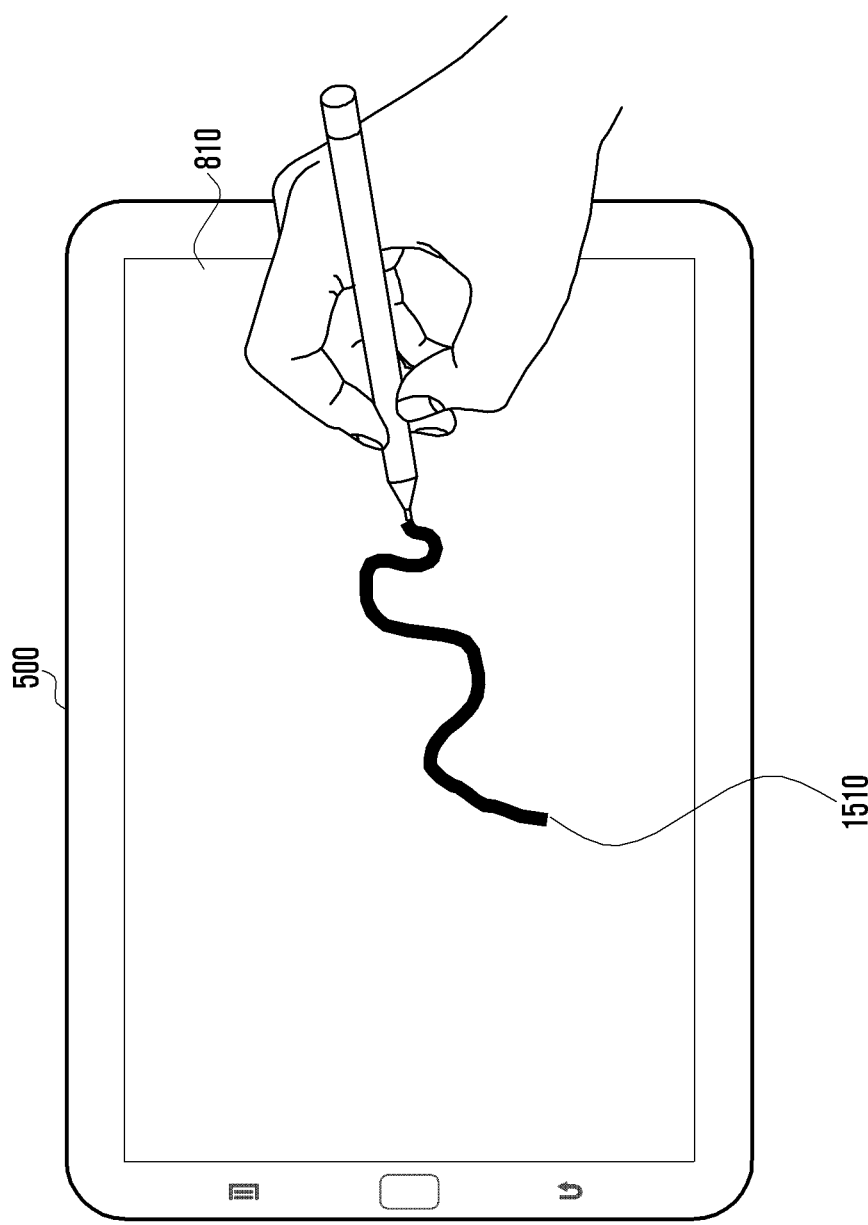
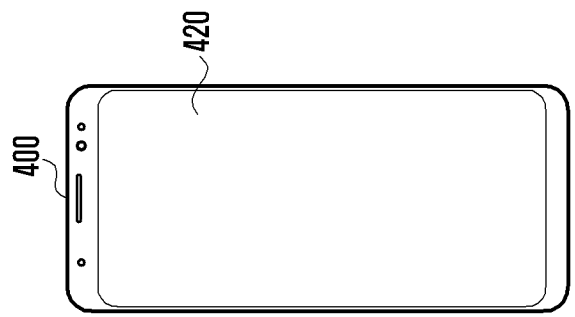

FIG. 15B
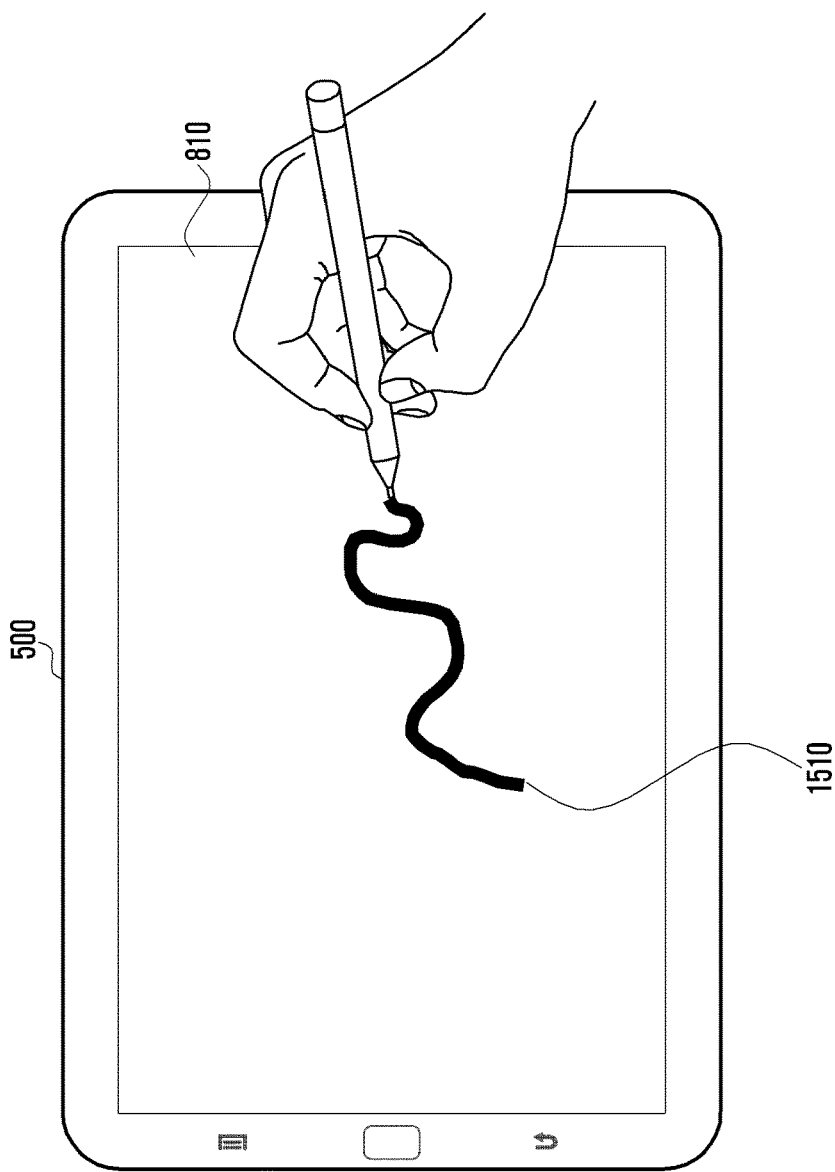
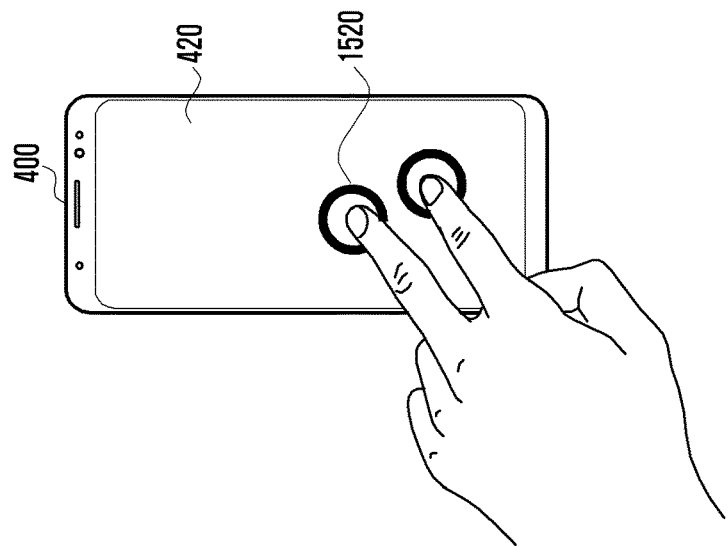

FIG. 15C
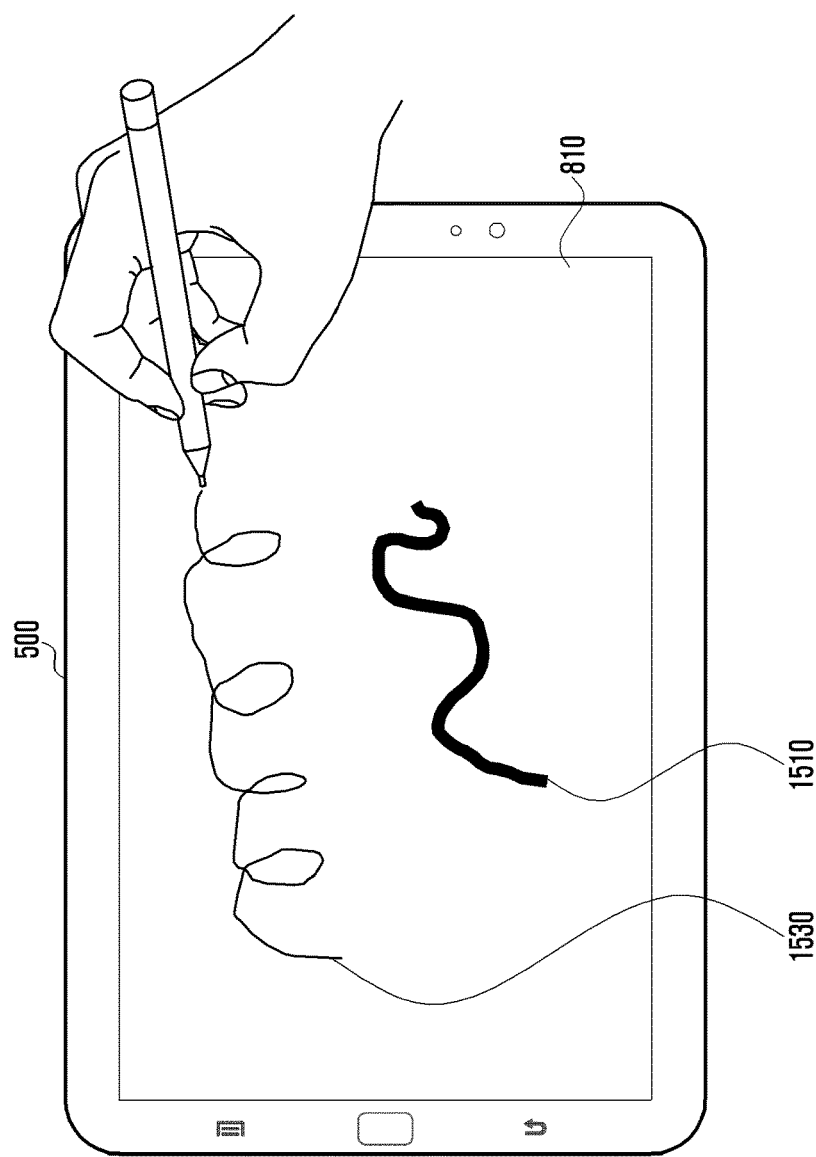
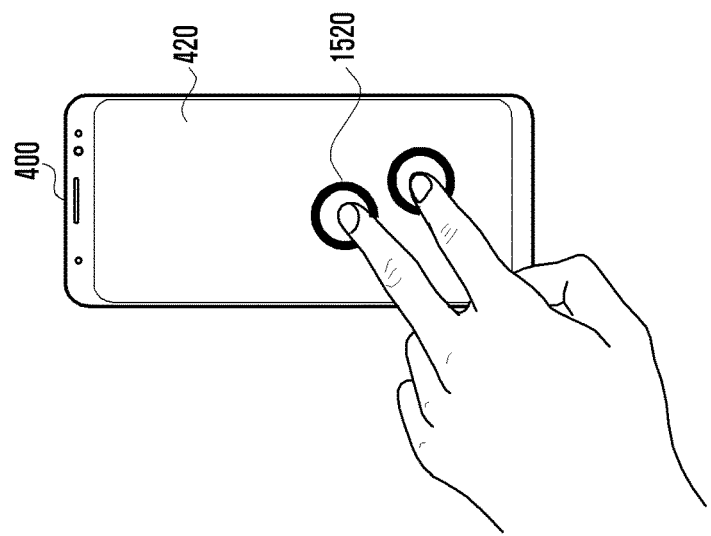

FIG. 15D
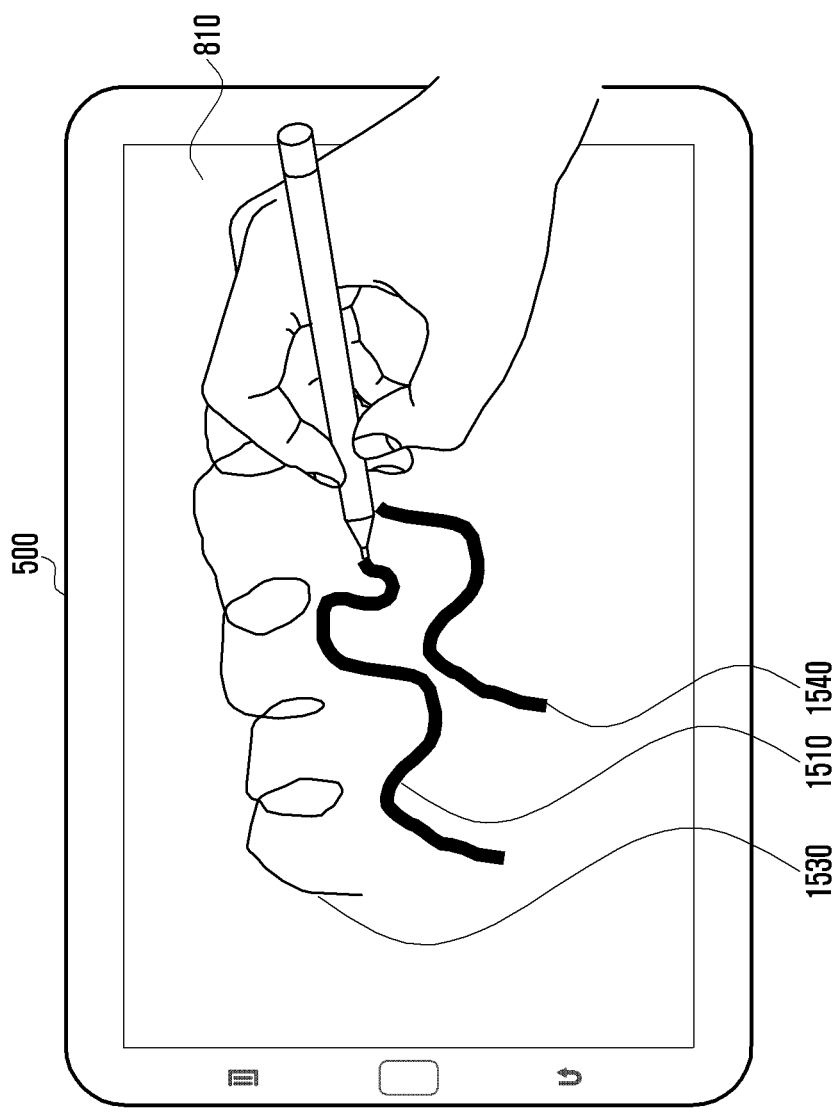
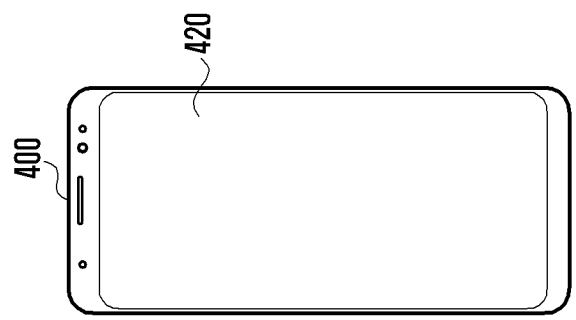

FIG. 16A
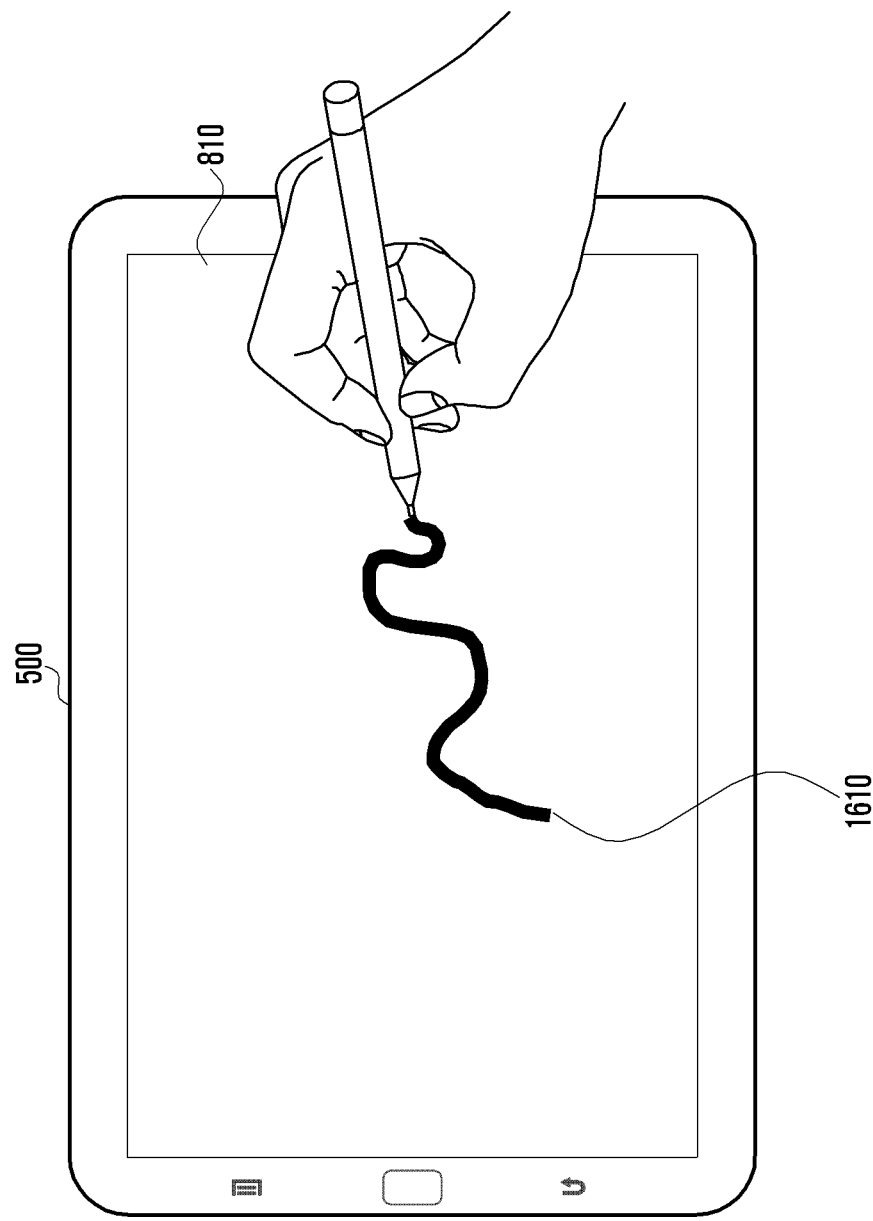
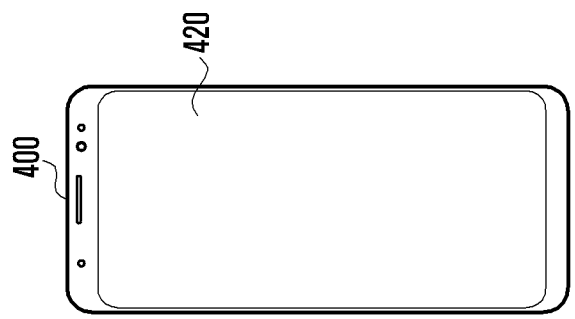

FIG. 16B
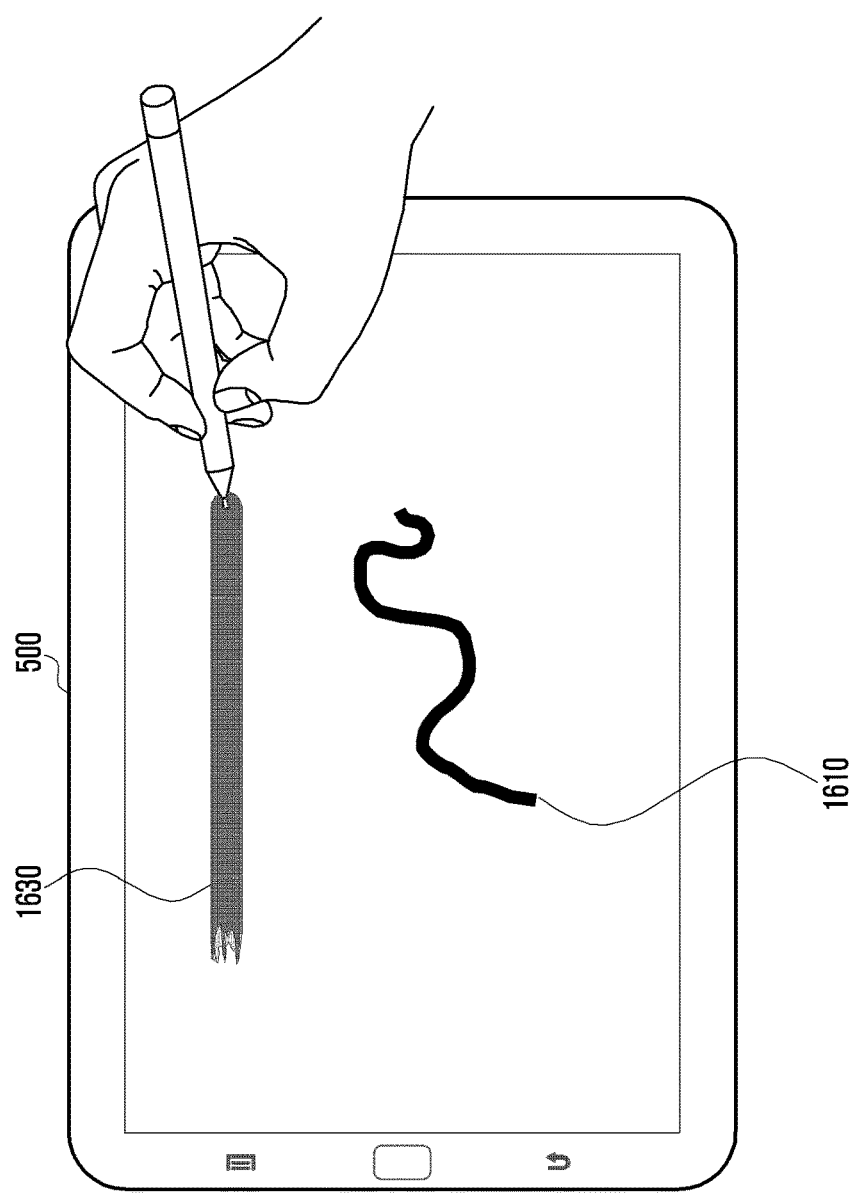
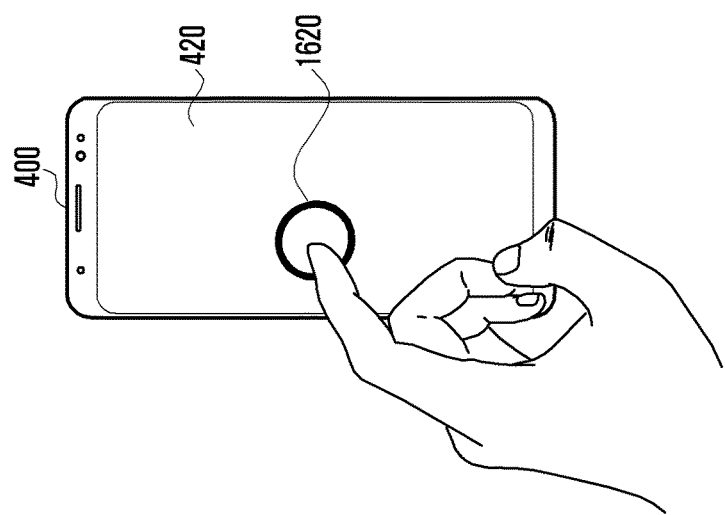

FIG. 16C
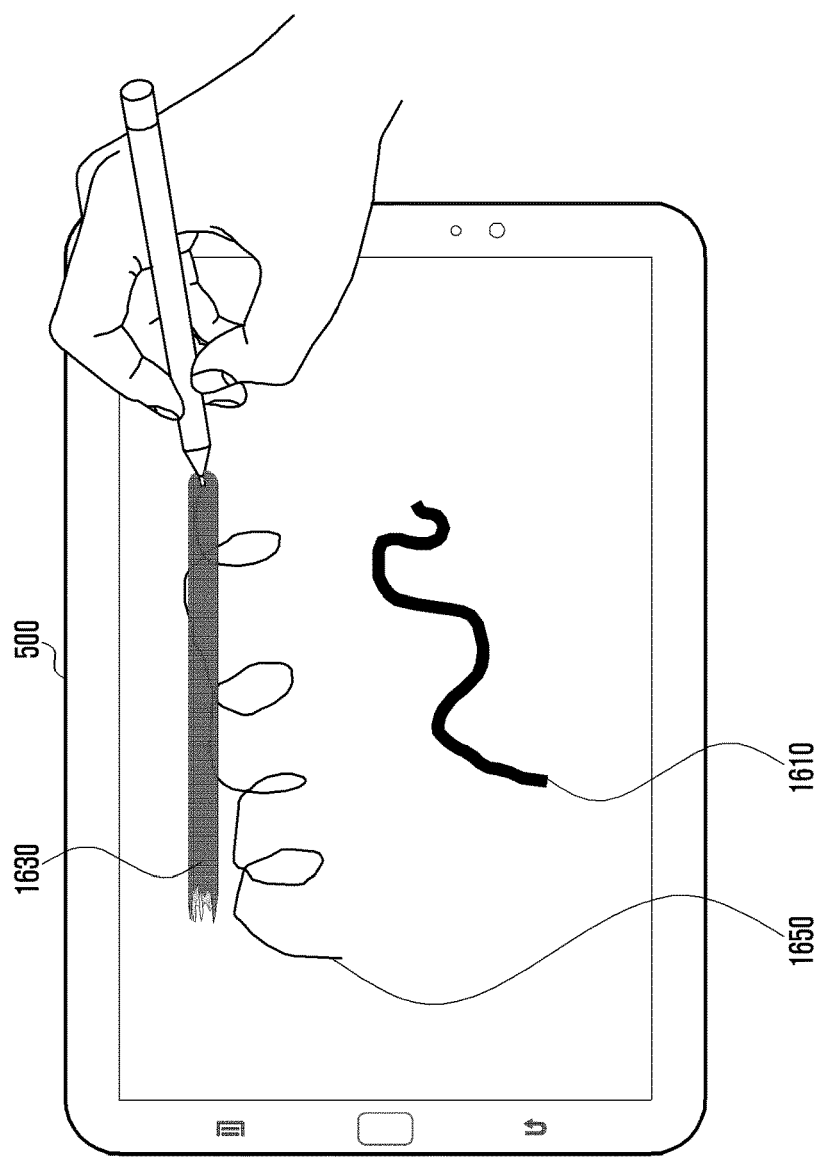
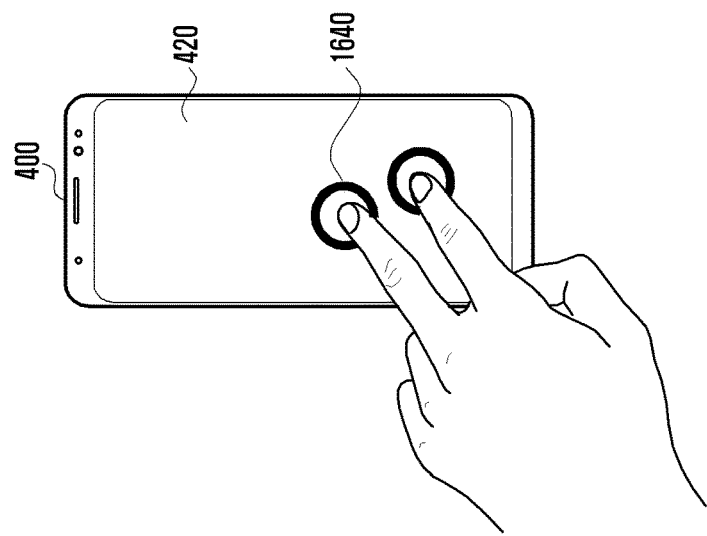

FIG. 16D
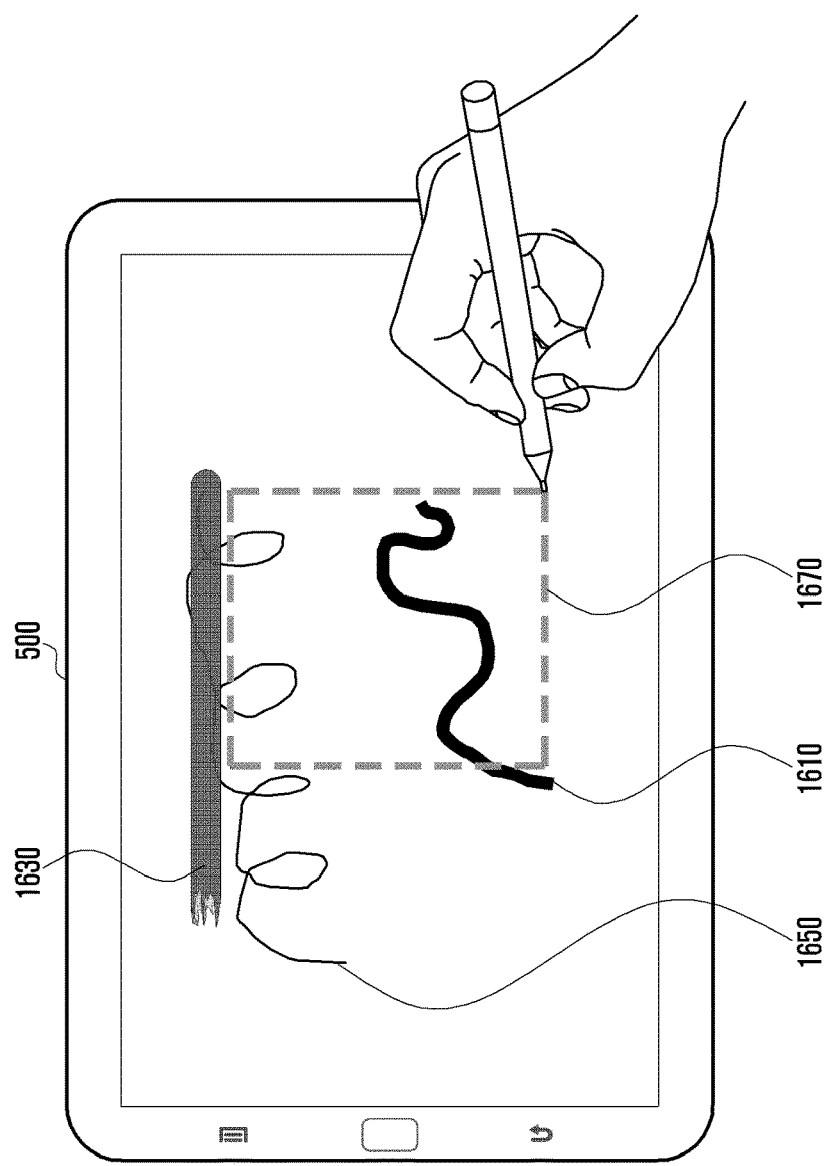
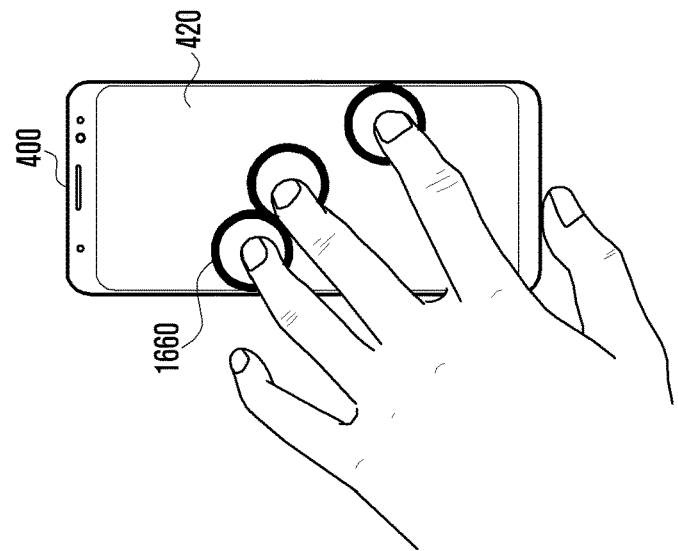

FIG. 17A
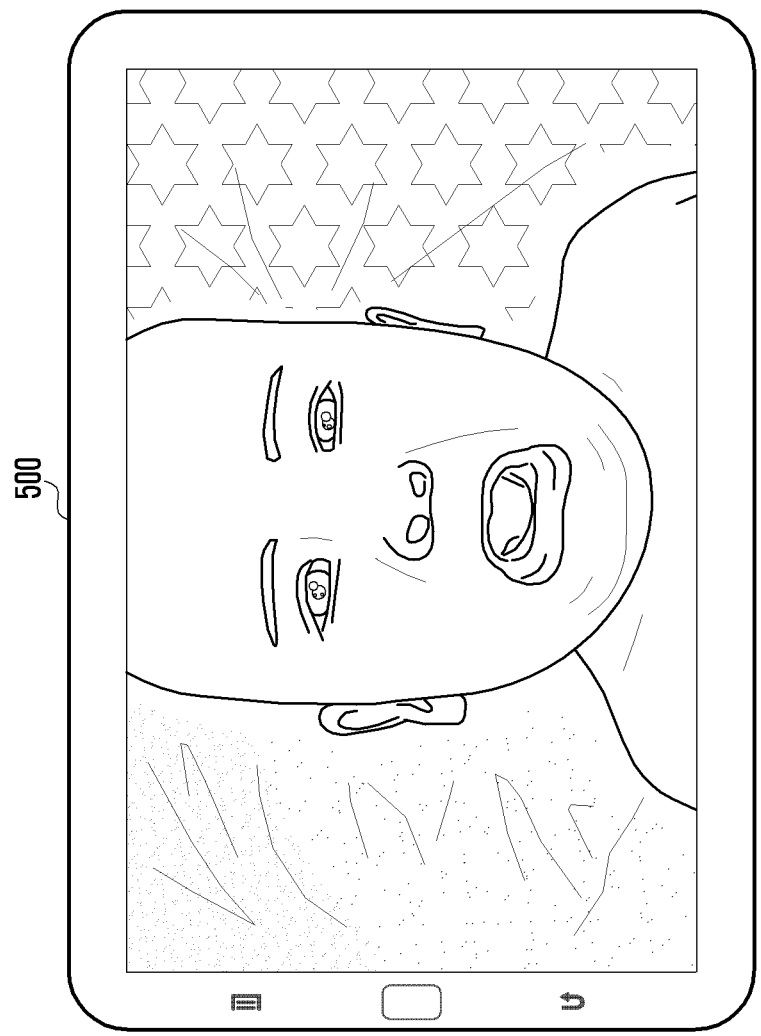
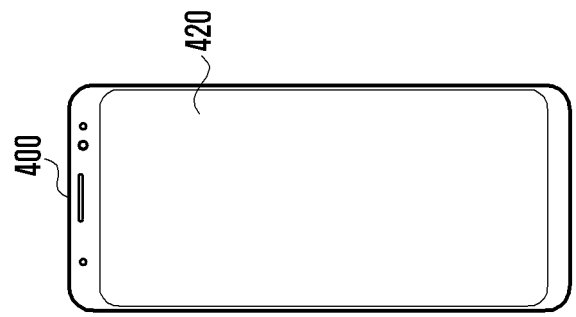

FIG. 17B
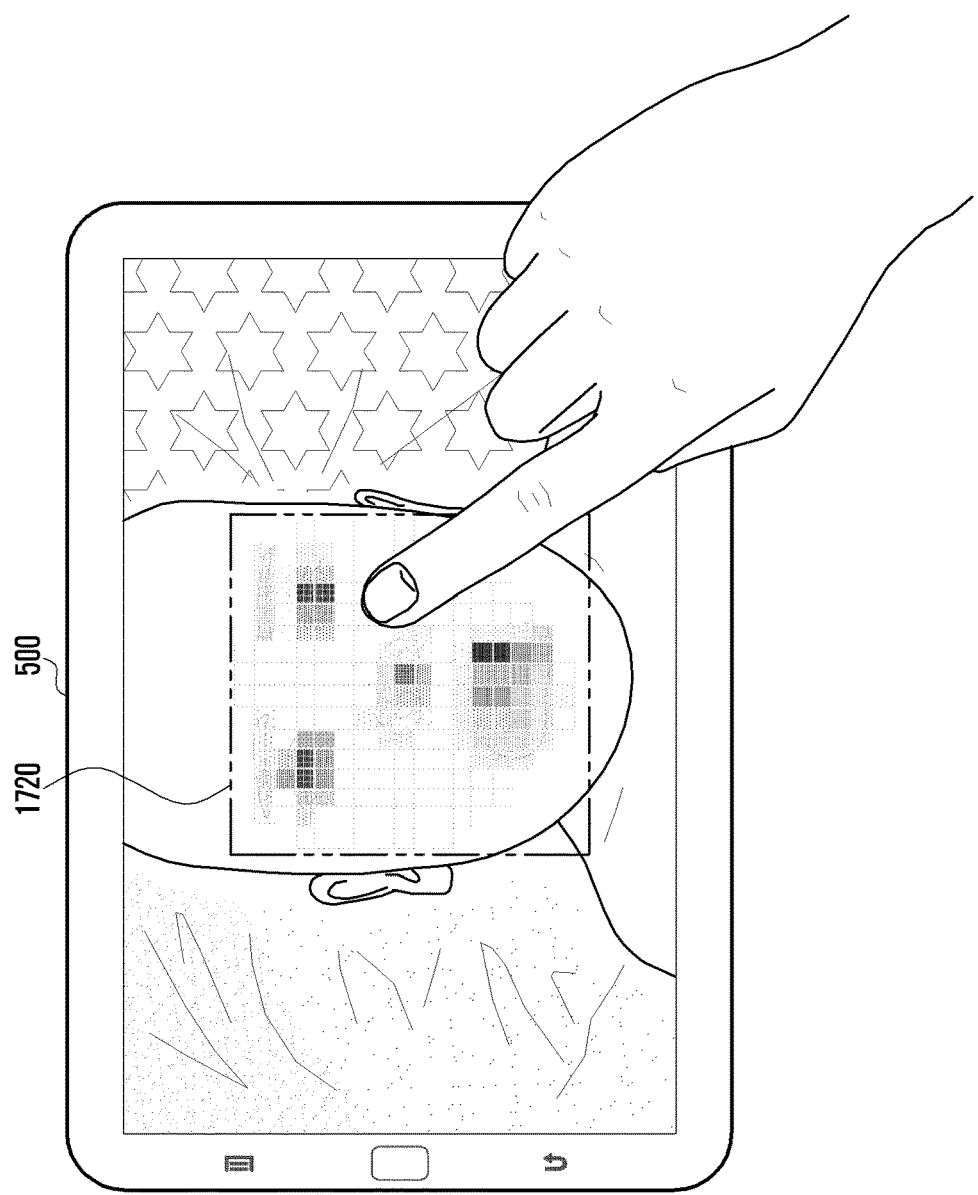
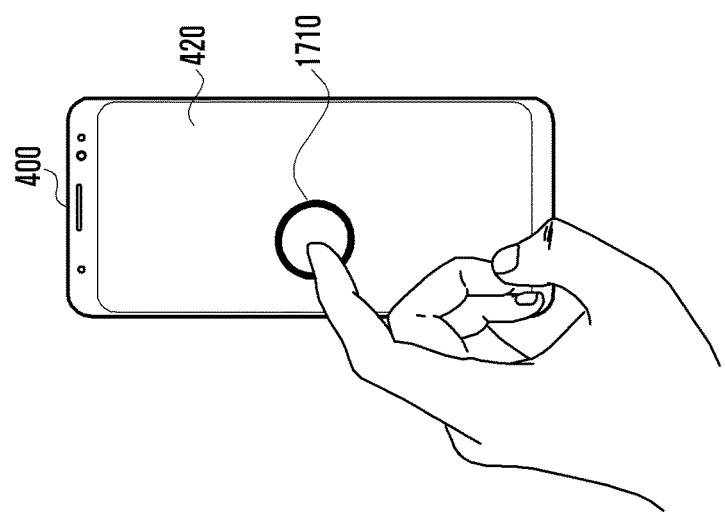

FIG. 18A
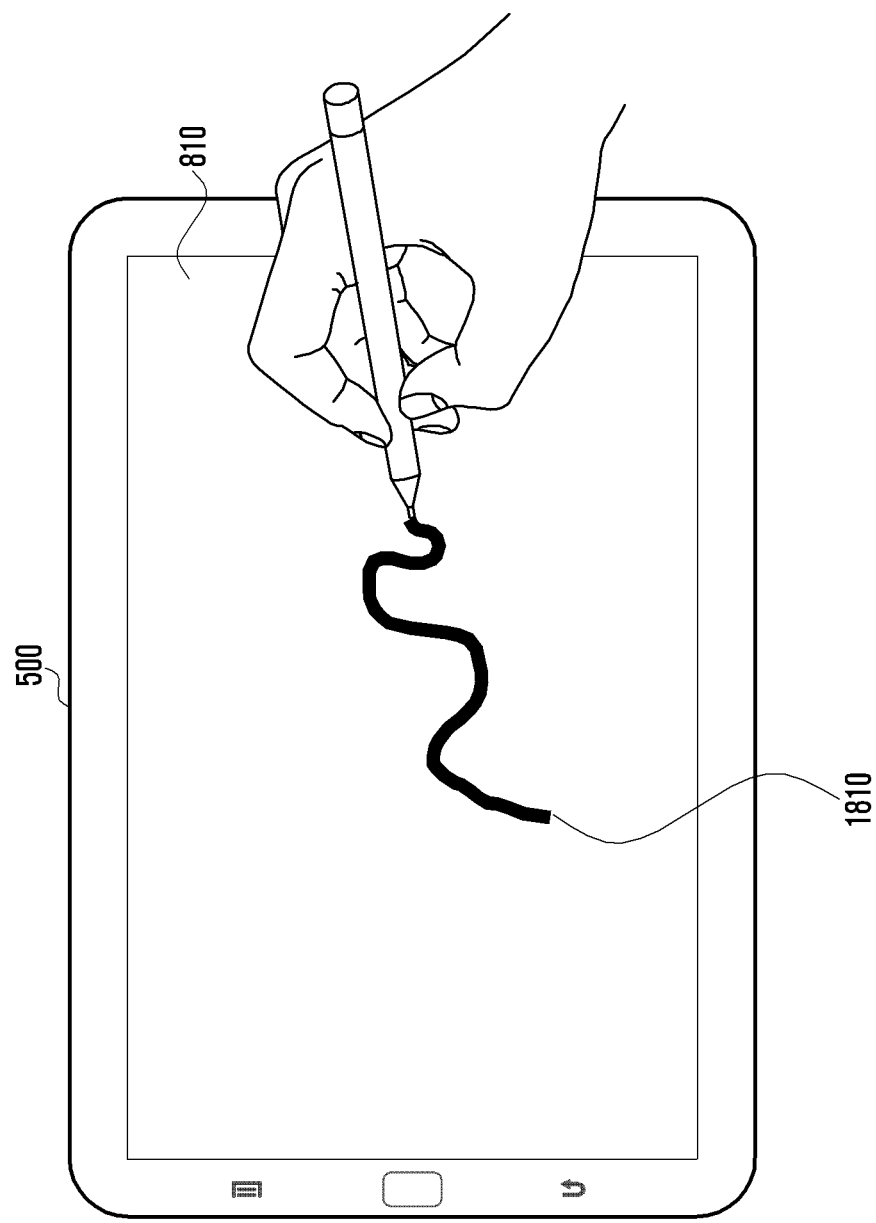
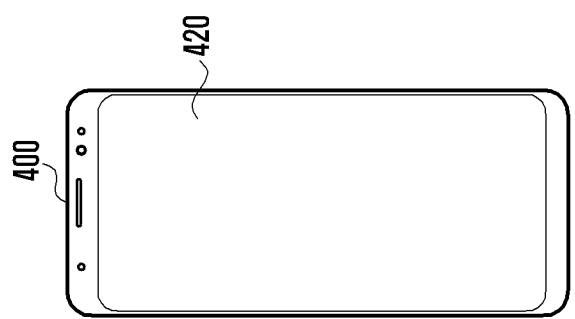

FIG. 18C
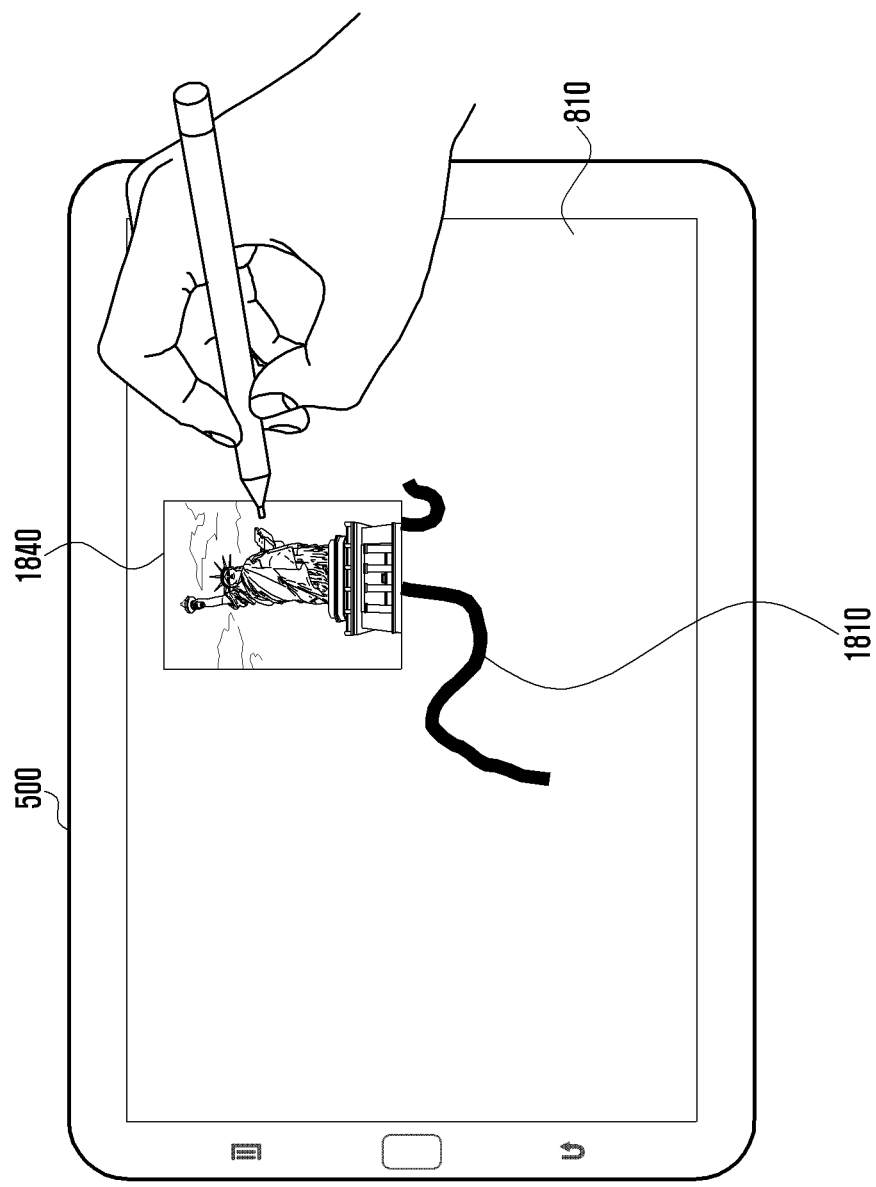
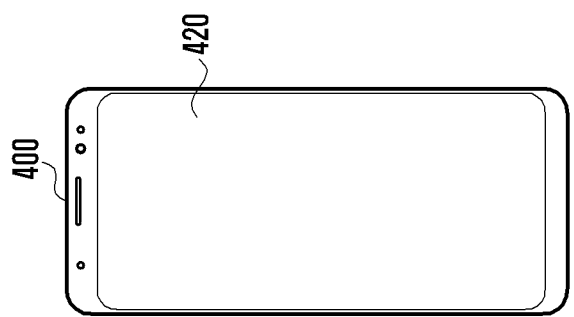

FIG. 19A
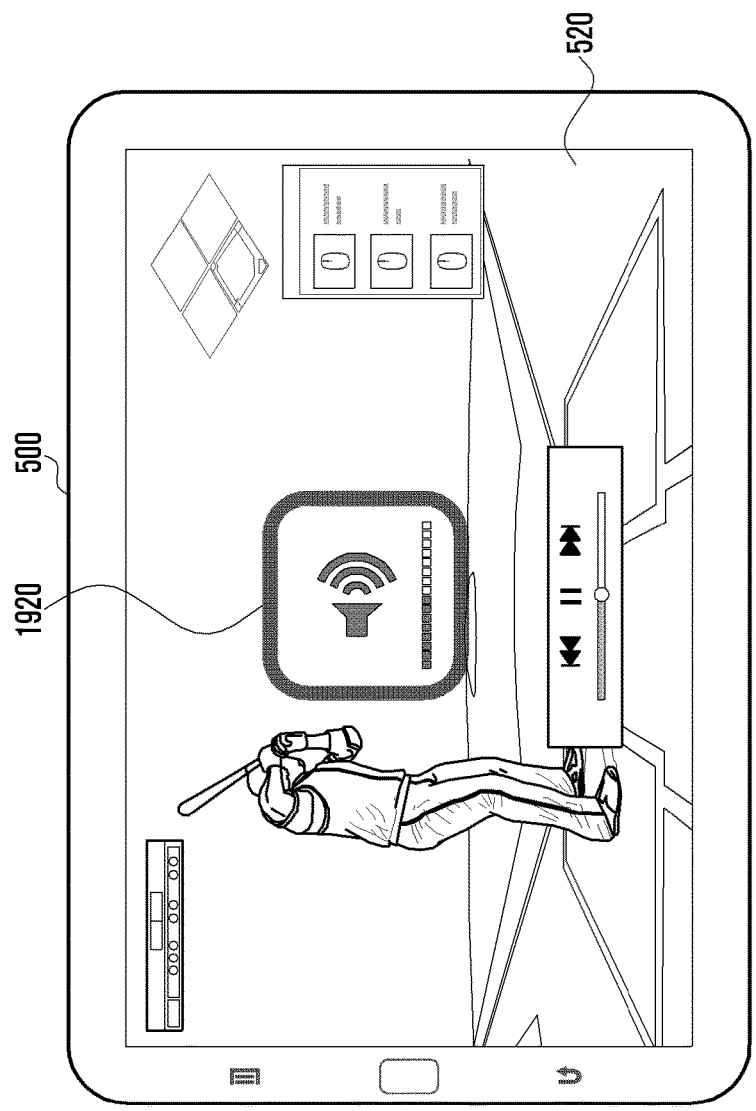
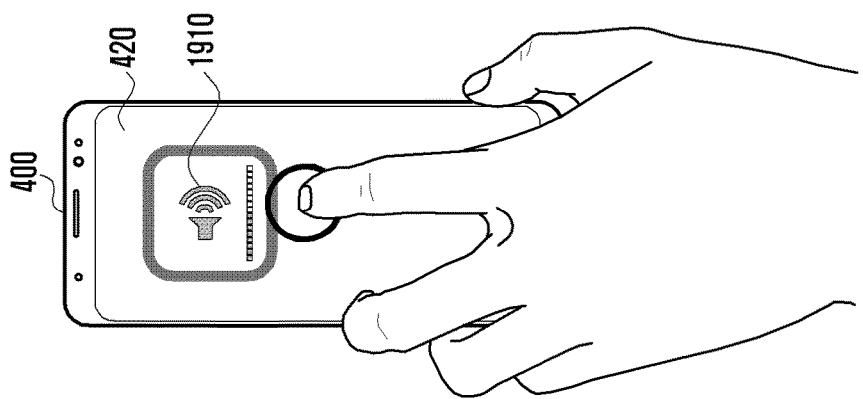

FIG. 19B
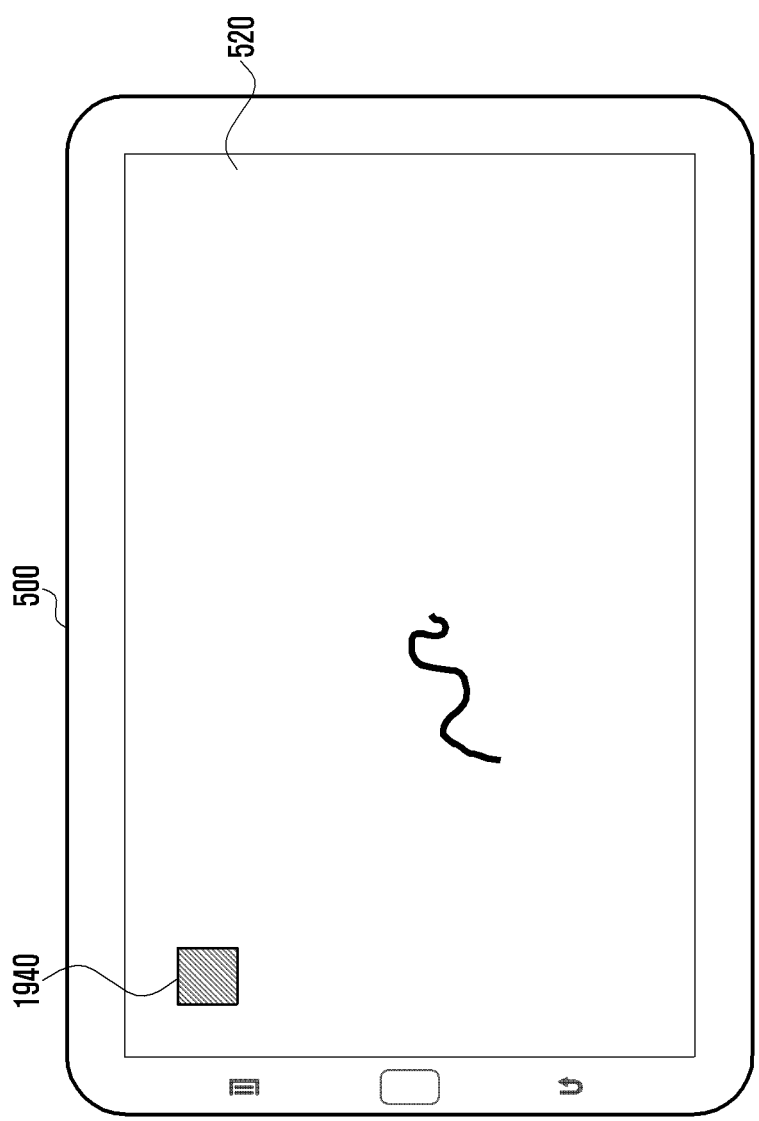
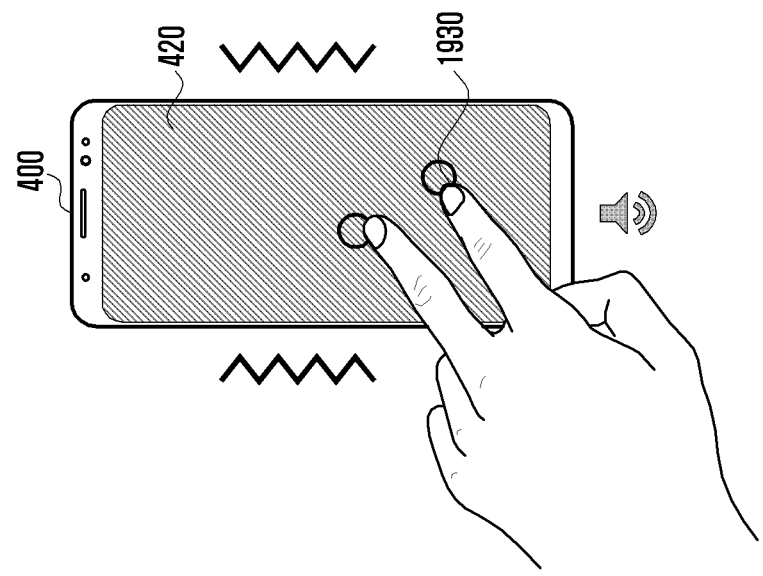

FIG. 20
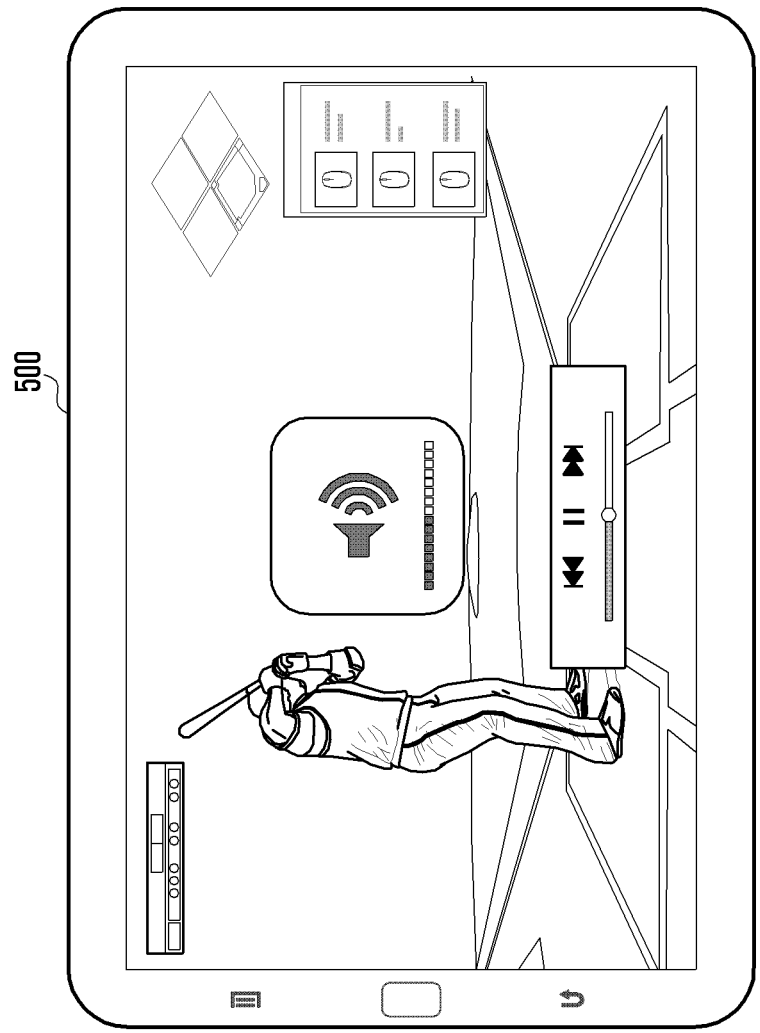
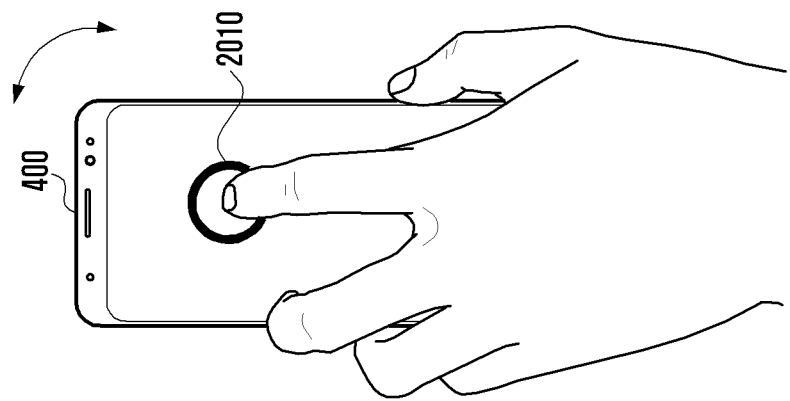

ELECTRONIC DEVICE, EXTERNAL ELECTRONIC DEVICE, AND METHOD FOR CONTROLLING EXTERNAL ELECTRONIC DEVICE BY USING ELECTRONIC DEVICE

CROSS-REFERENCE TO RELATED APPLICATION(S)

This application is a National Phase Entry of PCT International Application No. PCT/KR2019/009267, which was filed on Jul. 25, 2019 and claims priority to Korean Patent Application No. 10-2018-0120623, which was filed on Oct. 10, 2018, the contents of which are incorporated herein by reference.

TECHNICAL FIELD

Various embodiments of the disclosure relate to a technology for controlling an external electronic device connected to an electronic device as a method of operating the external electronic device and the electronic device.

BACKGROUND ART

Various electronic devices such as a smartphone, tablet PC, portable multimedia player (PMP), personal digital assistant (PDA), laptop personal computer (laptop PC) and wearable device are being spread.

Recently, as electronic devices having a large screen (e.g., tablet PCs) become popular, a user of an electronic device can produce a piece of content by using the electronic device.

Various applications (e.g., drawing application) including applications that can be used to create content on an electronic device (e.g., writing application, drawing application, or image editing application) may include a first region for receiving a user input (e.g., drawing input) and outputting a result (e.g., line or figure) corresponding to the user input and a second region that displays one or more graphical user interface (GUI) objects (e.g., object implemented in the form of a button GUI) for controlling various functions related to the user input. The user may fix their gaze on the first region while performing a user input, and then the user may shift his gaze to the second region in order to control the function related to the user input, select one of various objects included in the second region, and execute or change a function corresponding to the selected object.

DISCLOSURE OF INVENTION

Technical Problem

When the user fixes their gaze on the first region while entering a user input and then shifts their gaze to the second region in order to control the function related to the user input, the work of the user is interrupted. This method described above may reduce the user's content production efficiency.

Additionally, in an electronic device having a touchscreen, to implement the first region and the second region on a display having a limited size, objects included in the second region are layered. These layered objects may cause a phenomenon in which user input must be repeatedly entered to select a function desired by the user. This phenomenon may reduce the user's content production efficiency.

Furthermore, when an electronic device is configured to perform a task by using separate input devices such as a mouse and a keyboard, the content production efficiency may be increased. That is, to efficiently produce content, separate input devices such as a mouse and a keyboard must be provided, but when such an input device is provided, the mobility of the user may be restricted. An electronic device according to various embodiments of the disclosure may receive state information of an external electronic device connected to the electronic device, determine a command corresponding to the state information of the external electronic device and a user input received by the electronic device, and control the external electronic device according to the determined command (e.g., controlling content production operations of the external electronic device).

Solution to Problem

An electronic device according to various embodiments of the disclosure may include: a communication module to transmit and receive data to and from an external electronic device; a display; a memory to store commands for executing, on the external electronic device, functions mapped to state information of the external electronic device and user inputs; and a processor, wherein the processor may be configured to: control the communication module to be connected to the external electronic device; receive first state information of the external electronic device from the external electronic device; receive a first user input on an arbitrary zone of the display; determine a first command corresponding to the first state information and a characteristic of the first user input among the commands stored in the memory; and control the external electronic device to execute a function corresponding to the first command.

An operation method of the electronic device according to various embodiments of the disclosure may include: connecting to an external electronic device; receiving first state information of the external electronic device from the external electronic device; receiving a first user input for an arbitrary zone on a display; determining a first command corresponding to the first state information and a characteristic of the first user input from among commands stored in a memory that stores commands for executing, on the external electronic device, functions mapped to state information of the external electronic device and user inputs; and controlling the external electronic device to execute a function corresponding to the first command.

Advantageous Effects of Invention

In an electronic device, an external electronic device, and an operation method of the electronic device according to various embodiments of the disclosure, state information of the external electronic device can be received and the external electronic device can be controlled according to the state information of the external electronic device and a user input received by the electronic device, which can prevent a phenomenon in which the user's gaze is shifted to a region including one or more objects for executing a function desired by the user. Hence, it is possible to increase the work efficiency of the user utilizing the external electronic device. In an electronic device, an external electronic device, and an operation method of the electronic device according to various embodiments of the disclosure, state information of the external electronic device can be received and the external electronic device can be controlled according to the state information of the external electronic device and a user input received by the electronic device, so that function control using layered objects may not have to be performed and repetitive user input for function control can be reduced. Hence, it is possible to increase the work efficiency of the user utilizing the external electronic device.

In an electronic device, an external electronic device, and an operation method of the electronic device according to various embodiments of the disclosure, an external electronic device (e.g., smartphone) already owned by the user can be used without having an additional external input device, thereby increasing the user's work efficiency.

BRIEF DESCRIPTION OF DRAWINGS

FIGS. 8 to 20 are diagrams illustrating embodiments of the first electronic device and the second electronic device according to various embodiments of the disclosure.

MODE FOR THE INVENTION

Figure 1:
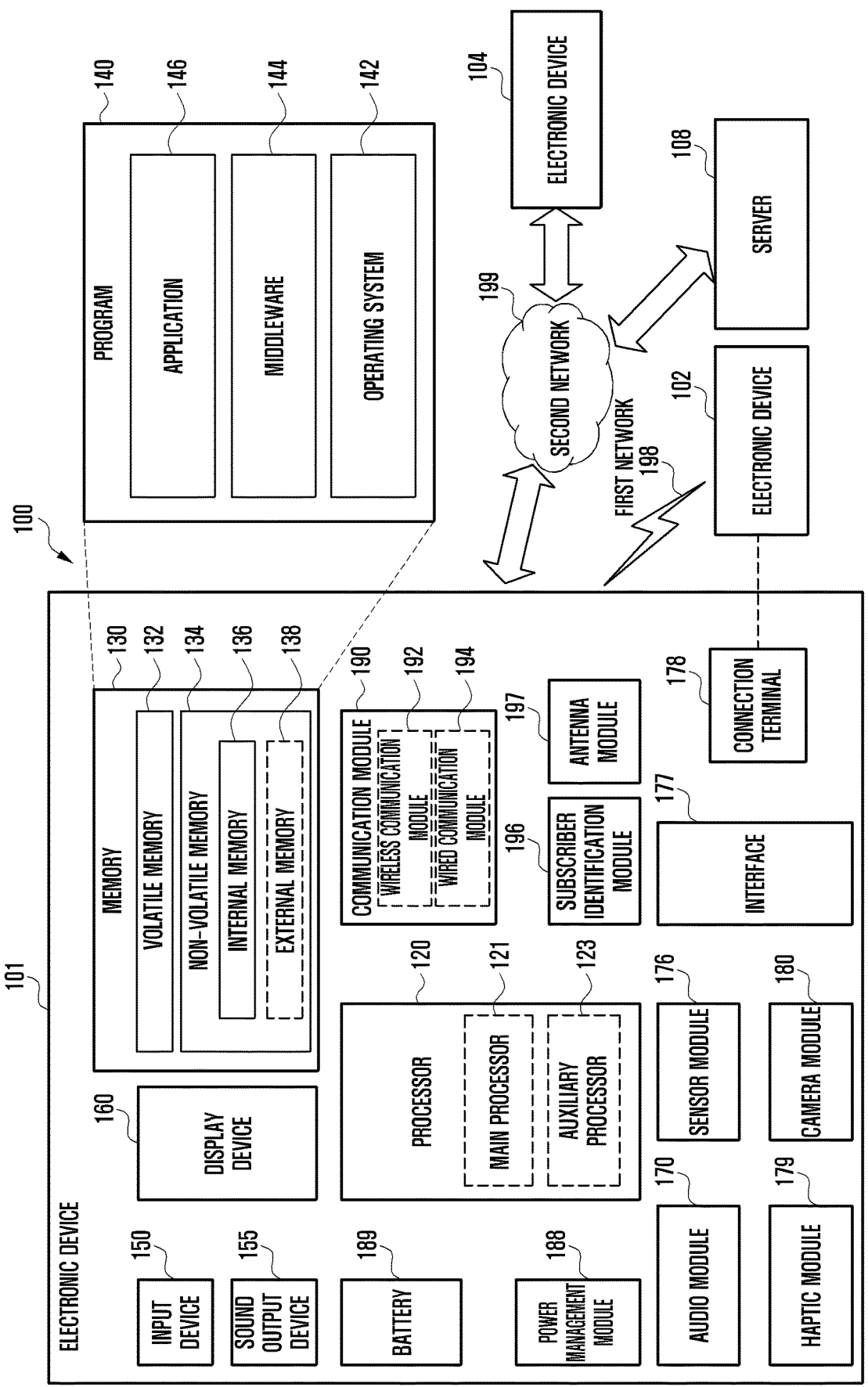
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
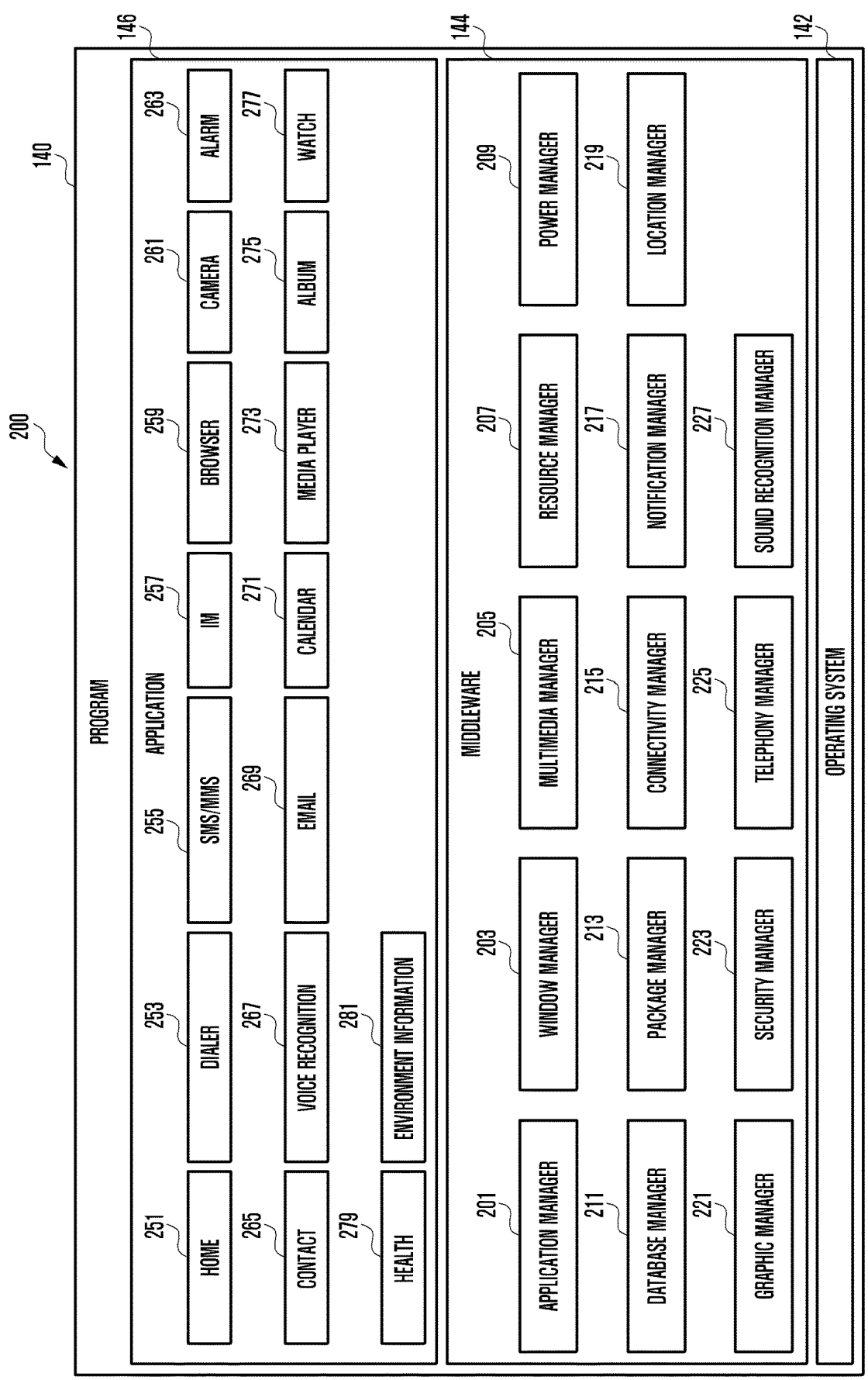
FIG. 2 is a block diagram of programs according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
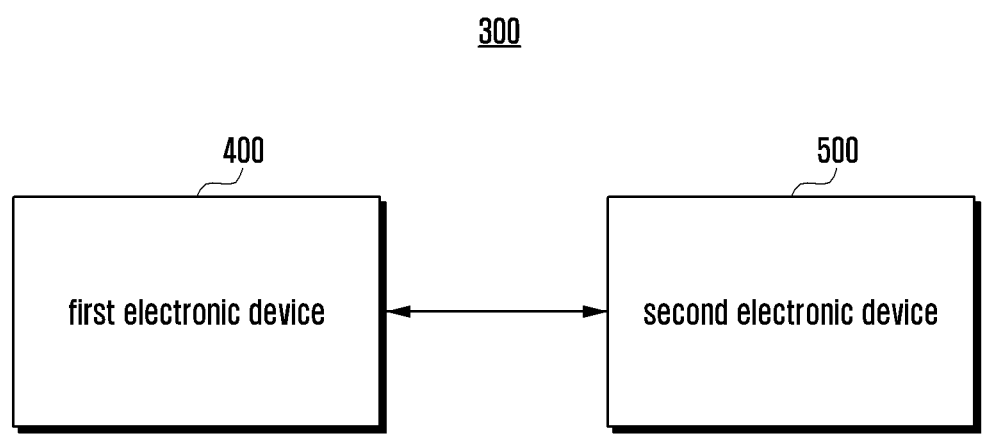
FIG. 3 is a diagram illustrating a user input support system according to various embodiments of the disclosure.

FIG. 3 is a diagram illustrating a user input support system 300 according to various embodiments of the disclosure.

The user input support system 300 according to various embodiments of the disclosure may include a first electronic device 400 and a second electronic device 500. The user input support system 300 may enable user input that can be performed on the second electronic device 500 to be performed more simply by using the first electronic device 400.

According to various embodiments of the disclosure, the first electronic device 400 and the second electronic device 500 may be connected to each other through various wireless or wired communication methods including Wi-Fi, Wi-Fi Direct, or Bluetooth.

According to various embodiments of the disclosure, the second electronic device 500 may include a display capable of receiving a user input (e.g., display device 160 in FIG. 1). The second electronic device 500 may receive a user input on the display and execute a function corresponding to the user input. For example, the second electronic device 500 may execute a drawing application, and the user may perform drawing on the display. The second electronic device 500 may display a drawing result according to a user input.

According to various embodiments of the disclosure, the second electronic device 500 may display a first region (e.g., first region 810 in FIG. 8) for receiving a user input and displaying a result corresponding to the user input, and a second region (e.g., second region 820 in FIG. 8) for displaying one or more objects for controlling various functions of the second electronic device 500. The user may perform an input on the first region 810 and may perform an input on the second region 820 to control a function related to the input performed on the first region 810. For example, when the second electronic device 500 is running a drawing application, the user may perform a drawing input on the first region 810 and may perform an interaction with objects on the second region 820 to control various functions (e.g., various functions including changing colors, undoing, aligning, and changing character attributes) for controlling the drawing input.

According to various embodiments of the disclosure, while performing a user input on the first region 810, the user may select an object included in the second region 820 to change the function related to the user input. The action described above may cause a phenomenon in which the user's gaze is shifted from the first region 810 where user input is performed to the second region 820 including at least one object for executing a desired function. The action described above may cause a problem of interrupting task performance of the user and reducing the efficiency of the user input.

The user input support system 300 according to various embodiments of the disclosure may support the operation of controlling functions related to user input by using the first electronic device 400 connected to the second electronic device 500 so as to reduce the repetitive input process for controlling functions desired by the user and to keep the user's gaze on the first region 810. The first electronic device 400 may receive user input performed on the first electronic device 400 and may control the second electronic device 500 to control a function corresponding to the user input (e.g., executing a function or changing a function). Hereinafter, an operation of controlling functions related to user input using the first electronic device 400 in order to keep the user's gaze on the first region 810 will be given in detail.

Figure 4:
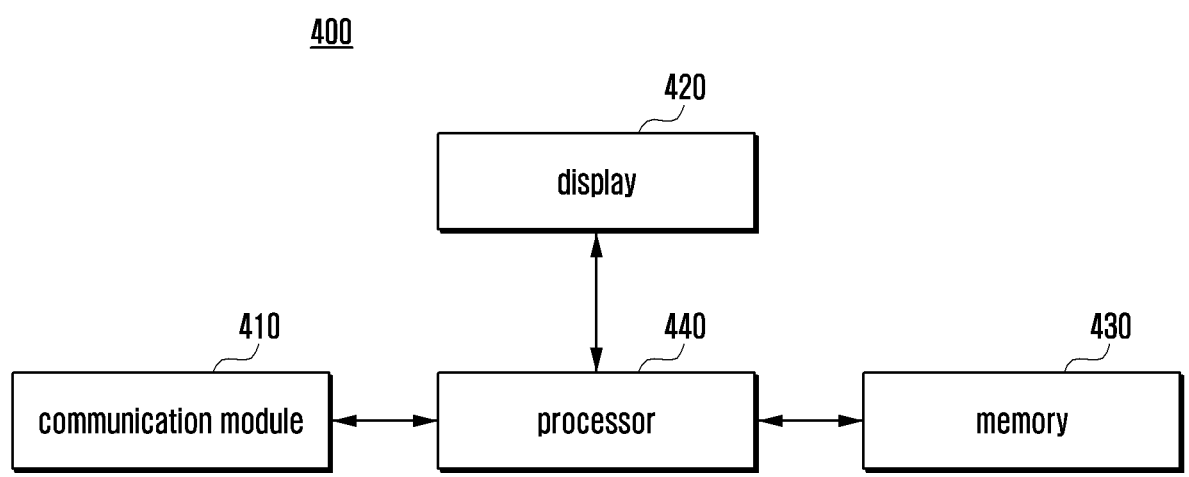
FIG. 4 is a block diagram of a first electronic device according to various embodiments of the disclosure.

FIG. 4 is a block diagram of the first electronic device according to various embodiments of the disclosure.

With reference to FIG. 4, the first electronic device (e.g., first electronic device 400 in FIG. 3) according to various embodiments of the disclosure may include a communication module 410 (e.g., communication module 190 in FIG. 1), a display 420 (e.g., display device 160 in FIG. 1), a memory 430 (e.g., memory 130 in FIG. 1), and a processor 440 (e.g., processor 120 in FIG. 1).

According to various embodiments of the disclosure, data may be transmitted/received to/from the second electronic device (e.g., second electronic device 500 in FIG. 3) through the communication module 410. The communication module 410 may receive state information of the second electronic device 500 from the second electronic device 500 at every preset period. The state information of the second electronic device 500 may include information indicating an application running on the second electronic device 500 or information indicating a function executed by the application. When an application is executed or when the function executed by a running application is changed, the second electronic device 500 may transmit state information of the second electronic device 500 to the first electronic device 400. The communication module 410 may receive state information of the second electronic device 500 and forward the state information of the second electronic device 500 to the processor 440.

According to various embodiments of the disclosure, the display 420 may receive a user input entered on the display 420. The display 420 may display an object indicating a function executed on the second electronic device 500.

According to various embodiments of the disclosure, the memory 430 may store a command for the second electronic device 500 to execute a function. The function of the second electronic device 500 may include a function related to a user input. For example, the functions related to user input may include functions related to changing colors, undoing, aligning, and changing character attributes in a drawing application. The memory 430 may store state information of the second electronic device 500 and commands for executing functions of the second electronic device 500 corresponding to user input received by the first electronic device 400.

According to various embodiments of the disclosure, the memory 430 may store commands in consideration of state information of the second electronic device 500, so that a different command may be executed even if the same user input is entered. For example, with reference to Table 1 below, the first user input and the second user input received by the first electronic device 400 may correspond to different commands according to state information of the second electronic device 400 even if they are the same user input.

TABLE 1

| User input | State information of second electronic device 500 | Command |
| --- | --- | --- |
| Simultaneous input of two fingers on display 420 | Performing drawing input on drawing application | Change drawing attribute (e.g., color) |
| | Selecting text object on drawing application | Change character attribute (e.g., character shape) |
| Input to move a finger | Performing drawing input on | Undo previously performed |

TABLE 1-continued

| User input | State information of second electronic device 500 | Command |
| --- | --- | --- |
| in first direction on display 420 | drawing application | operation (e.g., drawing a line) |
|  | Selecting object on drawing application | Align objects |
| Input to rotate first electronic device 400 in second direction | Performing drawing input on drawing application | Continuously change the color of the input drawing |
| Close gesture input on display 420 | Performing drawing input on drawing application | Remove all user inputs entered in drawing region |

According to various embodiments of the disclosure, the processor 440 may control the communication module 410 to receive state information of the second electronic device 500.

According to various embodiments of the disclosure, the processor 440 may receive a first user input for controlling the second electronic device 500. The first user input may be detected by various components of the first electronic device 400. For example, the display 420 of the first electronic device 400 may detect a first user input entered on the display 420. As another example, among various sensors included in the first electronic device 400 (e.g., sensor module 176 in FIG. 1), the gyro sensor or the acceleration sensor may detect a first user input causing movement of the first electronic device 400.

According to various embodiments of the disclosure, the processor 440 may determine a first command corresponding to state information of the second electronic device 500 and the first user input among various commands stored in the memory 430. The first command may indicate a command for controlling an application running on the second electronic device 500 or a function that can be used in the running application. The processor 440 may control the second electronic device 500 to execute a function corresponding to the determined first command.

For example, according to confirming that the first user input is an input of simultaneously touching two fingers on the display 420 and confirming that the second electronic device 500 is executing a drawing application and performs a function of receiving a drawing input based on the state information of the second electronic device 500, the processor 440 may determine a first command for changing the color of the line being drawn from a first color (e.g., black) to a second color (e.g., red). The processor 440 may control the second electronic device 500 to change the color of the line being drawn on the second electronic device 500 from the first color to the second color.

According to various embodiments of the disclosure, the first electronic device 400 may control the second electronic device 500 in consideration of state information of the second electronic device 500. When the first electronic device 400 receives the same user input, functions executed on the second electronic device 500 may be different according to the state information of the second electronic device 500. Through this, the first electronic device 400 may select a function to be executed on the second electronic device 500 even if it does not receive a user input for selecting a function to be executed on the second electronic device 500. By receiving state information of the second electronic device 500, the first electronic device 400 may prevent a phenomenon in which the user's gaze is shifted from the first region 810 where the user input is entered to the second region 820 including at least one object for executing a desired function, increasing the work efficiency of the user.

According to various embodiments of the disclosure, the first user input may indicate a user input for an arbitrary zone on the display 420. The arbitrary zone on the display 420 may indicate a region that is not specified in advance. According to various embodiments of the disclosure, the first electronic device 400 may receive a first user input for an unspecified arbitrary zone on the display 420. As the user can perform an input for an unspecified arbitrary zone on the display 420, the phenomenon in which the user's gaze is shifted from the first region 810 where the user input is entered to the second region 820 including at least one object for executing a desired function can be prevented, which can increase the work efficiency of the user.

According to various embodiments of the disclosure, when a second user input different from the first user input is received, the processor 440 may determine a second command corresponding to state information of the second electronic device 500 and the second user input. The processor 440 may control the second electronic device 500 to execute a function corresponding to the determined second command.

For example, according to confirming that the first user input is an input of simultaneously touching two fingers on the display 420 and confirming that the second electronic device 500 is executing a drawing application and performs a function of receiving a drawing input based on the state information of the second electronic device 500, the processor 440 may determine a first command for changing the color of the line being drawn from a first color (e.g., black) to a second color (e.g., red). The processor 440 may control the second electronic device 500 to change the color of the line being drawn on the second electronic device 500 from the first color to the second color. Upon receiving a second user input, the processor 440 may confirm that the second user input is an input for moving a finger in a first direction on the display 420 and may undo the previously performed operation (e.g., drawing a line with a second color).

According to various embodiments of the disclosure, the processor 440 may continuously receive state information of the second electronic device 500. In response to a change in the state information of the second electronic device 500, the processor 440 may select a command corresponding to a function to be executed on the second electronic device 500 according to the changed state information and user input.

According to various embodiments of the disclosure, the processor 440 may receive second state information different from the first state information of the second electronic device 500 and a second user input identical to the first user input. The processor 440 may determine a second command corresponding to the second state information and the second user input, and may control the second electronic device 500 to execute a function corresponding to the determined second command. The processor 440 may consider state information of the second electronic device 500, and thus may execute different commands even when the same user input is received. With reference to Table 1 described above, a first user input and a second user input received by the first electronic device 400 may be mapped to different commands according to state information of the second electronic device 400 even if they are the same user input.

According to various embodiments of the disclosure, the processor 440 may control various electronic components of the first electronic device 400 to output a feedback indicating the function corresponding to the determined first command or the determined second command. The feedback indicating a function may be output using the display, vibrations or sounds. For example, the processor 440 may control the sound output device (e.g., sound output device 155 in FIG. 1) to output a sound indicating the function corresponding to the determined command. As another example, the processor 440 may control the haptic module 179 to output a vibration indicating the function corresponding to the determined command.

Figure 5:
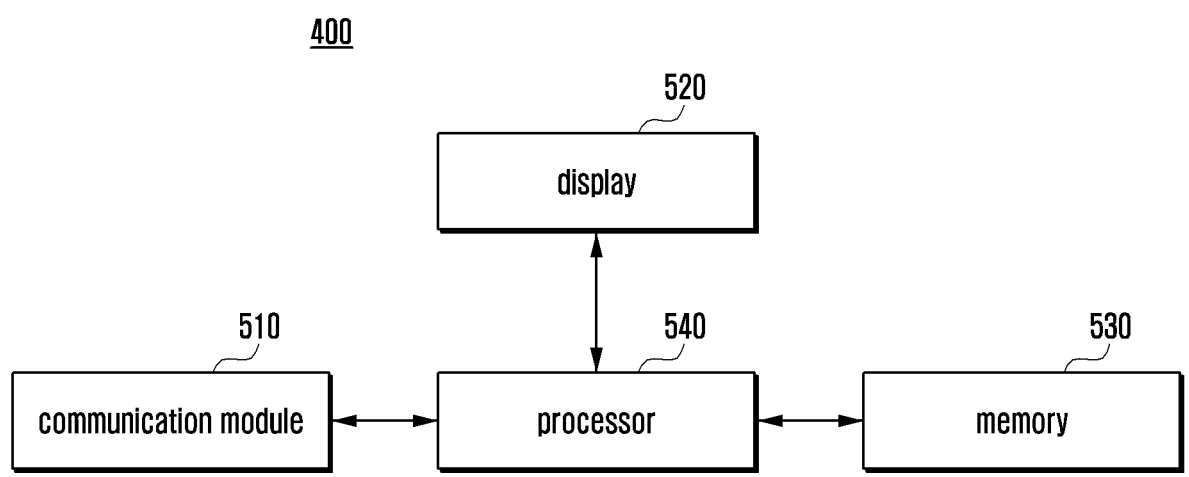
FIG. 5 is a block diagram of a second electronic device according to various embodiments of the disclosure.

FIG. 5 is a block diagram of the second electronic device according to various embodiments of the disclosure.

With reference to FIG. 5, the second electronic device (e.g., second electronic device 500 in FIG. 3) according to various embodiments of the disclosure may include a communication module 510 (e.g., communication module 190 in FIG. 1), a display 520 (e.g., display device 160 in FIG. 1), a memory 530 (e.g., memory 130 in FIG. 1), and a processor 540 (e.g., processor 120 in FIG. 1).

According to various embodiments of the disclosure, the communication module 510 may transmit and receive data to and from the first electronic device (e.g., first electronic device 400 in FIG. 3). The communication module 510 may transmit state information of the second electronic device 500 to the first electronic device 400. When an application is executed or when a function performed by the running application is changed, the second electronic device 500 may transmit state information of the second electronic device 500 to the first electronic device 400.

According to various embodiments of the disclosure, the display 520 may receive a user input and output a result corresponding to the user input. For example, when a drawing application is running on the second electronic device 500, the display 520 may receive a user input for drawing and display a drawing corresponding to the user input.

According to various embodiments of the disclosure, the display 520 may display a first region (e.g., first region 810 in FIG. 8) for receiving a user input and displaying a result corresponding to the user input, and a second region (e.g., second region 820 in FIG. 8) for displaying one or more objects for controlling various functions of the second electronic device 500. The user may perform an input on the first region 810 and may perform an input on the second region 820 to control a function related to the input performed on the first region 810. For example, when the second electronic device 500 is running a drawing application, the user may perform a drawing input on the first region 810 and may perform an interaction with objects on the second region 820 to control various functions (e.g., various functions including changing colors, undoing, aligning, and changing character attributes) for controlling the drawing input.

According to various embodiments of the disclosure, the memory 530 may store various data for receiving user input and processing the user input. For example, the memory 530 may store various applications that process user input and data related to the applications.

According to various embodiments of the disclosure, the processor 540 may receive a user input and output a result corresponding to the user input based on the user input. For example, when the second electronic device 500 is executing a drawing application, the processor 540 may control the display 520 to receive a drawing input performed on the first region 810 and output a result (drawing) corresponding to the drawing input. As another example, when the second electronic device 500 is executing a drawing application, the processor 540 may receive a user input on the second region 820 for selecting objects indicating various functions for controlling the drawing input and execute a function corresponding to a selected object.

According to various embodiments of the disclosure, the processor 540 may check state information of the second electronic device 500 and may control the communication module 510 to transmit the state information of the second electronic device 500 to the first electronic device 400.

According to various embodiments of the disclosure, the processor 540 may receive a command transmitted from the first electronic device 400 and execute a function corresponding to the command. As described above in FIG. 4, the first electronic device 400 may determine a command corresponding to state information of the second electronic device 500 and a user input received by the first electronic device 400, and transmit the determined command information to the second electronic device 500. The processor 540 may receive the command transmitted by the first electronic device 400 and execute a function corresponding to the command.

According to various embodiments of the disclosure, the processor 540 may detect that the state of the second electronic device 500 is changed. For example, the processor 540 may detect that an application running on the second electronic device 500 is changed. As another example, the processor 540 may detect that a function operating in an application running on the second electronic device 500 is changed. The processor 540 may detect that the state of the second electronic device 500 is changed, and control the communication module 510 to transmit the changed state information of the second electronic device 500 to the first electronic device 400. The processor 540 may receive a determined command from the first electronic device 400 and execute a function corresponding to the determined command.

According to various embodiments of the disclosure, the processor 540 may output a feedback indicating a function corresponding to the first command. For example, the processor 540 may control the display 520 to display a feedback indicating a function corresponding to the first command. As another example, the processor 540 may control the speaker (e.g., speaker 155 in FIG. 1) or the haptic module (e.g., haptic module 179 in FIG. 1) to output a feedback indicating a function corresponding to the first command. By checking the feedback output in various ways, the user can identify whether the function corresponding to the user input matches the intended function. Through this, it is possible to prevent a phenomenon in which the user's gaze is shifted from the first region 810 where the user input is performed to the second region 820 including at least one object for executing a desired function, which can increase the work efficiency of the user.

Figure 6:
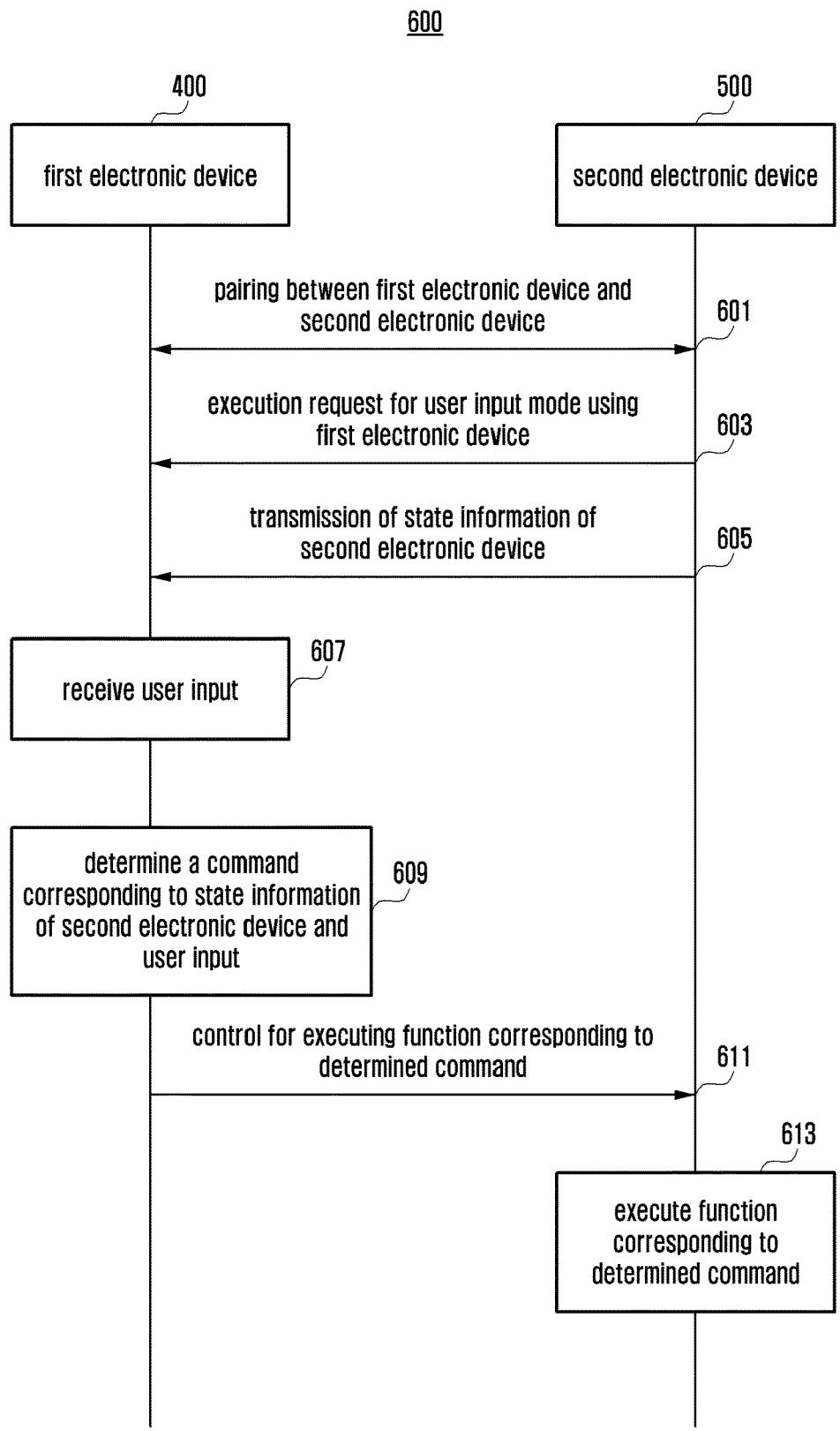
FIG. 6 is a diagram illustrating a first embodiment between the first electronic device and the second electronic device according to various embodiments of the disclosure.

FIG. 6 is an operation flow diagram illustrating a first embodiment of an operation method 600 between the first electronic device (e.g., first electronic device 400 in FIG. 3) and the second electronic device (e.g., second electronic device 500 in FIG. 3) according to various embodiments of the disclosure.

According to various embodiments of the disclosure, at operation 601, the first electronic device 400 and the second electronic device 500 may perform pairing to transmit and receive data to and from each other. The first electronic device 400 and the second electronic device 500 may be paired through various wireless or wired communication means including Wi-Fi, Wi-Fi Direct, and Bluetooth.

According to various embodiments of the disclosure, at operation 603, the second electronic device 500 may transmit a signal for requesting execution of a user input mode using the first electronic device 400. For example, the second electronic device 500 may determine whether to execute the user input mode using the first electronic device 400 according to a user input performed by the user on the display or a user input utilizing a voice command agent. The second electronic device 500 may determine to execute the user input mode using the first electronic device 400, and transmit an execution request signal for the user input mode using the first electronic device 400 to the first electronic device 500.

According to various embodiments of the disclosure, after transmitting the signal requesting execution of the user input mode using the first electronic device 500, the second electronic device 500 may perform a series of preparation operations for the user input mode using the first electronic device 500. In response to receiving the request signal for executing the user input mode using the first electronic device 500, the first electronic device 400 may perform a series of preparation operations for the user input mode using the first electronic device 500.

According to various embodiments of the disclosure, although it is described at operation 603 that the second electronic device 500 transmits a signal for requesting execution of a user input mode using the first electronic device 400, the first electronic device 400 may transmit a signal for requesting execution of a user input mode using the first electronic device 400 to the second electronic device 500.

According to various embodiments of the disclosure, at operation 605, the second electronic device 500 may transmit state information of the second electronic device 500 to the first electronic device 400. The state information of the second electronic device 500 may include information indicating an application running on the second electronic device 500 or information indicating a function executed by the application. When an application is executed or when a function performed by a running application is changed, the second electronic device 500 may transmit state information of the second electronic device 500 to the first electronic device 400.

According to various embodiments of the disclosure, at operation 607, the first electronic device 400 may receive a user input. The user input may be a user input for controlling an application running on the second electronic device 500 or a function that can be used in the running application (e.g., execution of a function or change of a function).

According to various embodiments of the disclosure, the user input may indicate a user input for an arbitrary zone on the display 420. The arbitrary zone on the display 420 may indicate a region that is not specified in advance. According to various embodiments of the disclosure, the first electronic device 400 may receive a user input for an unspecified arbitrary zone on the display 420. As the user can perform an input for an unspecified arbitrary zone on the display 420, the phenomenon in which the user's gaze is shifted from the first region where the user input is entered (e.g., first region 810 in FIG. 8) to the second region 820 including at least one object for executing a desired function can be prevented, which can increase the work efficiency of the user.

According to various embodiments of the disclosure, the user input may be sensed by various components of the first electronic device 400. For example, the display (e.g., display 420 in FIG. 4) of the first electronic device 400 may detect a user input entered on the display 420. As another example, among various sensors included in the first electronic device 400 (e.g., sensor module 176 in FIG. 1), the proximity sensor, the gyro sensor, or the acceleration sensor may sense a user input for changing the posture of the first electronic device 400.

According to various embodiments of the disclosure, at operation 609, the first electronic device 400 may determine a command corresponding to the state information of the second electronic device and the user input. The command may indicate a command for controlling an application running on the second electronic device 500 or a function that can be used in the running application.

According to various embodiments of the disclosure, at operation 611, the first electronic device 400 may control the second electronic device 500 to execute a function corresponding to the determined command.

According to various embodiments of the disclosure, at operation 613, the second electronic device 500 may execute a function corresponding to the command determined by the first electronic device 400.

Figure 7A:
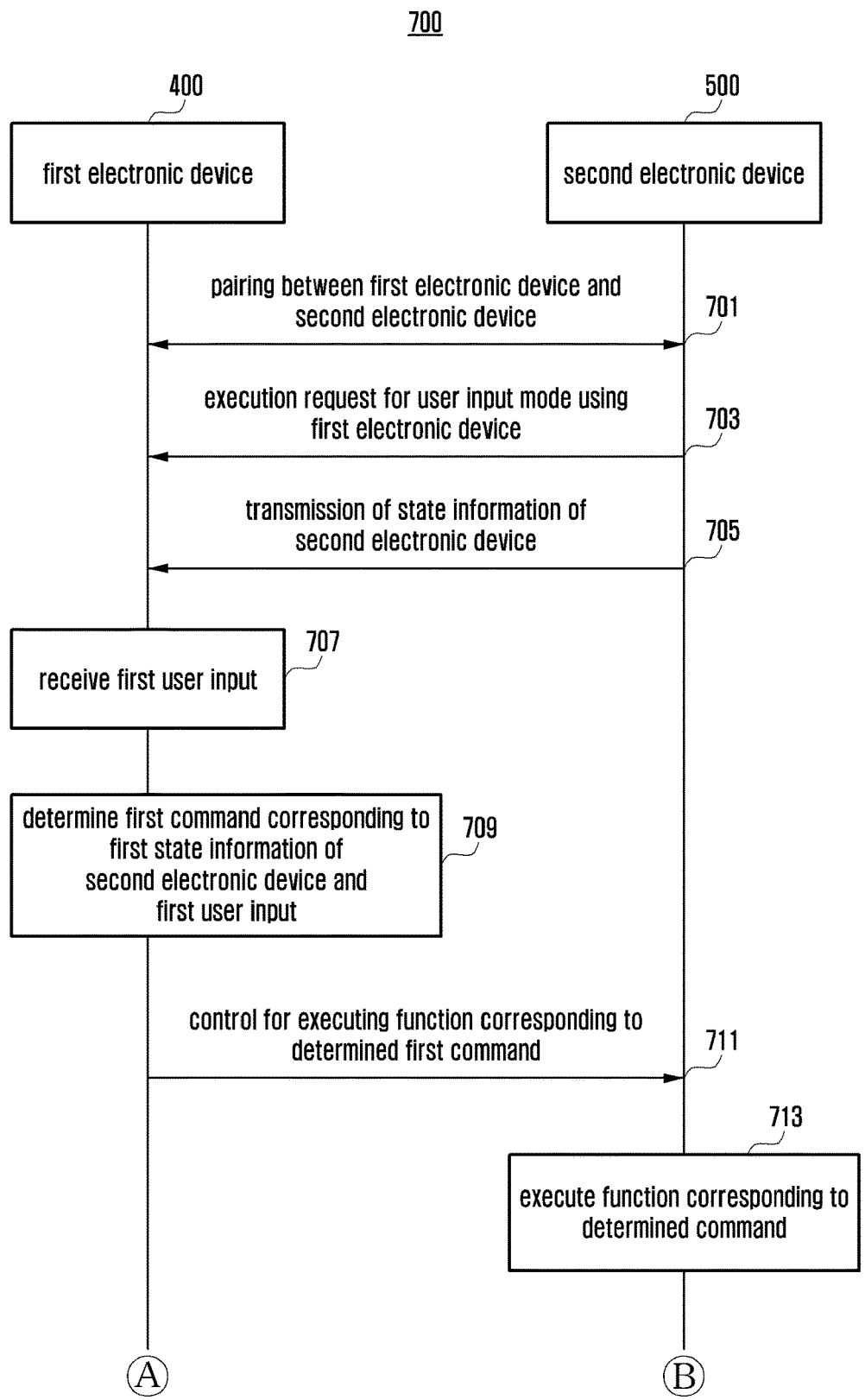
FIGS. 7A and 7B are diagrams illustrating a second embodiment between the first electronic device and the second electronic device according to various embodiments of the disclosure.
Figure 7B:
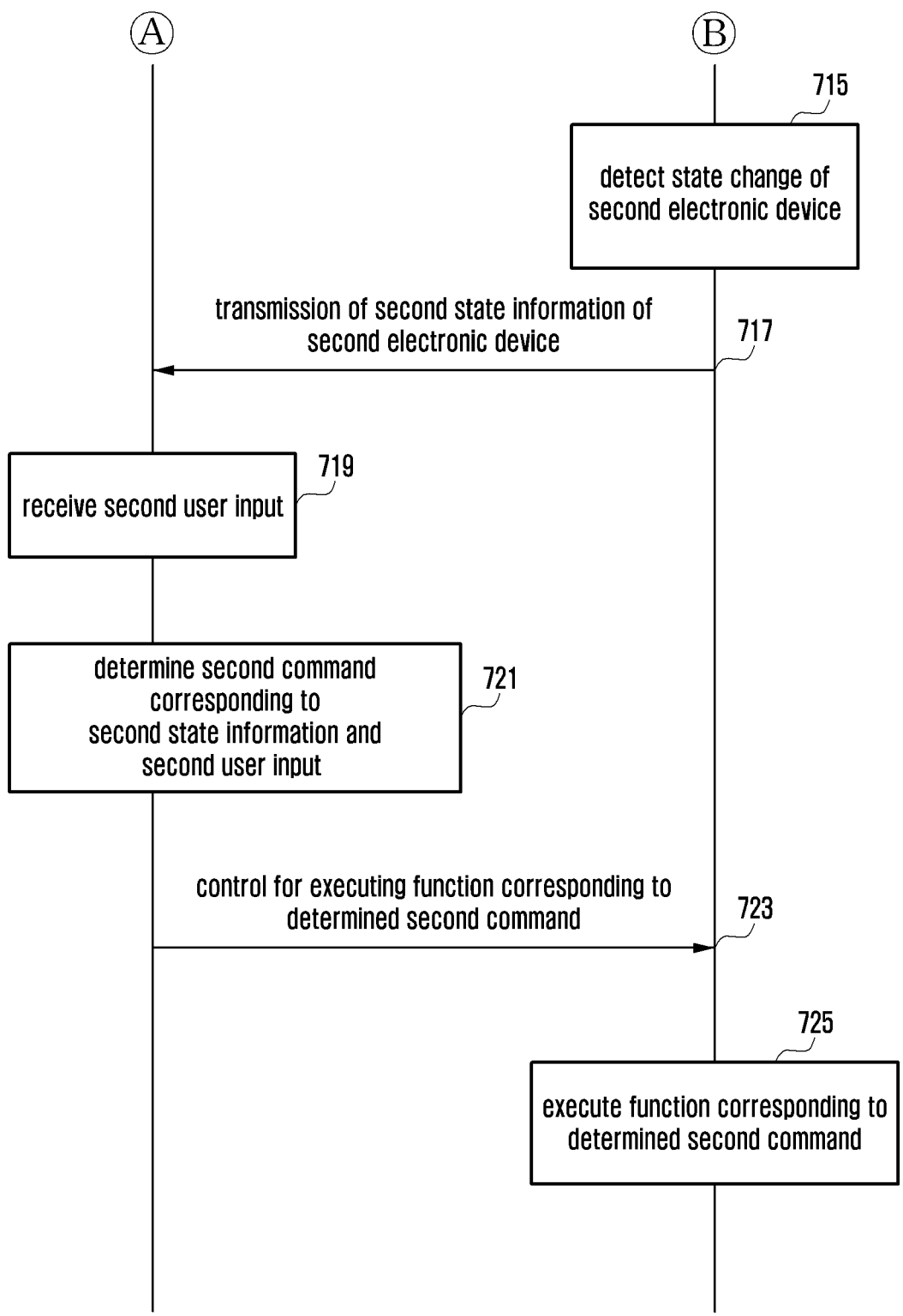

FIGS. 7A and 7B are a diagram illustrating a second embodiment related to an operation method 700 between the first electronic device (e.g., first electronic device 400 in FIG. 3) and the second electronic device (e.g., second electronic device 500 in FIG. 3) according to various embodiments of the disclosure.

According to various embodiments of the disclosure, at operation 701, the first electronic device 400 and the second electronic device 500 may perform pairing to transmit and receive data to and from each other. The first electronic device 400 and the second electronic device 500 may be paired through various wireless or wired communication means including Wi-Fi, Wi-Fi Direct, and Bluetooth.

According to various embodiments of the disclosure, at operation 703, the second electronic device 500 may transmit a signal for requesting execution of a user input mode using the first electronic device 400. For example, the second electronic device 500 may determine whether to execute the user input mode using the first electronic device 400 according to a user input performed by the user on the display or a user input utilizing a voice command agent. The second electronic device 500 may determine to execute the user input mode using the first electronic device 400, and transmit an execution request signal for the user input mode using the first electronic device 400 to the first electronic device 500.

According to various embodiments of the disclosure, after transmitting the signal requesting execution of the user input mode using the first electronic device 500, the second electronic device 500 may perform a series of preparation operations for the user input mode using the first electronic device 500. In response to receiving the request signal for executing the user input mode using the first electronic device 500, the first electronic device 400 may perform a series of preparation operations for the user input mode using the first electronic device 500.

According to various embodiments of the disclosure, although it is described at operation 703 that the second electronic device 500 transmits a signal for requesting execution of a user input mode using the first electronic device 400, the first electronic device 400 may transmit a signal for requesting execution of a user input mode using the first electronic device 400 to the second electronic device 500.

According to various embodiments of the disclosure, at operation 705, the second electronic device 500 may transmit first state information of the second electronic device 500 to the first electronic device 400. The first state information of the second electronic device 500 may include information indicating an application running on the second electronic device 500 or information indicating a function executed by the application. When an application is executed or when a function performed by a running application is changed, the second electronic device 500 may transmit second state information being the changed state information of the second electronic device 500 to the first electronic device 400.

According to various embodiments of the disclosure, at operation 707, the first electronic device 400 may receive a first user input. The first user input may be a user input for controlling an application running on the second electronic device 500 or a function that can be used in the running application (e.g., execution of a function or change of a function).

According to various embodiments of the disclosure, the first user input may indicate a user input for an arbitrary zone on the display 420. The arbitrary zone on the display 420 may indicate a region that is not specified in advance. According to various embodiments of the disclosure, the first electronic device 400 may receive a first user input for an unspecified arbitrary zone on the display 420. As the user can perform an input for an unspecified arbitrary zone on the display 420, the phenomenon in which the user's gaze is shifted from the first region where the user input is entered (e.g., first region 810 in FIG. 8) to the second region including at least one object for executing a desired function (e.g., second region 820 in FIG. 8) can be prevented, which can increase the work efficiency of the user.

According to various embodiments of the disclosure, the first user input may be sensed by various components of the first electronic device 400. For example, the display (e.g., display 420 in FIG. 4) of the first electronic device 400 may detect a first user input entered on the display 420. As another example, among various sensors included in the first electronic device 400 (e.g., sensor module 176 in FIG. 1), the proximity sensor, the gyro sensor, or the acceleration sensor may sense a user input causing movement of the first electronic device 400.

According to various embodiments of the disclosure, at operation 709, the first electronic device 400 may determine a first command corresponding to the state information of the second electronic device and the user input. The first command may indicate a command for controlling an application running on the second electronic device 500 or a function that can be used in the running application.

According to various embodiments of the disclosure, at operation 711, the first electronic device 400 may control the second electronic device 500 to execute a function corresponding to the determined first command.

According to various embodiments of the disclosure, at operation 713, the second electronic device 500 may execute a function corresponding to the first command determined by the first electronic device 400.

According to various embodiments of the disclosure, at operation 715, the second electronic device 500 may detect a change in the state of the second electronic device 500. The state change of the second electronic device 500 may indicate a state in which an application running on the second electronic device 500 is terminated and another application is executed, or a state in which a function being executed in a running application is terminated and another function is executed.

According to various embodiments of the disclosure, at operation 717, the second electronic device 500 may transmit second state information of the second electronic device 500 to the first electronic device 400. The second state information of the second electronic device 500 may include information indicating an application running on the second electronic device 500 or information indicating a function executed by the application. The second state information may be state information different from the first state information.

According to various embodiments of the disclosure, at operation 719, the first electronic device 400 may receive a second user input. The second user input may be a user input for controlling an application running on the second electronic device 500 or a function that can be used in the running application (e.g., execution of a function or change of a function).

According to various embodiments of the disclosure, the second user input may be sensed by various components of the first electronic device 400. For example, the display (e.g., display 420 in FIG. 4) of the first electronic device 400 may detect a second user input entered on the display 420. As another example, among various sensors included in the first electronic device 400 (e.g., sensor module 176 in FIG. 1), the proximity sensor, the gyro sensor, or the acceleration sensor may sense a second user input for changing the posture of the first electronic device 400.

According to various embodiments of the disclosure, at operation 721, the first electronic device 400 may determine a second command corresponding to the second state information and the second user input. The second command may indicate a command for controlling an application running on the second electronic device 500 or a function that can be used in the running application.

According to various embodiments of the disclosure, the first electronic device 400 may consider state information of the second electronic device 500, and thus may execute different commands even when the same user input is received. The first user input and the second user input received by the first electronic device 400 may be mapped to different commands according to state information of the second electronic device 400 even if they are the same user input.

With reference to Table 1, when the first state information includes a state in which the user performs a drawing input in a drawing application running on the second electronic device 500 and the second state information is a state in which the user selects an object in the drawing application running on the second electronic device 500, although identical user inputs (e.g., first user input and second user input for moving a finger in a first direction on the display (e.g., display 420 in FIG. 4)) are received, commands to be executed may be different. The command corresponding to the first state information and the first user input may be a command for undoing a previously performed operation, and the command corresponding to the second state information and the second user input may be a command for aligning objects.

According to various embodiments of the disclosure, the first electronic device 400 may control the second electronic device 500 in consideration of state information of the second electronic device 500. When the first electronic device 400 receives the same user input, functions executed on the second electronic device 500 may be different according to the state information of the second electronic device 500. Through this, the first electronic device 400 may select a function to be executed on the second electronic device 500 even if it does not receive a user input for selecting a function to be executed on the second electronic device 500. By receiving state information of the second electronic device 500, the first electronic device 400 may prevent a phenomenon in which the user's gaze is shifted from the first region 810 where the user input is entered to the second region 820 including at least one object for executing a desired function, increasing the work efficiency of the user.

According to various embodiments of the disclosure, at operation 723, the first electronic device 400 may control the second electronic device 500 to execute a function corresponding to the determined second command.

According to various embodiments of the disclosure, at operation 725, the second electronic device 500 may execute a function corresponding to the second command determined by the first electronic device 400.

FIGS. 8 to 20 are diagrams illustrating embodiments of the first electronic device and the second electronic device according to various embodiments of the disclosure.

FIG. 8 shows screens displayed by the first electronic device (e.g., first electronic device 400 in FIG. 3) and the second electronic device (e.g., second electronic device 500 in FIG. 3) according to various embodiments of the disclosure.

With reference to FIG. 8, the second electronic device 500 may display a first region 810 for receiving a user input and displaying a result corresponding to the user input, and a second region 820 for displaying one or more objects for controlling various functions of the second electronic device 500. The user may perform an input on the first region 810 and may perform an input on the second region 820 to control various functions of the second electronic device 500. For example, when the second electronic device 500 is running a drawing application, the user may perform a drawing input on the first region 810 and may perform an interaction with objects on the second region 820 to control various functions (e.g., various functions including changing colors, undoing, aligning, and changing character attributes) for controlling the drawing input.

According to various embodiments of the disclosure, while performing a user input on the first region 810, the user may select an object included in the second region 820 to change the function related to the user input. The action described above may cause a phenomenon in which the user's gaze is shifted from the first region 810 where user input is performed to the second region 820 including at least one object for executing a desired function. The action described above may cause a problem of interrupting task performance of the user and reducing the efficiency of the user input.

According to various embodiments of the disclosure, the first electronic device 400 may display a third region 830 for receiving a user input and displaying a result corresponding to the user input, and a fourth region 840 for displaying one or more objects for controlling various functions of the second electronic device 500. The fourth region 840 may be omitted according to the user's intention.

According to various embodiments of the disclosure, the first electronic device 400 may receive a user input for an arbitrary zone on the third region 830, and may determine a command for controlling the second electronic device 500 based on the state information of the second electronic device 500 received from the second electronic device 500 and the user input received from the first electronic device 400. The first electronic device 400 may transmit the determined command to the second electronic device 500. The arbitrary zone on the display 420 may indicate a region that is not specified in advance. According to various embodiments of the disclosure, the first electronic device 400 may receive a user input for an unspecified arbitrary zone on the display 420. As the user can perform an input for an unspecified arbitrary zone on the display 420, the phenomenon in which the user's gaze is shifted from the first region 810 where the user input is entered to the second region 820 including at least one object for executing a desired function can be prevented, which can increase the work efficiency of the user.

Figure 9A:
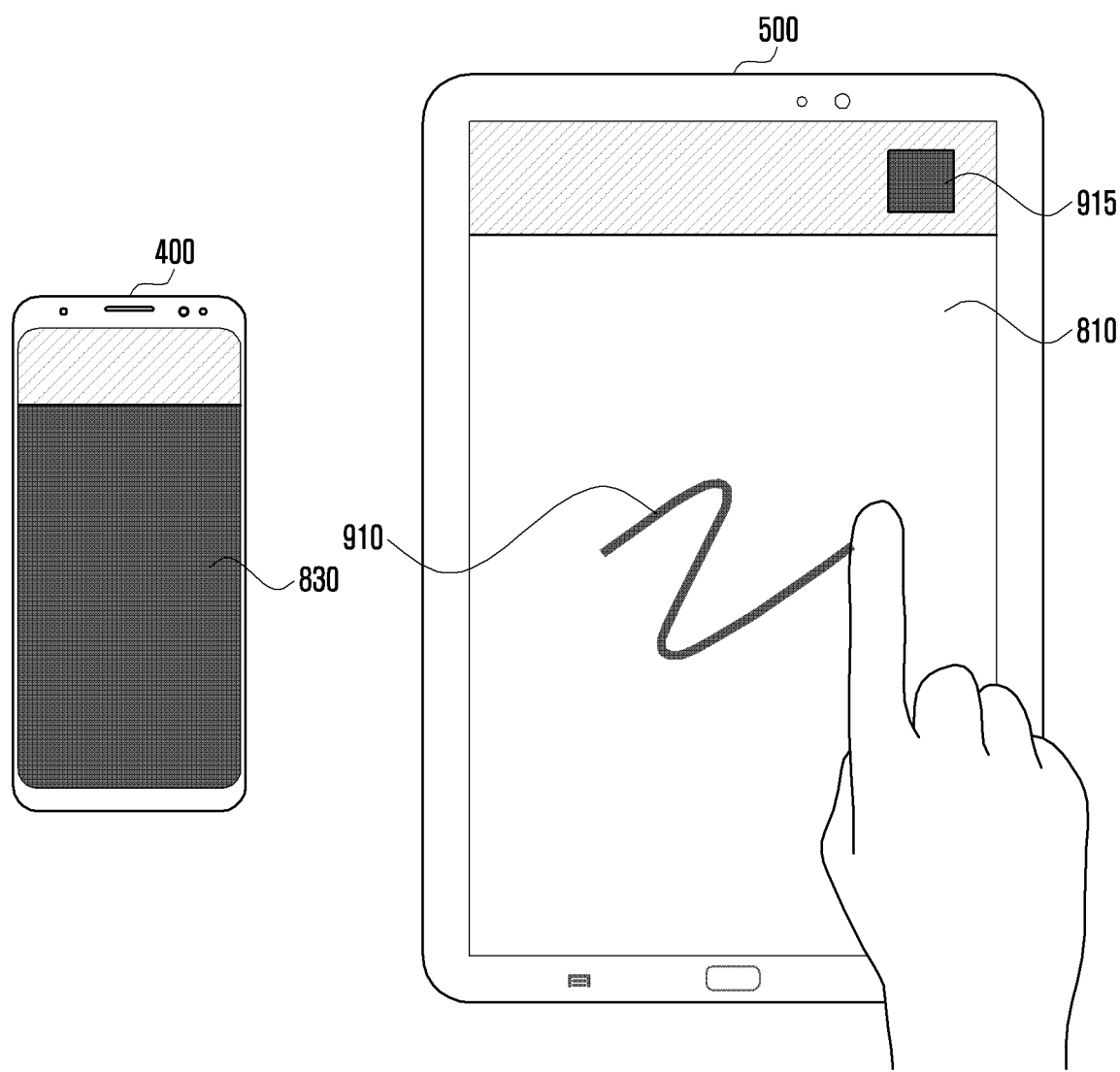
Figure 9B:
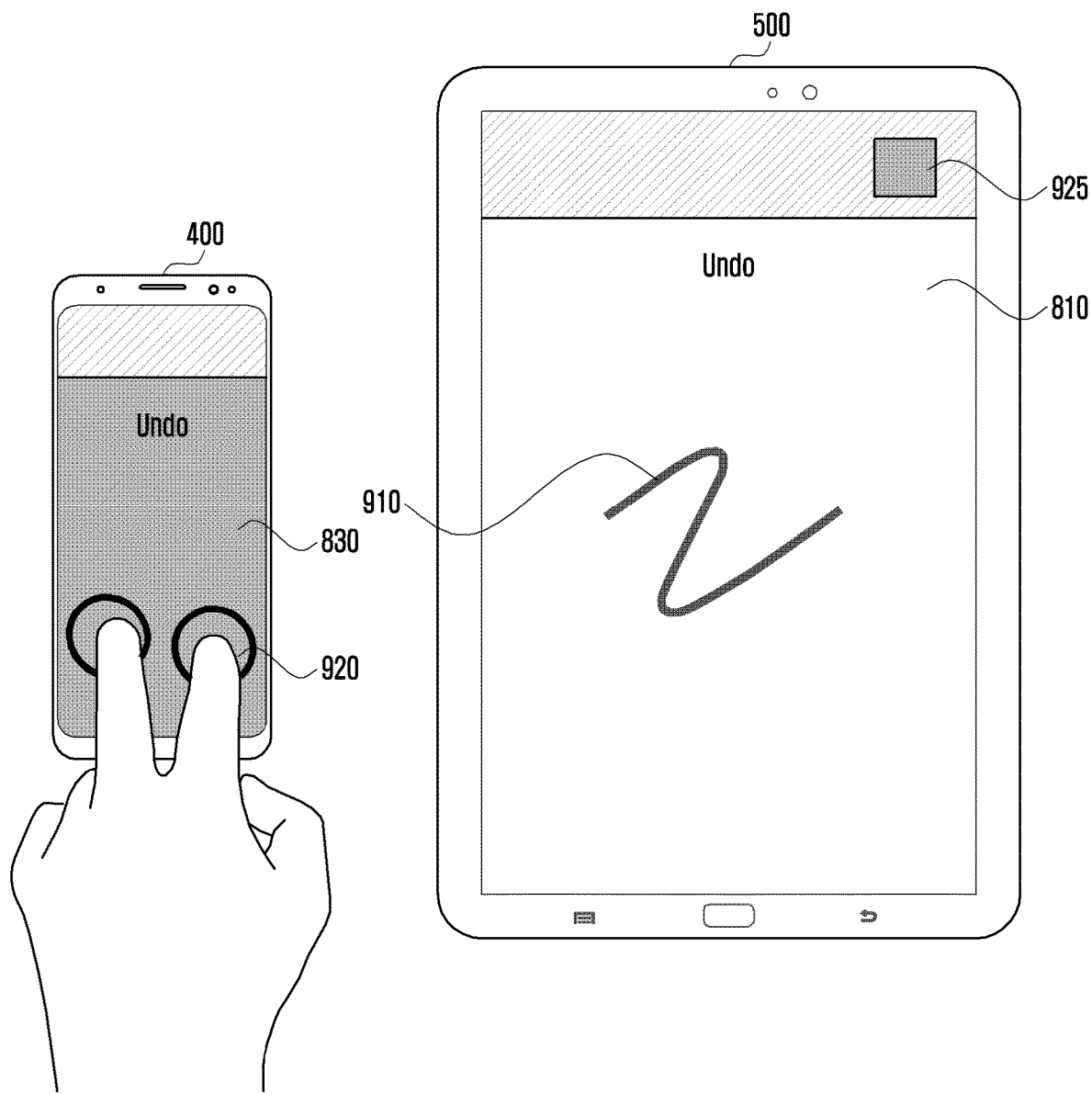
Figure 9C:
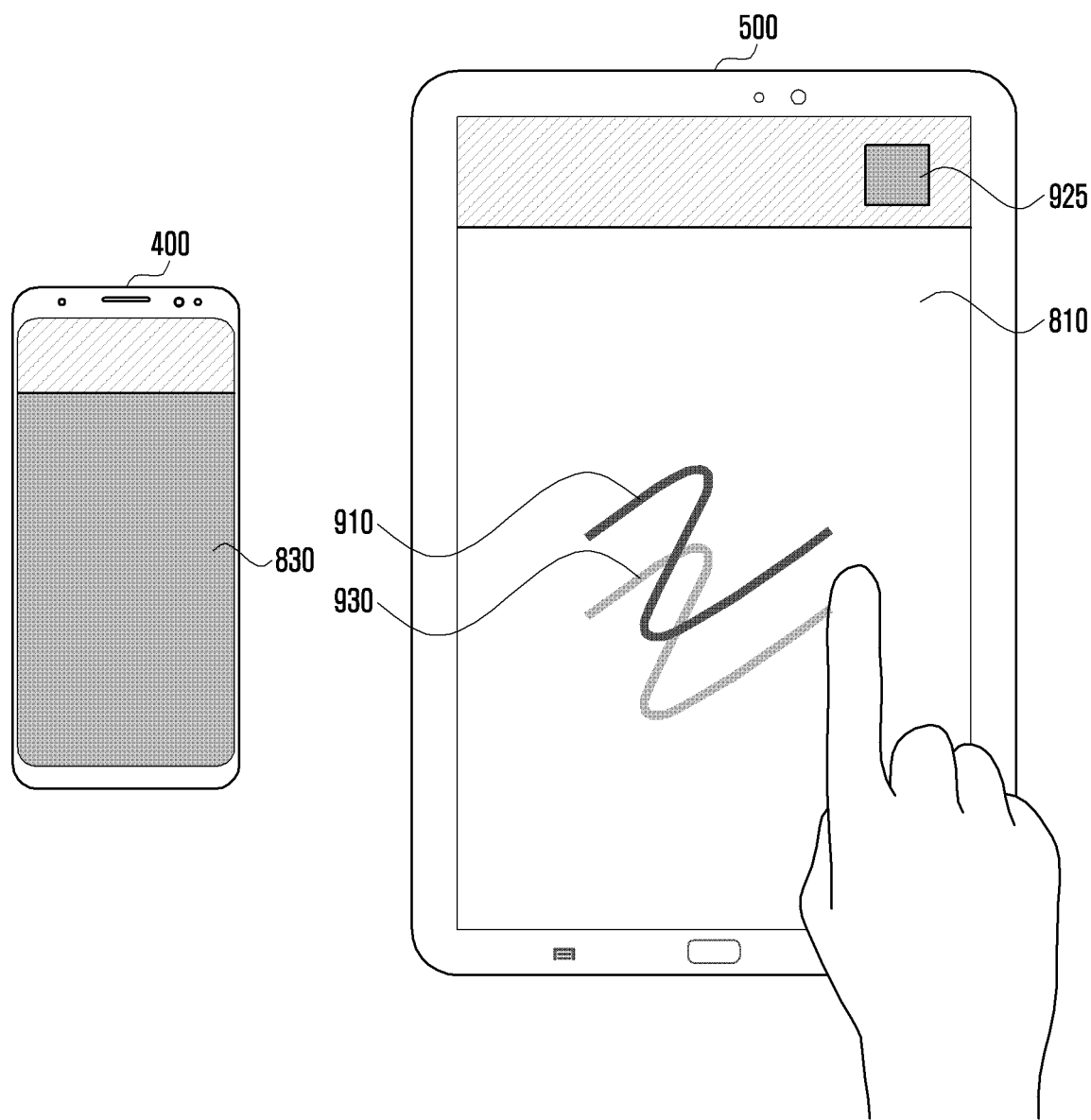

FIGS. 9A to 9C are diagrams illustrating an embodiment of an input mode using the first electronic device 400.

With reference to FIG. 9A, while executing a drawing application, the second electronic device 500 may receive a user input for performing drawing and display a result 910 corresponding to the user input.

According to various embodiments of the disclosure, the first electronic device 400 may receive state information of the second electronic device 500 (executing drawing application and performing drawing input mode).

With reference to FIG. 9B, the first electronic device 400 may receive a user input 920 on an arbitrary zone of the third region 830 (e.g., two-finger touch on an arbitrary zone of the third region 830).

According to various embodiments of the disclosure, the first electronic device 400 may determine a command for a function to be executed on the second electronic device 500 based on the state information of the second electronic device 500 received from the second electronic device 500 and the user input 920, and may control the second electronic device 500 to execute the function corresponding to the determined command. The second electronic device 500 may execute a function corresponding to the determined command. The function corresponding to the determined command may be a function of drawing a line with a second color changed from a first color. With reference to FIG. 9C, it can be seen that the result 930 of the drawing performed by the user on the first region 810 is a change from the first color to the second color.

According to various embodiments of the disclosure, the second electronic device 500 may output an indicator indicating the function corresponding to a command. With reference to FIG. 9A, an indicator 915 indicating a first color may be displayed. With reference to FIGS. 9B and 9C, the second electronic device 500 may display an indicator 925 indicating the function corresponding to a command (change to a second color).

Figure 10A:
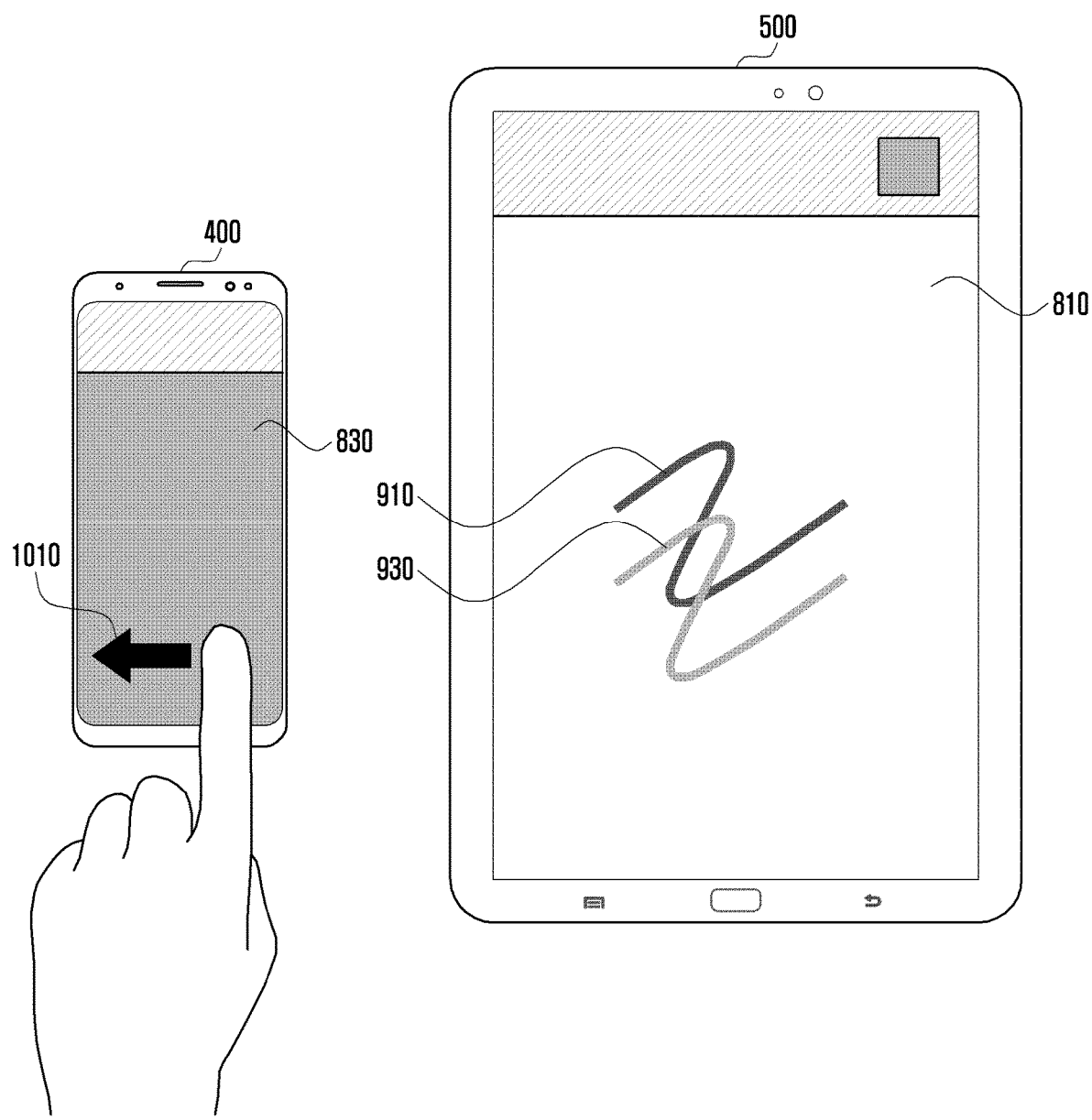
Figure 10B:
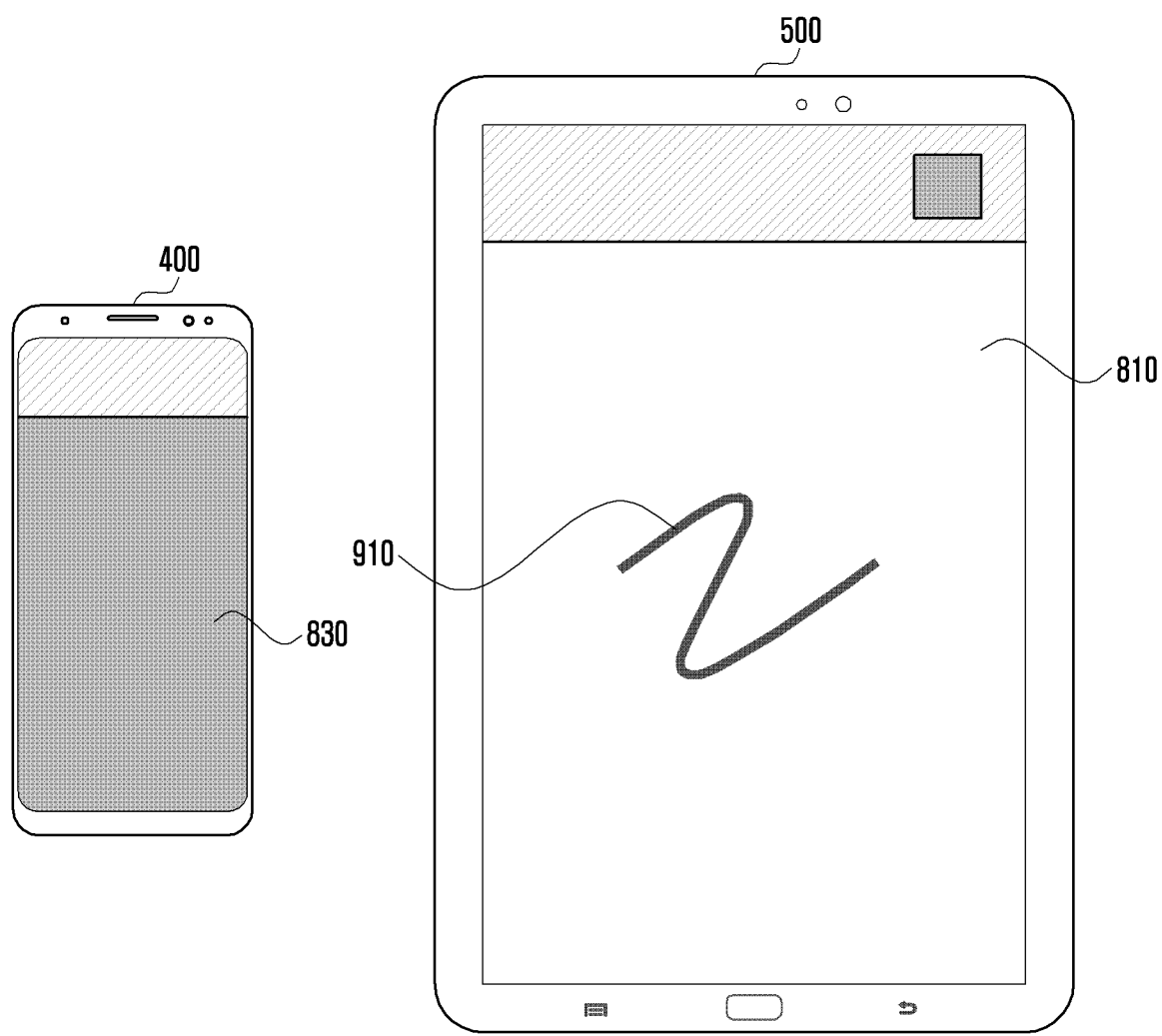

FIGS. 10A and 10B are diagrams illustrating another embodiment of an input mode using the first electronic device 400.

FIGS. 10A and 10B are depicted on the assumption that the action shown in FIG. 9C has been performed.

With reference to FIG. 10A, the first electronic device 400 may receive a user input 1010 (e.g., swipe input of moving a finger in a first direction) on an arbitrary zone of the third region 830. The first electronic device 400 may determine a command for a function to be executed on the second electronic device 500 based on the state information of the second electronic device 500 (e.g., performing drawing input mode) and the user input 1010, and may control the second electronic device 500 to execute the function corresponding to the determined command. The second electronic device 500 may execute a function corresponding to the determined command. With reference to FIG. 9, the function corresponding to the determined command may be a function of undoing a previously executed operation. With reference to FIG. 10B, it can be seen that the result 930 of the drawing performed by the user on the first region 810 is undone.

Figure 11A:
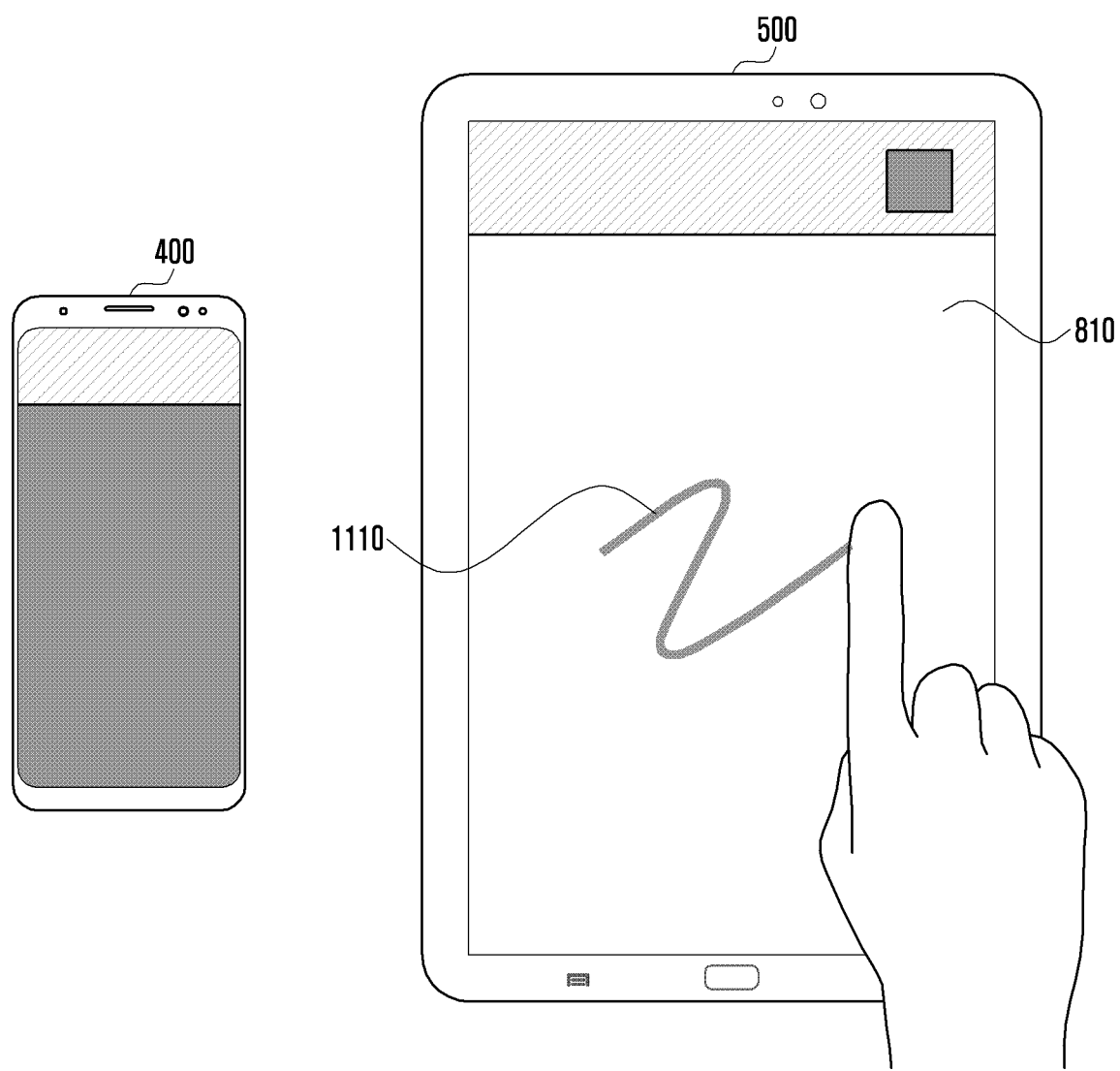
Figure 11B:
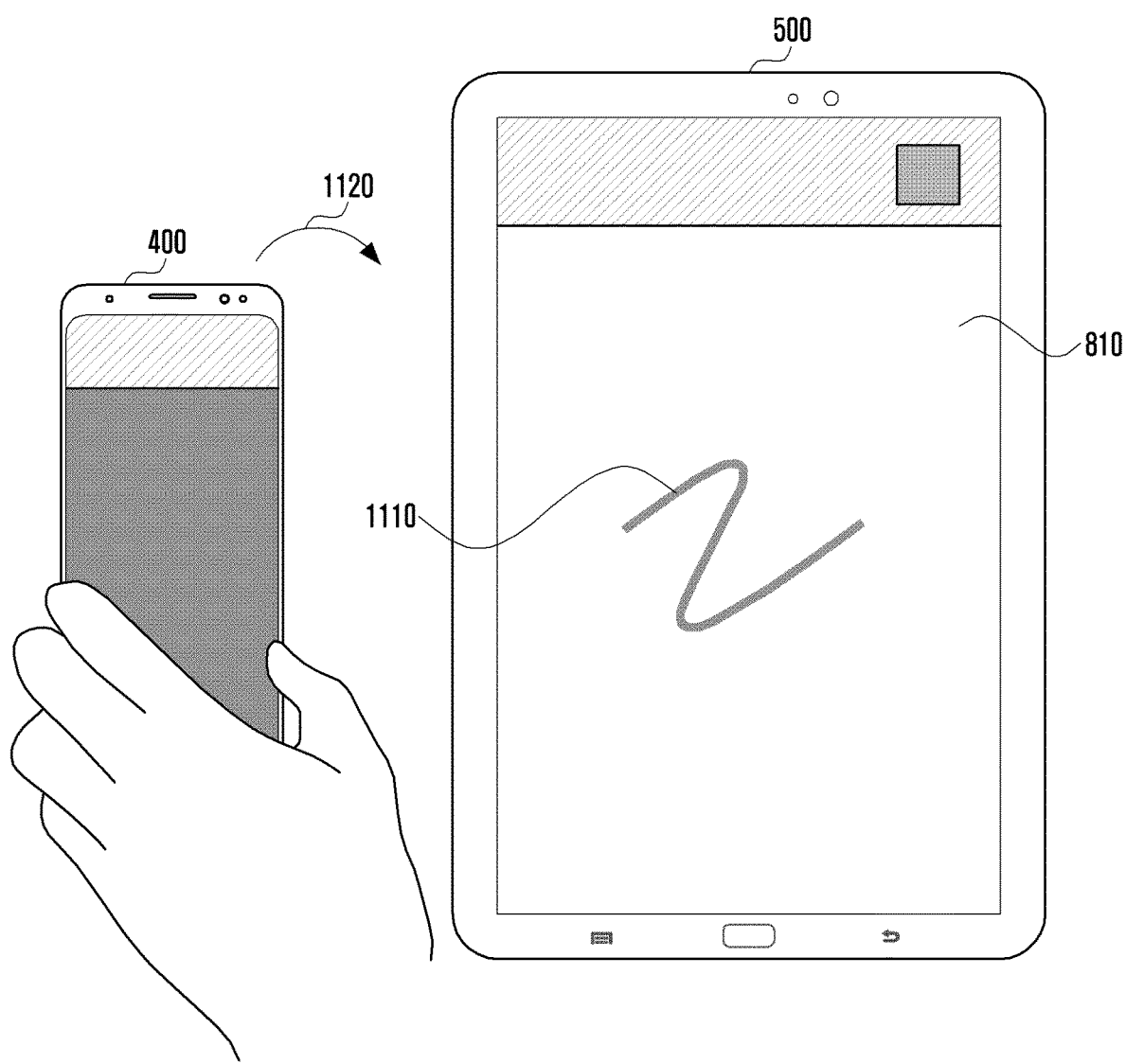
Figure 11C:
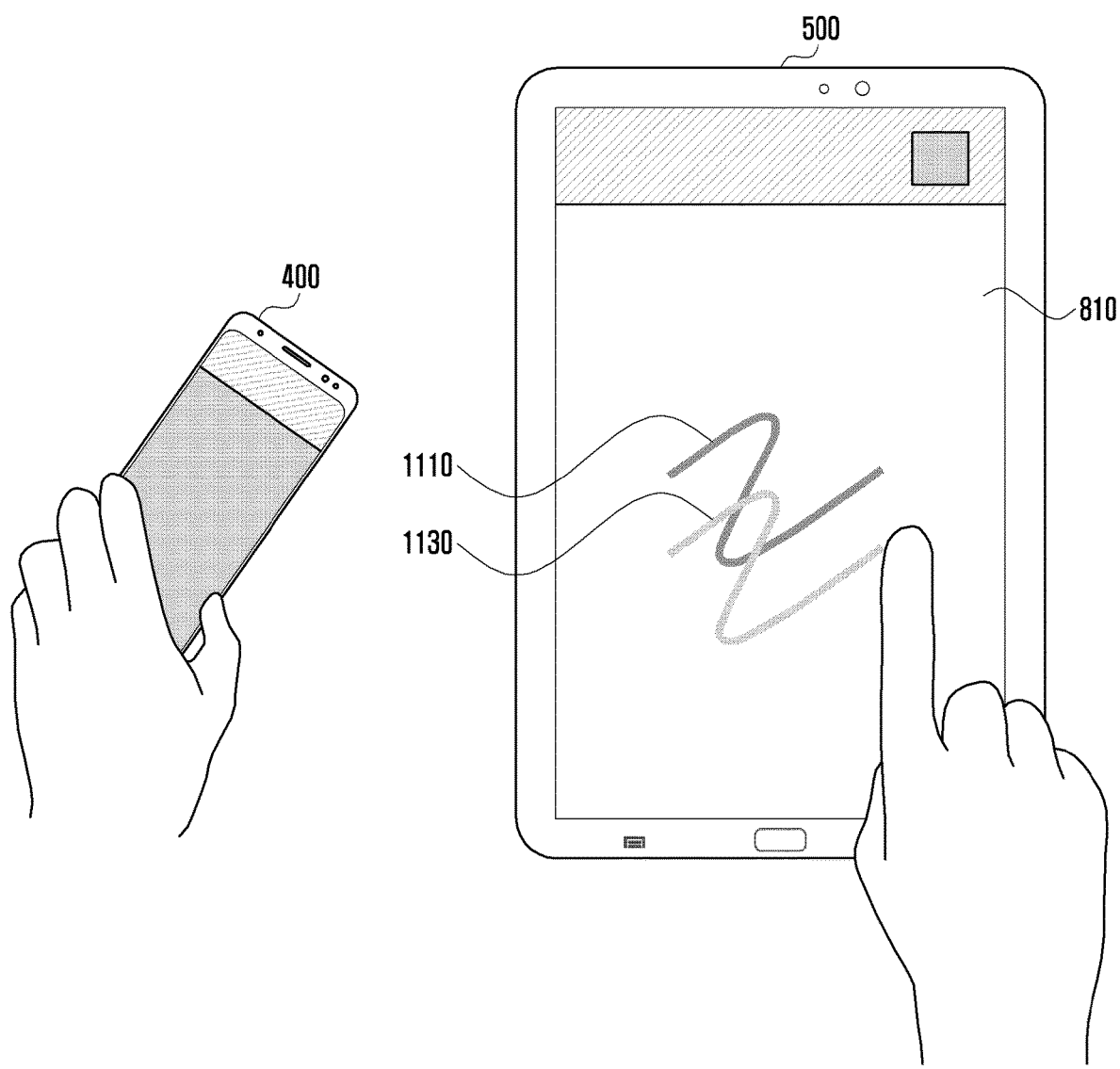

FIGS. 11A to 11C are diagrams illustrating another embodiment of an input mode using the first electronic device 400.

With reference to FIG. 11A, while executing a drawing application, the second electronic device 500 may receive a user input for performing drawing and display a result 1110 corresponding to the user input.

According to various embodiments of the disclosure, the first electronic device 400 may receive state information of the second electronic device 500 (executing drawing application and performing drawing input mode).

With reference to FIG. 11B, the first electronic device 400 may receive a user input 1120 for rotating the first electronic device 400. The first electronic device 400 may detect whether the first electronic device 400 is rotated and the degree of rotation of the first electronic device 400 by using the gyro sensor of the first electronic device 400.

According to various embodiments of the disclosure, the first electronic device 400 may determine a command for a function to be executed on the second electronic device 500 based on the state information of the second electronic device 500 and the user input 1120, and may control the second electronic device 500 to execute the function corresponding to the determined command. The second electronic device 500 may execute a function corresponding to the determined command. The function corresponding to the determined command may be a function of drawing a line with a second color changed from a first color. With reference to FIG. 11C, it can be seen that the result 1130 of the drawing performed by the user on the first region 810 is a change from the first color to the second color.

According to various embodiments of the disclosure, the first electronic device 400 may determine the color to be changed according to the degree of rotation of the first electronic device 400. For example, the first electronic device 400 may increase the saturation of the previous color in proportion to the degree of rotation.

Figure 12A:
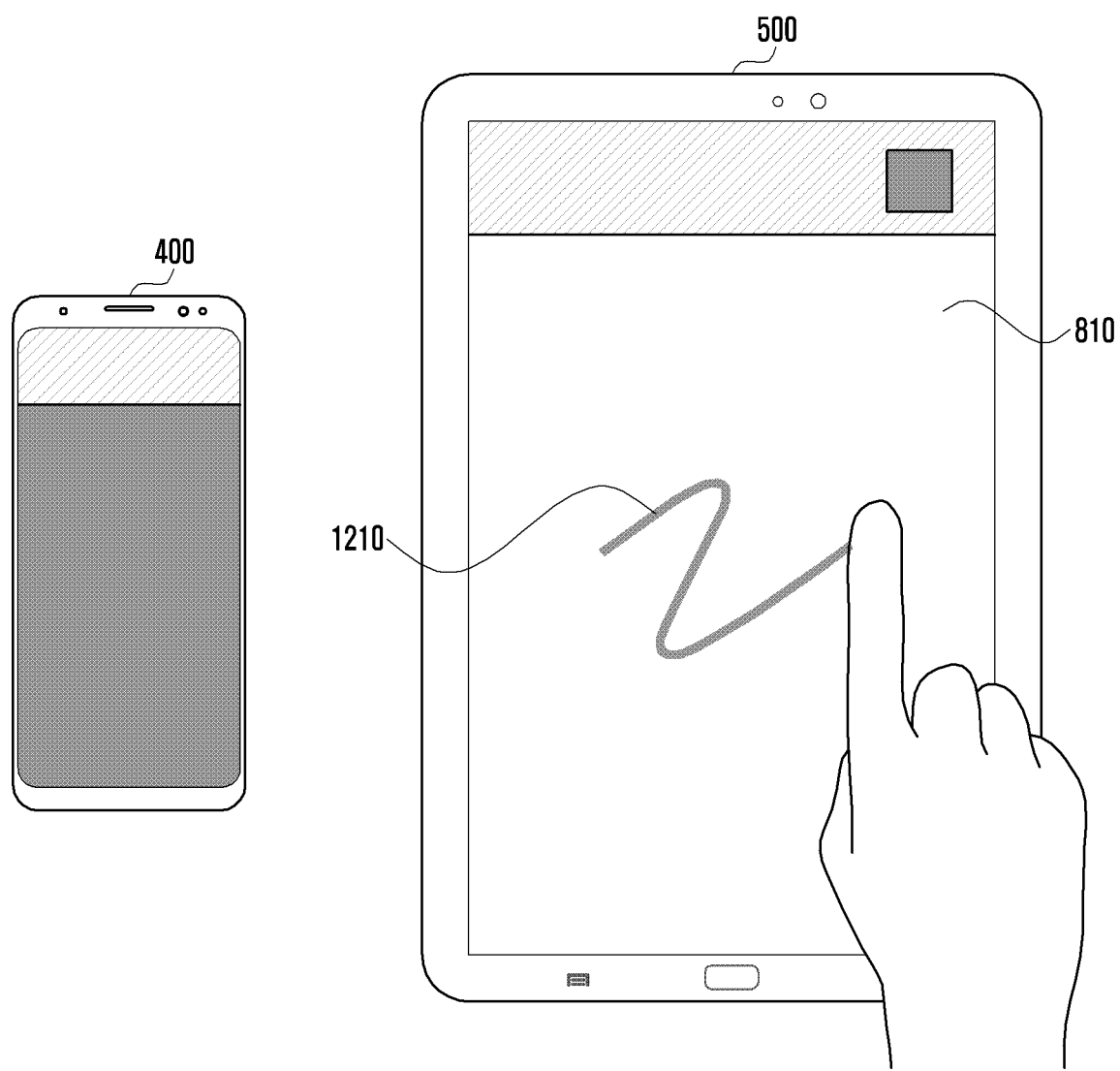
Figure 12B:
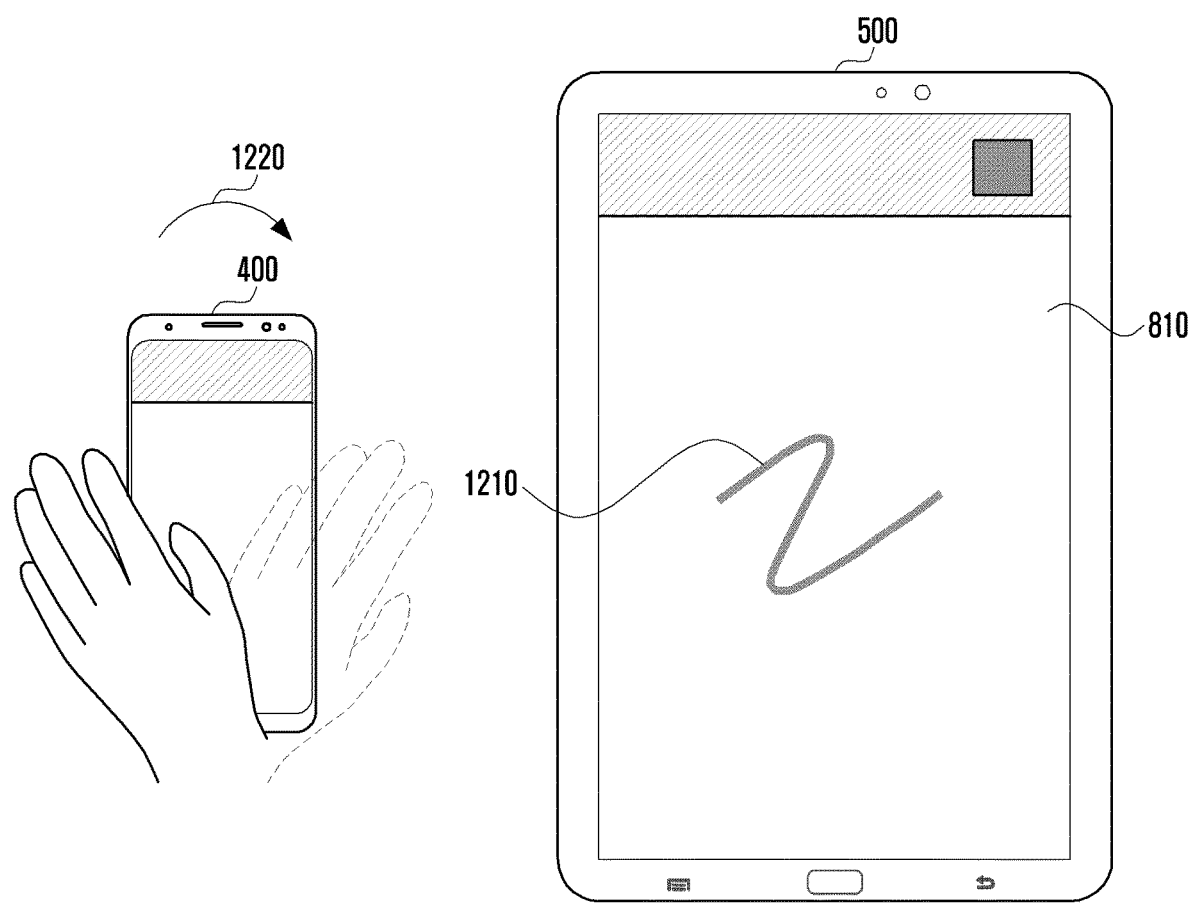
Figure 12C:
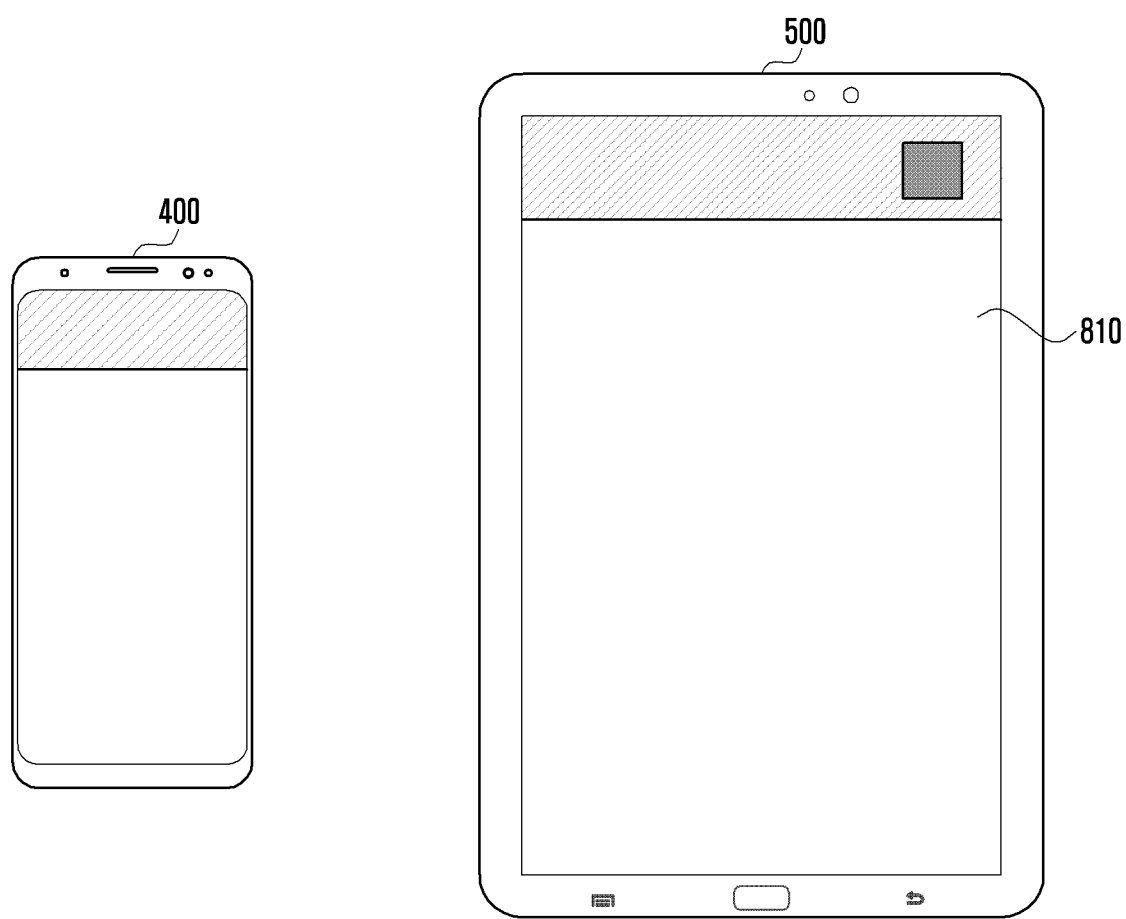

FIGS. 12A to 12C are diagrams illustrating another embodiment of an input mode using the first electronic device 400.

With reference to FIG. 12A, while executing a drawing application, the second electronic device 500 may receive a user input for performing drawing and display a result 1210 corresponding to the user input.

According to various embodiments of the disclosure, the first electronic device 400 may receive state information of the second electronic device 500 (executing drawing application and performing drawing input mode).

With reference to FIG. 12B, the first electronic device 400 may receive a user's gesture input 1220 on the first electronic device 400. The first electronic device 400 may receive the user's gesture input 1220 by using the proximity sensor of the first electronic device 400.

According to various embodiments of the disclosure, the first electronic device 400 may determine a command for a function to be executed on the second electronic device 500 based on the state information of the second electronic device 500 and the user input 1220, and may control the second electronic device 500 to execute the function corresponding to the determined command. The second electronic device 500 may execute a function corresponding to the determined command. The function corresponding to the determined command may be a function of removing the result corresponding to the user input. With reference to FIG. 12C, it can be seen that the result 1210 corresponding to the user input has been removed.

Figure 13A:
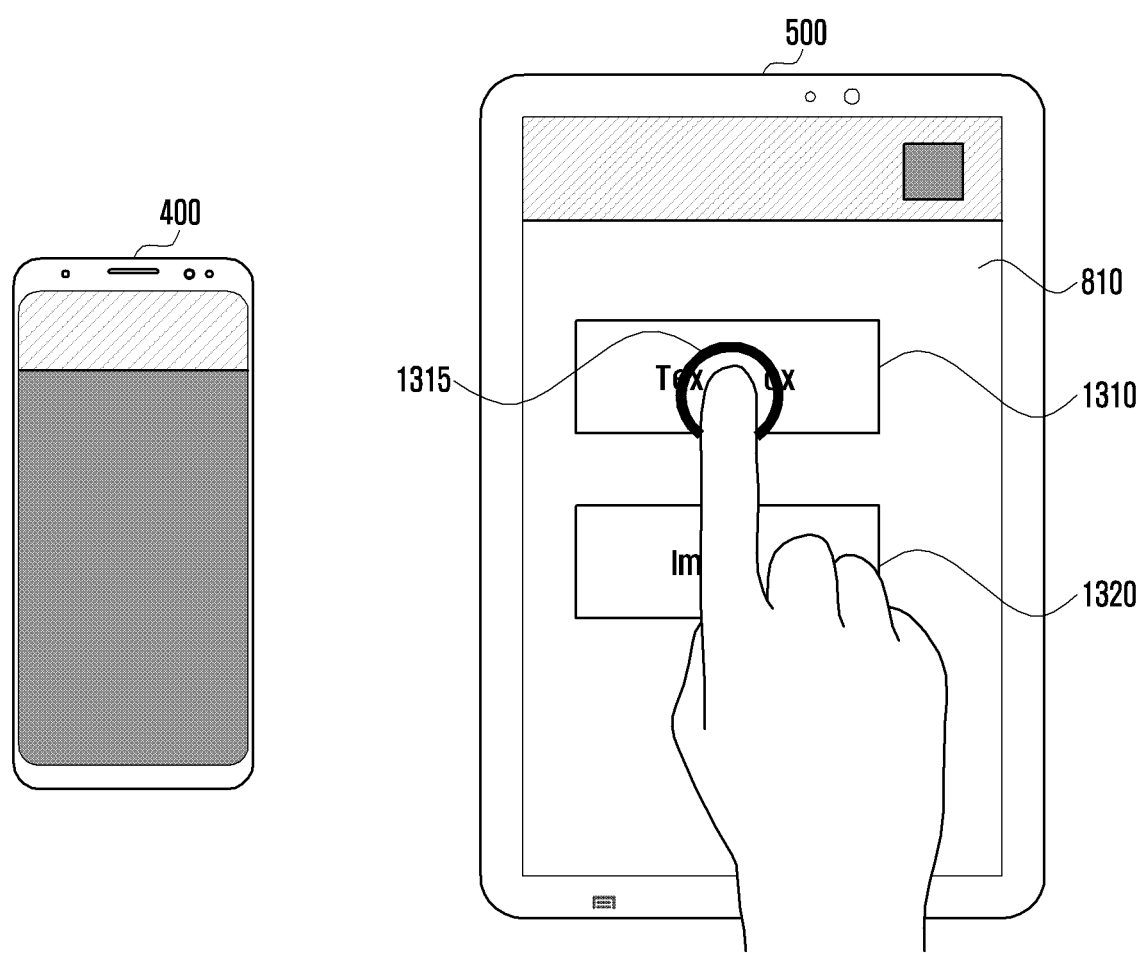
Figure 13B:
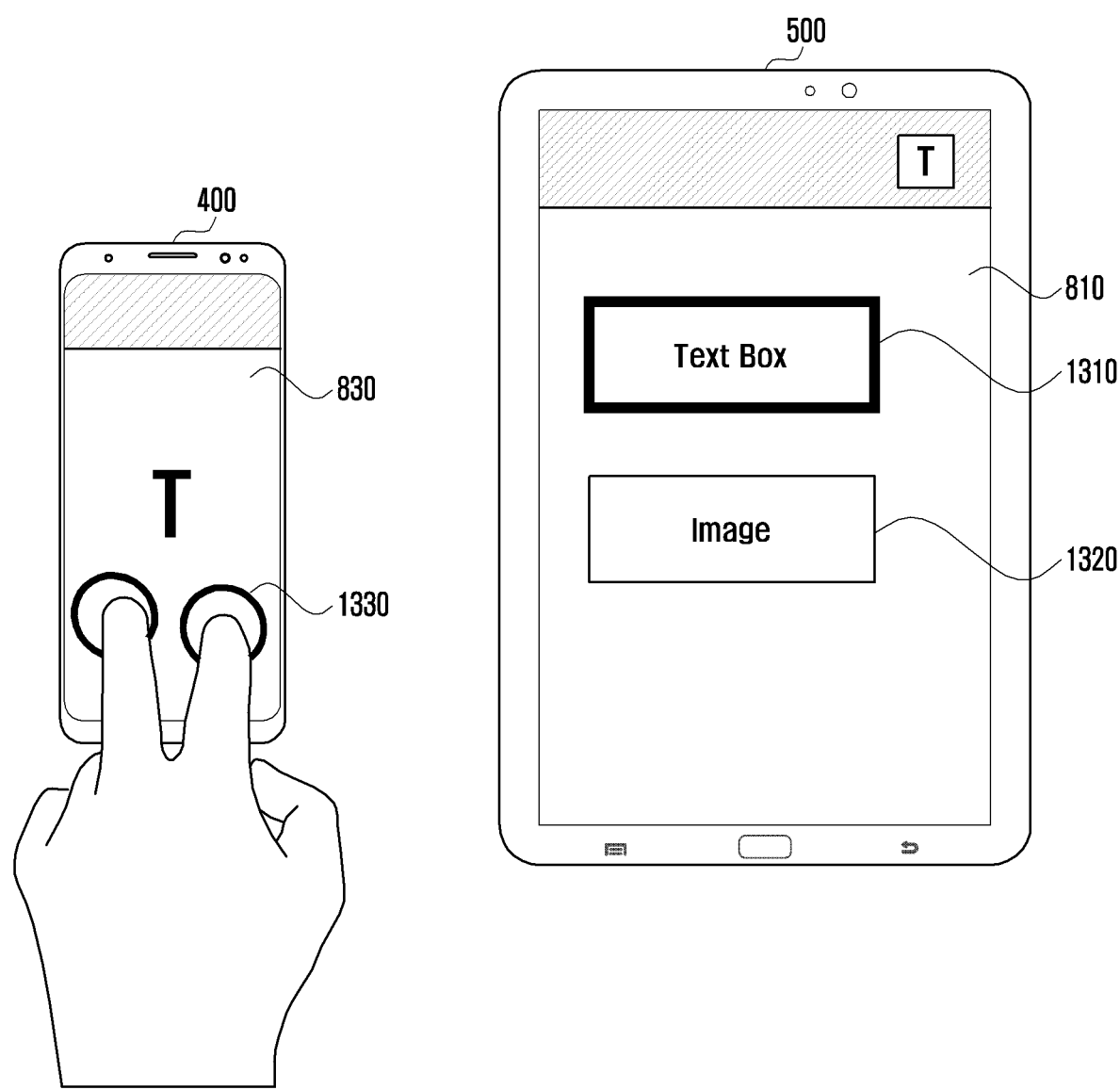
Figure 13C:
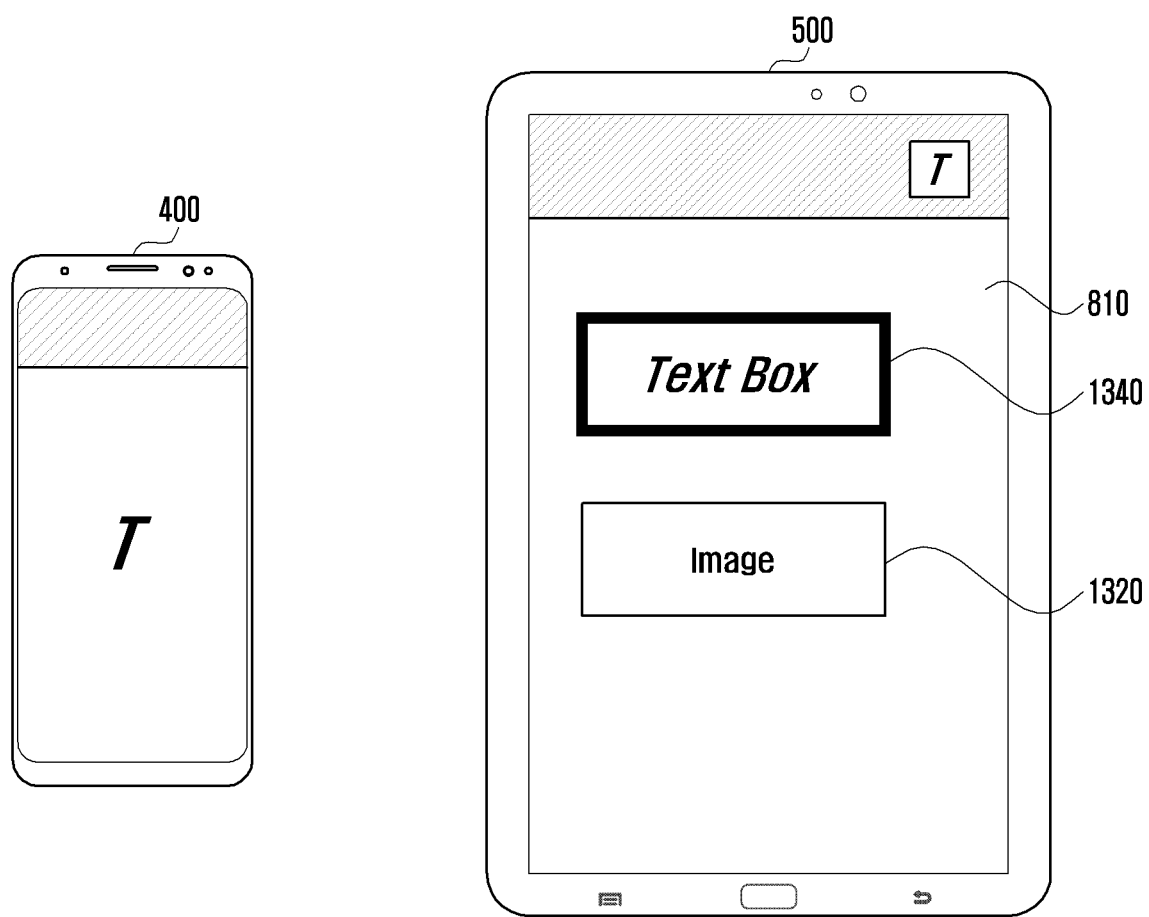

FIGS. 13A to 13C are diagrams illustrating another embodiment of an input mode using the first electronic device 400.

With reference to FIG. 13A, while executing a drawing application, the second electronic device 500 may receive a user input for selecting one of a plurality of objects 1310 and 1320 displayed on the first region 810.

According to various embodiments of the disclosure, the first electronic device 400 may receive state information of the second electronic device 500 (executing drawing application and performing object selection mode).

With reference to FIG. 13B, the first electronic device 400 may receive a user input 1330 on an arbitrary zone of the third region 830 (e.g., two-finger touch on an arbitrary zone of the third region 830).

According to various embodiments of the disclosure, the first electronic device 400 may determine a command for a function to be executed on the second electronic device 500 based on the state information of the second electronic device 500 received from the second electronic device 500 and the user input 1330, and may control the second electronic device 500 to execute the function corresponding to the determined command. The second electronic device 500 may execute a function corresponding to the determined command. The function corresponding to the determined command may be a function of changing the shape of characters in the currently selected object 1310. With reference to FIG. 13C, it can be seen that the shape of the characters in the object 1310 displayed on the first region 810 has been changed.

Figure 14A:
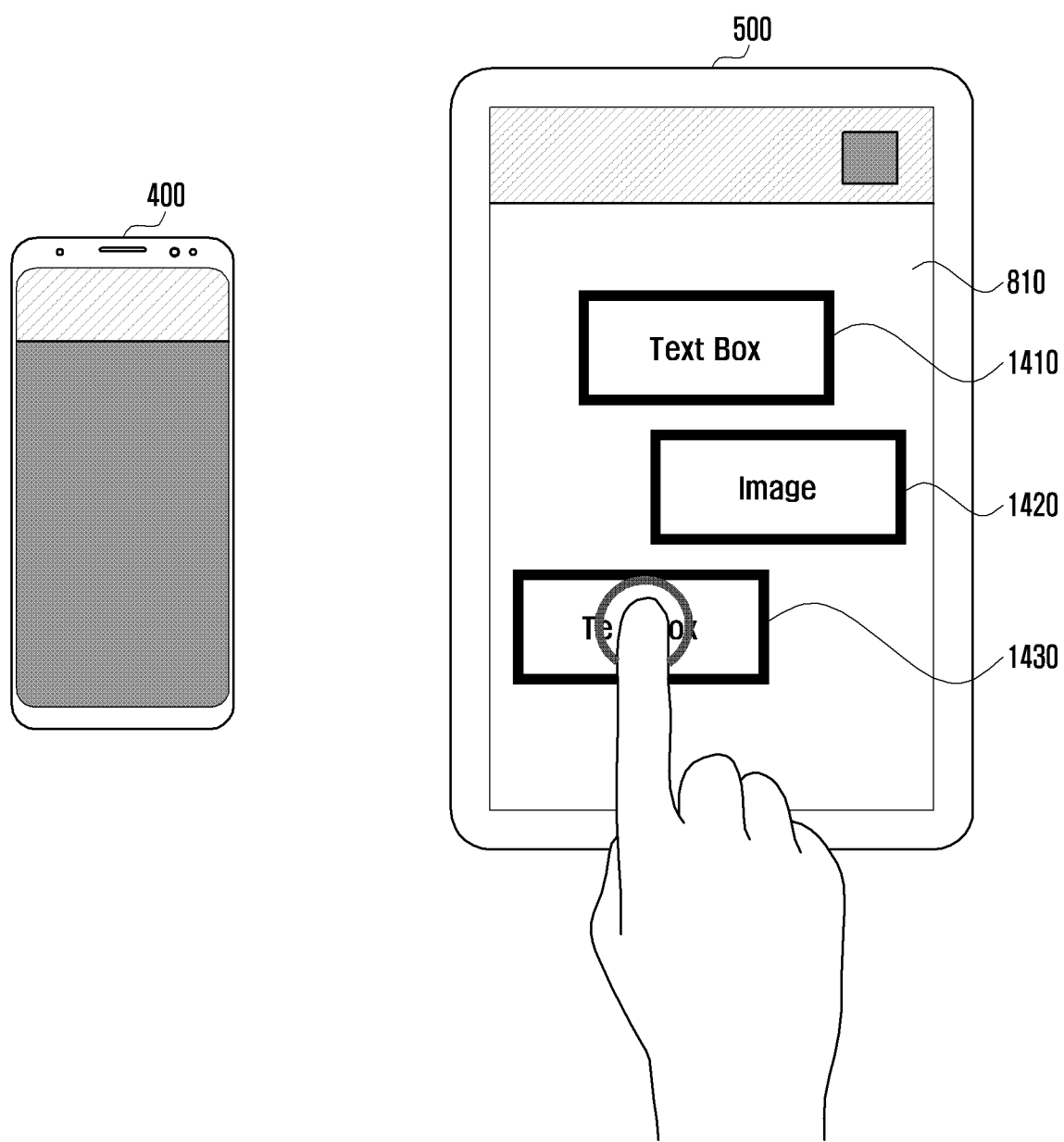
Figure 14B:
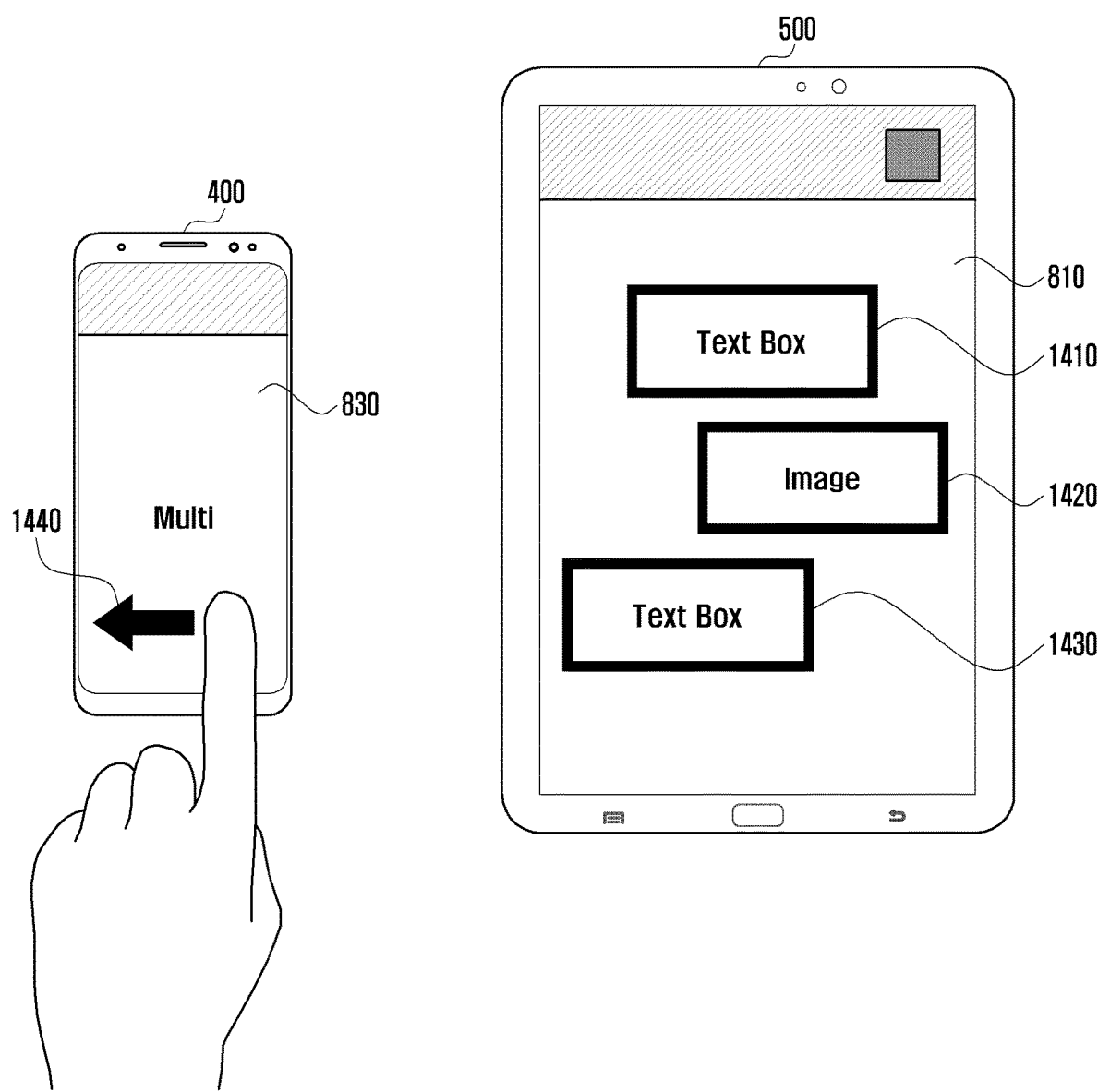
Figure 14C:
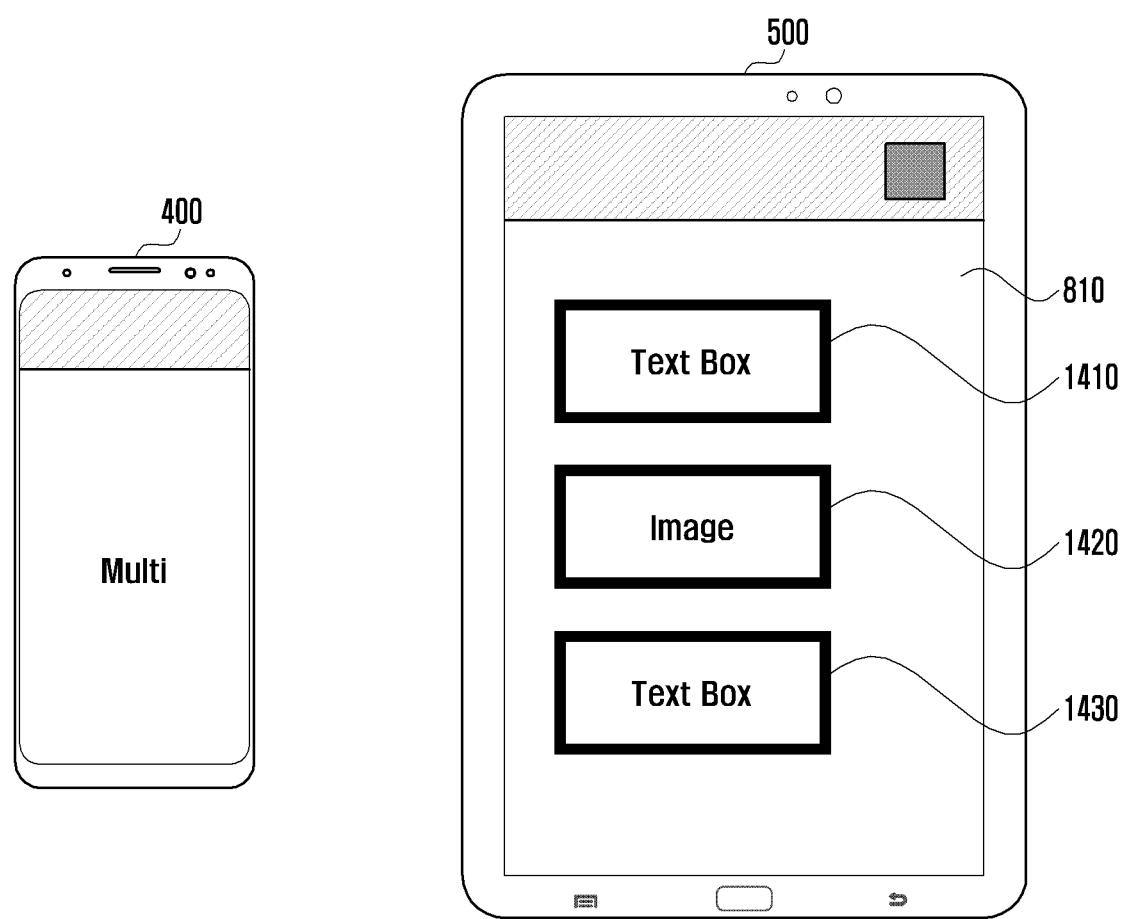

FIGS. 14A to 14C are diagrams illustrating another embodiment of an input mode using the first electronic device 400.

With reference to FIG. 14A, while executing a drawing application, the second electronic device 500 may receive a user input for selecting two or more objects 1410, 1420 and 1430 from among a plurality of objects 1410, 1420 and 1430 displayed on the first region 810.

According to various embodiments of the disclosure, the first electronic device 400 may receive state information of the second electronic device 500 (executing drawing application and performing object selection mode).

With reference to FIG. 14B, the first electronic device 400 may receive a user input 1440 on an arbitrary zone of the third region 830 (e.g., swipe input by moving a finger in a first direction).

According to various embodiments of the disclosure, the first electronic device 400 may determine a command for a function to be executed on the second electronic device 500 based on the state information of the second electronic device 500 received from the second electronic device 500 and the user input 1440, and may control the second electronic device 500 to execute the function corresponding to the determined command. The second electronic device 500 may execute a function corresponding to the determined command. The function corresponding to the determined command may be a function of aligning the currently selected objects 1410, 1420 and 1430. With reference to FIG. 14C, it can be seen that the objects 1410, 1420 and 1430 displayed on the first region 810 are aligned.

FIGS. 15A to 15D are diagrams illustrating another embodiment of an input mode using the first electronic device 400 according to various embodiments of the disclosure.

With reference to FIG. 15A, while executing a drawing application, the second electronic device 500 may receive a user input for performing drawing and display a result 1510 corresponding to the user input.

According to various embodiments of the disclosure, the first electronic device 400 may receive state information of the second electronic device 500 (executing drawing application and performing drawing input mode) received from the second electronic device 500.

With reference to FIG. 15B, the first electronic device 400 may receive a user input 1520 on an arbitrary zone of the display 420 of the first electronic device 400 (e.g., two-finger touch on an arbitrary zone of the third region 830).

According to various embodiments of the disclosure, the first electronic device 400 may determine a command for a function to be executed on the second electronic device 500 based on the state information of the second electronic device 500 received from the second electronic device 500 and the user input 1520, and may control the second electronic device 500 to execute the function corresponding to the determined command. The second electronic device 500 may execute a function corresponding to the determined command. The function corresponding to the determined command may be a function of drawing a line with a second color changed from a first color. With reference to FIG. 15C, it can be seen that the result 1530 of the drawing performed by the user on the first region 810 is a change from the first color to the second color.

According to various embodiments of the disclosure, the first electronic device 400 may control the second electronic device 500 to change the drawing result from the first color to the second color while the user input 1520 is maintained. When the user input 1520 is ended, the drawing may be changed from the second color to the first color. With reference to FIG. 15D, it can be seen that the result 1540 of the drawing performed by the user on the first region 810 is a change from the second color to the first color after the user input 1520 is ended.

According to various embodiments of the disclosure, the first electronic device 400 may receive a user input on an arbitrary zone of the display 420 of the first electronic device 400 (e.g., one-finger touch on an arbitrary zone of the third region 830). The first electronic device 400 may determine a command for a function to be executed on the second electronic device 500 based on the state information of the second electronic device 500 and the user input, and may control the second electronic device 500 to execute the function corresponding to the determined command. The second electronic device 500 may execute a function corresponding to the determined command. The function corresponding to the determined command may be a function of changing from a ballpoint pen tool to a brush tool.

According to various embodiments of the disclosure, the first electronic device 400 may receive a user input on an arbitrary zone of the display 420 of the first electronic device 400 (e.g., three-finger touch on an arbitrary zone of the third region 830). The first electronic device 400 may determine a command for a function to be executed on the second electronic device 500 based on the state information of the second electronic device 500 and the user input, and may control the second electronic device 500 to execute the function corresponding to the determined command. The second electronic device 500 may execute a function corresponding to the determined command. The function corresponding to the determined command may be to execute a cutting function.

FIGS. 16A to 16D are diagrams illustrating another embodiment of an input mode using the first electronic device 400 according to various embodiments of the disclosure.

According to various embodiments of the disclosure, in the input mode using the first electronic device 400, the function may be continuously switched according to user input entered on the first electronic device 400.

With reference to FIG. 16A, while executing a drawing application, the second electronic device 500 may receive a user input for performing drawing and display a result 1610 corresponding to the user input.

According to various embodiments of the disclosure, the first electronic device 400 may receive state information of the second electronic device 500 (executing drawing application and performing drawing input mode) from the second electronic device 500.

With reference to FIG. 16B, the first electronic device 400 may receive a user input 1620 on an arbitrary zone of the display 420 of the first electronic device 400 (e.g., one-finger touch on an arbitrary zone of the display 420).

According to various embodiments of the disclosure, the first electronic device 400 may determine a command for a function to be executed on the second electronic device 500 based on the state information of the second electronic device 500 and the user input 1520, and may control the second electronic device 500 to execute the function corresponding to the determined command. The second electronic device 500 may execute a function corresponding to the determined command. The function corresponding to the determined command may be a function of changing from a ballpoint pen tool to a brush tool. With reference to FIG. 16B, it can be seen that the result 1630 of the drawing performed by the user on the first region 810 is a result 1630 of drawing with a brush tool.

With reference to FIG. 16C, the first electronic device 400 may receive a user input 1640 on an arbitrary zone of the display 420 of the first electronic device 400 (e.g., two-finger touch on an arbitrary zone of the display 420).

According to various embodiments of the disclosure, the first electronic device 400 may determine a command for a function to be executed on the second electronic device 500 based on the state information of the second electronic device 500 received from the second electronic device 500 and the user input 1640, and may control the second electronic device 500 to execute the function corresponding to the determined command. The second electronic device 500 may execute a function corresponding to the determined command. The function corresponding to the determined command may be a function of drawing a line with a second color changed from a first color. With reference to FIG. 16C, it can be seen that the result 1650 of the drawing performed by the user on the first region 810 is a change from the first color to the second color.

With reference to FIG. 16D, the first electronic device 400 may receive a user input 1660 on an arbitrary zone of the display 420 of the first electronic device 400 (e.g., three-finger touch on an arbitrary zone of the display 420).

According to various embodiments of the disclosure, the first electronic device 400 may determine a command for a function to be executed on the second electronic device 500 based on the state information of the second electronic device 500 received from the second electronic device 500 and the user input 1660, and may control the second electronic device 500 to execute the function corresponding to the determined command. The second electronic device 500 may execute a function corresponding to the determined command. The function corresponding to the determined command may be to execute a cutting function. With reference to FIG. 16D, it can be seen that the user is performing a cutting function on the first region 810 (1670).

Figure 17C:
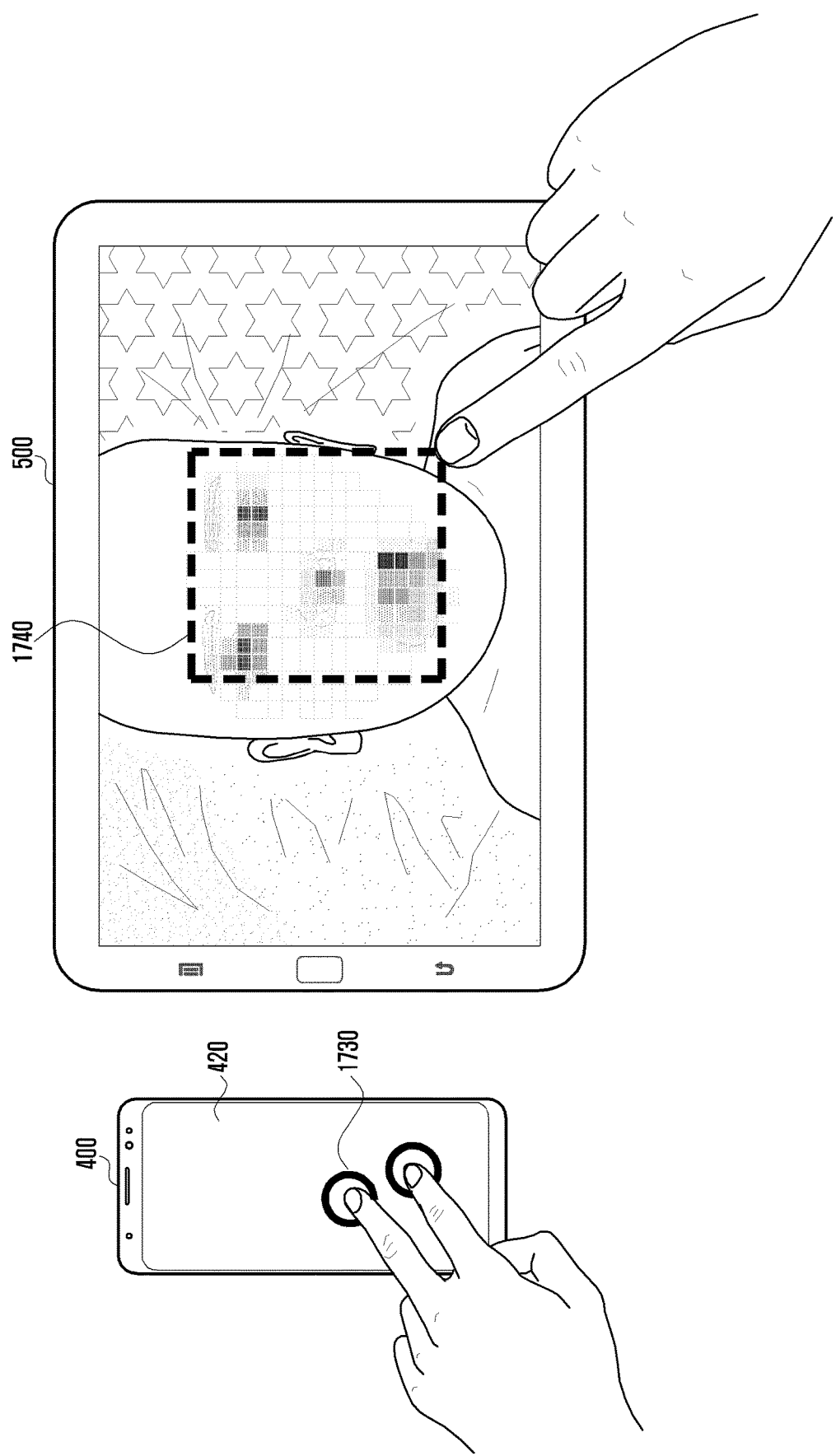

FIGS. 17A to 17C are diagrams illustrating another embodiment of an input mode using the first electronic device 400 according to various embodiments of the disclosure.

According to various embodiments of the disclosure, in the input mode using the first electronic device 400, the function may be continuously switched according to user input entered on the first electronic device 400.

With reference to FIG. 17A, while executing an image editing application, the second electronic device 500 may receive a user input for image editing.

According to various embodiments of the disclosure, the first electronic device 400 may receive state information of the second electronic device 500 (executing image editing application and performing image editing mode) from the second electronic device 500.

With reference to FIG. 17B, the first electronic device 400 may receive a user input 1710 on an arbitrary zone of the display 420 of the first electronic device 400 (e.g., one-finger touch on an arbitrary zone of the display 420).

According to various embodiments of the disclosure, the first electronic device 400 may determine a command for a function to be executed on the second electronic device 500 based on the state information of the second electronic device 500 received from the second electronic device 500 and the user input 1710, and may control the second electronic device 500 to execute the function corresponding to the determined command. The second electronic device 500 may execute a function corresponding to the determined command. The function corresponding to the determined command may be a function of mosaic processing on a region in which a user input is received. With reference to FIG. 17B, it can be seen that the region 1720 selected by the user has been mosaic processed.

With reference to FIG. 17C, the first electronic device 400 may receive a user input 1730 on an arbitrary zone of the display 420 of the first electronic device 400 (e.g., two-finger touch on an arbitrary zone of the display 420).

According to various embodiments of the disclosure, the first electronic device 400 may determine a command for a function to be executed on the second electronic device 500 based on the state information of the second electronic device 500 and the user input 1730, and may control the second electronic device 500 to execute the function corresponding to the determined command. The second electronic device 500 may execute a function corresponding to the determined command. The function corresponding to the determined command may be to execute a cutting function. With reference to FIG. 17C, it can be seen that a cutting function is being executed for the region 1740 selected by the user.

FIGS. 18A to 18D are diagrams illustrating another embodiment of an input mode using the first electronic device 400 according to various embodiments of the disclosure.

With reference to FIG. 18A, while executing a drawing application, the second electronic device 500 may receive a user input for performing drawing and display a result 1810 corresponding to the user input.

According to various embodiments of the disclosure, the first electronic device 400 may receive state information of the second electronic device 500 (executing drawing application and performing drawing input mode) from the second electronic device 500.

Figure 18B:
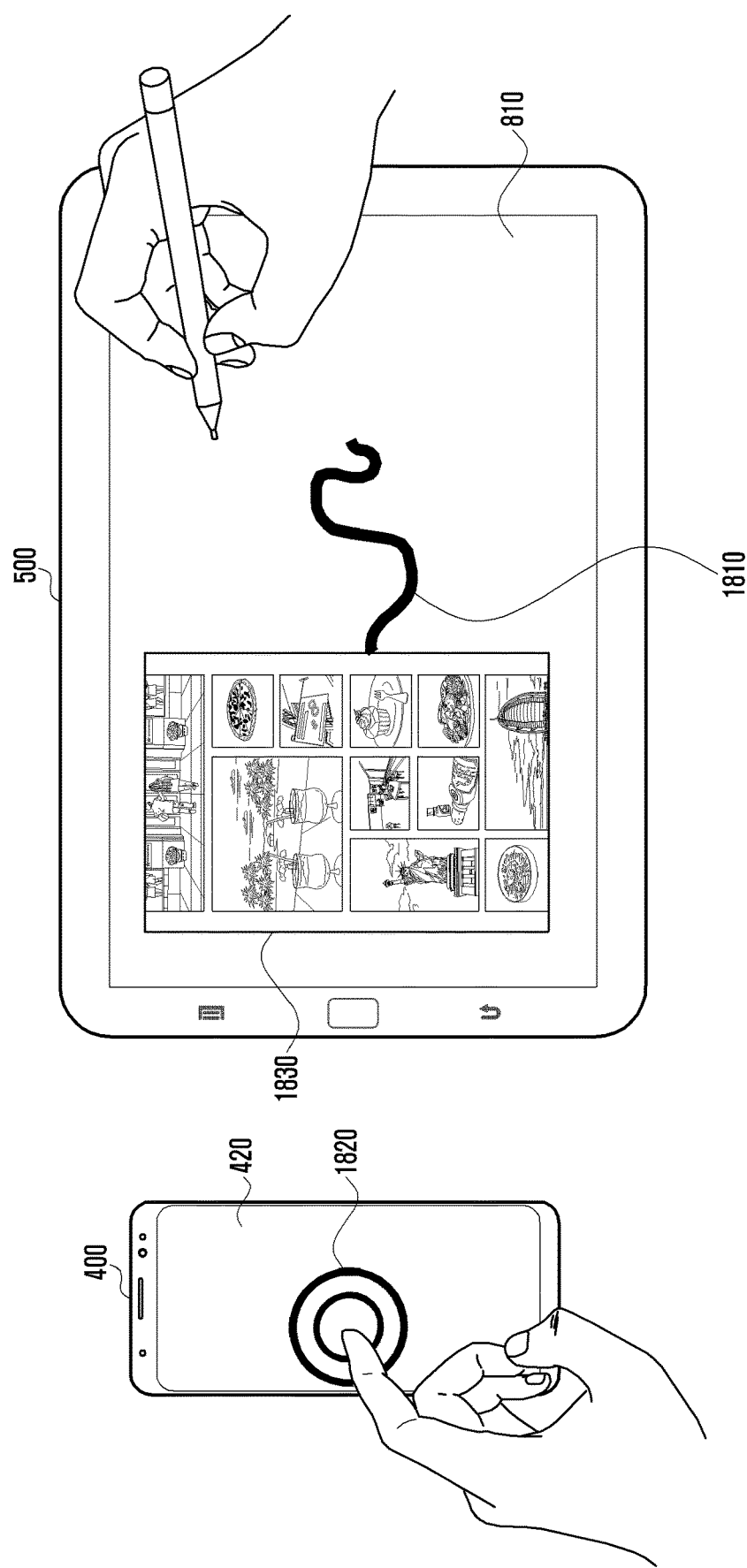

With reference to FIG. 18B, the first electronic device 400 may receive a user input 1820 on an arbitrary zone of the display 420 of the first electronic device 400 (e.g., double-tap touch on an arbitrary zone of the display 420).

According to various embodiments of the disclosure, the first electronic device 400 may determine a command for a function to be executed on the second electronic device 500 based on the state information of the second electronic device 500 received from the second electronic device 500 and the user input 1820, and may control the second electronic device 500 to execute the function corresponding to the determined command. The second electronic device 500 may execute a function corresponding to the determined command. The function corresponding to the determined command may be a function of adding a photograph to the first region 810. With reference to FIG. 18B, it can be seen that a list 1830 of photographs that can be added by the user to the first region 810 is displayed on the first region 810. The second electronic device 500 may receive a user input for selecting at least one photograph from among the photographs included in the list 1830. With reference to FIG. 18C, the second electronic device 500 may add a photograph 1840 selected by the user to the first region 810.

FIGS. 19A and 19B are diagrams illustrating another embodiment of an input mode using the first electronic device 400 according to various embodiments of the disclosure.

According to various embodiments of the disclosure, the first electronic device (e.g., first electronic device 400 in FIG. 3) may determine a command for controlling the second electronic device 500 in accordance with state information of the second electronic device 500 and a user input received by the first electronic device 400. The first electronic device 400 may control various electronic components of the first electronic device 400 to output a feedback indicating the function corresponding to a command. The feedback indicating a function may be output using the display, vibrations or sounds.

According to various embodiments of the disclosure, the first electronic device 400 may control the display 420 to display a feedback indicating a function corresponding to the determined command.

With reference to FIG. 19A, the first electronic device 400 may control the display 420 to display a feedback 1910 indicating the function corresponding to the determined command (e.g., adjusting the volume of the sound output on the second electronic device 500). The feedback 1910 may also be displayed on the second electronic device 500. With reference to FIG. 19A, the second electronic device 500 may control the display 520 to display the feedback 1910 indicating the function corresponding to the determined command (e.g., adjusting the volume of the sound output on the second electronic device 500).

According to various embodiments of the disclosure, the first electronic device 400 may control the sound output device (e.g., sound output device 155 in FIG. 1) or the haptic module (e.g., haptic module 179 in FIG. 1) to output a feedback indicating the function corresponding to the determined command.

With reference to FIG. 19B, the first electronic device 400 may determine a command corresponding to a user input 1930 and state information of the second electronic device 500 (e.g., a drawing application is running on the second electronic device 500), and may output a feedback indicating the function corresponding to the determined command (e.g., drawing a line with a second color changed from a first color) as a vibration or sound. The feedback may also be displayed on the second electronic device 500.

With reference to FIG. 19B, the second electronic device 500 may control the display 520 to display a feedback 1940 indicating the function corresponding to the determined command (e.g., drawing a line with a second color changed from a first color).

FIG. 20 is a diagram illustrating another embodiment of an input mode using the first electronic device 400.

According to various embodiments of the disclosure, the first electronic device 400 may receive a user input by using a plurality of sensors included in the first electronic device 400. The first electronic device 400 may determine a command for controlling the second electronic device 500 based on state information of the second electronic device 500 and a user input received using a plurality of sensors included in the first electronic device 400.

According to various embodiments of the disclosure, the first electronic device 400 may receive a user input collected by at least two sensors among a display (e.g., display 420 in FIG. 4), a pressure sensor (not shown), an acceleration sensor (not shown), and a gyro sensor (not shown).

With reference to FIG. 20, the first electronic device 400 may receive state information of the second electronic device (e.g., a video playback application is running on the second electronic device) from the second electronic device 500. The first electronic device 400 may receive a user input 2010 for rotating the first electronic device 400 while contact is being made with an arbitrary zone on the display 420.

According to various embodiments of the disclosure, the first electronic device 400 may determine a command for a function to be executed on the second electronic device 500 based on the state information of the second electronic device 500 and the user input 2010, and may control the second electronic device 500 to execute the function corresponding to the determined command. With reference to FIG. 20, the function corresponding to the determined command may refer to a function of adjusting the volume of sound output from the second electronic device 500. The first electronic device 400 may identify the direction of rotation of the first electronic device 400 and may control the volume of sound output from the second electronic device 500 based on the direction and degree of rotation. An electronic device according to various embodiments of the disclosure may include: a communication module to transmit and receive data to and from an external electronic device; a display; a memory to store commands for executing, on the external electronic device, functions mapped to state information of the external electronic device and user inputs; and a processor, wherein the processor may be configured to: control the communication module to be connected to the external electronic device; receive first state information of the external electronic device from the external electronic device; receive a first user input on an arbitrary zone of the display; determine a first command corresponding to the first state information and a characteristic of the first user input among the commands stored in the memory; and control the external electronic device to execute a function corresponding to the first command.

In the electronic device according to various embodiments of the disclosure, the first state information of the external electronic device may include information indicating an application running on the external electronic device or information indicating a function executed in the application.

In the electronic device according to various embodiments of the disclosure, the processor may be configured to: receive second state information different from the first state information; receive a second user input identical to the first user input; determine a second command different from the first command based on the second state information and the second user input; and control the external electronic device to execute a function corresponding to the determined second command.

In the electronic device according to various embodiments of the disclosure, the processor may be configured to output a feedback indicating the function corresponding to the determined first command on the electronic device or the external electronic device.

In the electronic device according to various embodiments of the disclosure, the processor may control the display to display a first region for receiving the first user input and a second region including at least one object indicating a function executable on the external electronic device, and the first user input may include a touch input for an arbitrary zone on the first region.

In the electronic device according to various embodiments of the disclosure, the processor may be configured to identify a function executable on the external electronic device based on the first state information of the external electronic device.

In the electronic device according to various embodiments of the disclosure, in response to an update of the state information of the external electronic device, the processor may be configured to identify a function executable on the external electronic device based on the updated state information.

In the electronic device according to various embodiments of the disclosure, the first user input may be set to be detected by the display or an acceleration sensor included in the electronic device.

In the electronic device according to various embodiments of the disclosure, the processor may be configured to: control the external electronic device to maintain execution of the function corresponding to the first command in response to confirming that the first user input is maintained; and control the external electronic device to execute a function that has been executed before the function corresponding to the first command in response to confirming that the first user input is ended.

In the electronic device according to various embodiments of the disclosure, in response to receiving a third user input for changing the function corresponding to the first user input and receiving a fourth user input identical to the first user input, the processor may be configured to control the external electronic device to execute a function corresponding to a third command different from the first command.

An electronic device according to various embodiments of the disclosure may include: a communication module to transmit and receive data to and from an external electronic device; a display; and a processor, wherein the processor may be configured to: control the communication module to be connected to the external electronic device; transmit state information of the electronic device to the external electronic device; receive a first command corresponding to the state information of the electronic device and a characteristic of a user input received by the external electronic device from the external electronic device; and execute a function corresponding to the first command.

In the electronic device according to various embodiments of the disclosure, the state information of the electronic device may include information indicating an application running on the electronic device or information indicating a function executed in the application.

In the electronic device according to various embodiments of the disclosure, the processor may be configured to transmit the updated state information to the external electronic device when the function executed in the application is changed.

In the electronic device according to various embodiments of the disclosure, the processor may output an object indicating the function corresponding to the first command.

Figure 21:
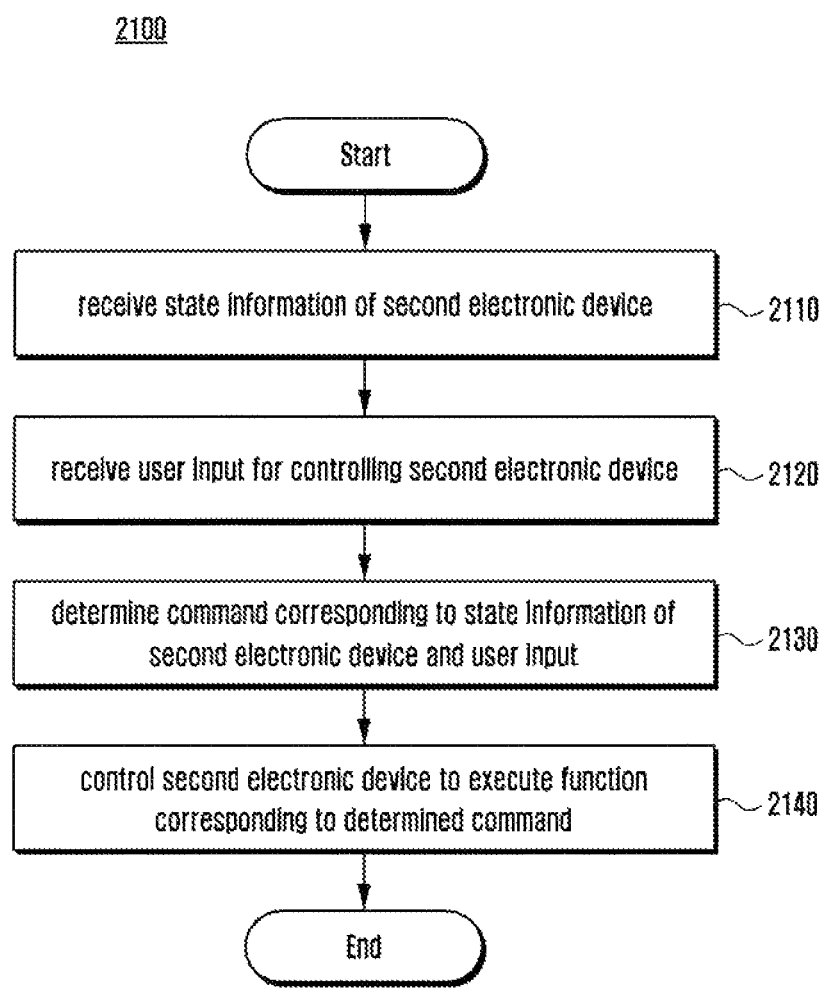
FIG. 21 is a diagram illustrating an operation method of the first electronic device according to various embodiments of the disclosure.

FIG. 21 is a diagram illustrating an operation method 2100 of the first electronic device according to various embodiments of the disclosure.

According to various embodiments of the disclosure, at operation 2110, the first electronic device (e.g., first electronic device 400 in FIG. 3) may receive state information of the second electronic device (e.g., second electronic device 500 in FIG. 3). The state information of the second electronic device 500 may include information indicating an application running on the second electronic device 500 or information indicating a function executed in the application. When an application is executed or when a function executed in a running application is changed, the second electronic device 500 may transmit state information of the second electronic device 500 to the first electronic device 400.

According to various embodiments of the disclosure, at operation 2120, the first electronic device 400 may receive a user input for controlling the second electronic device 500.

According to various embodiments of the disclosure, the user input may be a user input for controlling an application running on the second electronic device 500 or a function that can be used in the running application (e.g., execution of a function or change of a function).

According to various embodiments of the disclosure, the first user input may indicate a user input for an arbitrary zone on the display (e.g., display 420 in FIG. 4). The arbitrary zone on the display 420 may indicate a region that is not specified in advance. According to various embodiments of the disclosure, the first electronic device 400 may receive a user input for an unspecified arbitrary zone on the display 420. As the user can perform an input for an unspecified arbitrary zone on the display 420, the phenomenon in which the user's gaze is shifted from the first region where the user input is entered (e.g., first region 810 in FIG. 8) to the second region including at least one object for executing a desired function (e.g., second region 820 in FIG. 8) can be prevented, which can increase the work efficiency of the user.

According to various embodiments of the disclosure, the user input may be sensed by various components of the first electronic device 400. For example, the display 420 of the first electronic device 400 may detect a user input entered on the display 420. As another example, among various sensors included in the first electronic device 400 (e.g., sensor module 176 in FIG. 1), the proximity sensor, the gyro sensor, or the acceleration sensor may sense a user input for changing the posture of the first electronic device 400.

According to various embodiments of the disclosure, at operation 2130, the first electronic device 400 may determine a command corresponding to the state information of the second electronic device 500 and the user input. The command may indicate a command for controlling an application running on the second electronic device 500 or a function that can be used in the running application.

According to various embodiments of the disclosure, at operation 2140, the first electronic device 400 may control the second electronic device 500 to execute a function corresponding to the determined command. The second electronic device 500 may execute a function corresponding to the command determined by the first electronic device 400.

An operation method of an electronic device according to various embodiments of the disclosure may include: connecting to an external electronic device; receiving first state information of the external electronic device from the external electronic device; receiving a first user input for an arbitrary zone on a display; determining a first command corresponding to the first state information and a characteristic of the first user input from among commands stored in a memory that stores commands for executing, on the external electronic device, functions mapped to state information of the external electronic device and user inputs; and controlling the external electronic device to execute a function corresponding to the first command.

In the operation method of the electronic device according to various embodiments of the disclosure, the first state information of the external electronic device may include information indicating an application running on the external electronic device or information indicating a function executed in the application.

The operation method of the electronic device according to various embodiments of the disclosure may further include: receiving second state information different from the first state information; receiving a second user input identical to the first user input; determining a second command different from the first command based on the second state information and the second user input; and controlling the external electronic device to execute a function corresponding to the determined second command.

The operation method of the electronic device according to various embodiments of the disclosure may further include outputting a feedback indicating the function corresponding to the determined first command on the electronic device or the external electronic device.

The operation method of the electronic device according to various embodiments of the disclosure may further include controlling the display to display a first region for receiving the first user input and a second region including at least one object indicating a function executable on the external electronic device, and the first user input may be a touch input for an arbitrary portion on the first region.

The operation method of the electronic device according to various embodiments of the disclosure may further include: controlling the external electronic device to maintain execution of the function corresponding to the first command in response to confirming that the first user input is maintained; and controlling the external electronic device to execute a function that has been executed before the function corresponding to the first command in response to confirming that the first user input is ended.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a communication module to transmit and receive data to and from an external electronic device;
   a display;
   a memory to store commands for executing, on the external electronic device, functions mapped to state information of the external electronic device and user inputs; and
   a processor,
   wherein the processor is configured to:
   control the communication module to communicatively connect to the external electronic device;
   receive first state information of the external electronic device from the external electronic device, the first state information of the external electronic device including information indicating an application running on the external electronic device or information indicating a function executed in the application;
   receive a first user input on an arbitrary zone of the display;
   determine a first command based on the first state information and a characteristic of the first user input;
   control the external electronic device to execute a function corresponding to the first command;
   receive second state information of the external electronic device, the second state information including information indicating an different application running on the external electronic device or information indicating a different function;
   receive a second user input identical to the first user input;
   determine a second command different from the first command based on the second state information and the second user input; and
   control the external electronic device to execute a function corresponding to the second command.

2. The electronic device of claim 1, wherein the processor is configured to output a feedback indicating the function corresponding to the determined first command on the electronic device or the external electronic device.

3. The electronic device of claim 1, wherein:
the processor is configured to control the display to display a first region for receiving the first user input and a second region including at least one object indicating a function executable on the external electronic device; and
wherein the first user input includes a touch input for an arbitrary zone on the first region.

4. The electronic device of claim 1, wherein the processor is configured to identify a function executable on the external electronic device based on the first state information of the external electronic device.

5. The electronic device of claim 1, wherein in response to an update of the state information of the external electronic device, the processor is configured to identify a function executable on the external electronic device based on the updated state information.

6. The electronic device of claim 1, wherein the first user input is set to be detected by the display or an acceleration sensor included in the electronic device.

7. The electronic device of claim 1, wherein the processor is configured to:
control the external electronic device to maintain execution of the function corresponding to the first command in response to confirming that the first user input is maintained; and
control the external electronic device to execute a function that has been executed before the function corresponding to the first command in response to confirming that the first user input is ended.

8. The electronic device of claim 1, wherein in response to receiving a third user input for changing the function corresponding to the first user input and receiving a fourth user input identical to the first user input, the processor is configured to control the external electronic device to execute a function corresponding to a third command different from the first command.

9. An electronic device, comprising:
a communication module to transmit and receive data to and from an external electronic device;
a display; and
a processor,
wherein the processor is configured to:
control the communication module to communicatively connected to the external electronic device;
transmit first state information of the electronic device to the external electronic device, the first state information of the electronic device including information indicating an application running on the electronic device or information indicating a function executed in the application;
receive a first command corresponding to the first state information of the electronic device and a characteristic of a first user input received by the external electronic device from the external electronic device;
execute a function corresponding to the first command;
transmit the second state information of the electronic device to the external electronic device, the second state information, the second state information of the electronic device including information indicating a different application running on the electronic device or information indicating a different function executed in the application;
receive a second command different from the first command corresponding to the second state information of the electronic device and a characteristic of a second user input received by the external electronic device, the second user input being identical to the first user input; and
execute a function corresponding to the second command.

10. The electronic device of claim 9, wherein the processor is configured to output an object indicating the function corresponding to the first command.

11. An operation method of an electronic device, the operation method comprising:
communicatively connecting to an external electronic device;
receiving first state information of the external electronic device from the external electronic device, the first state information of the external electronic device including information indicating an application running on the external electronic device or information indicating a function executed in the application;
receiving a first user input for an arbitrary zone on a display;
determining a first command corresponding to the first state information and a characteristic of the first user input from among commands stored in a memory that stores commands for executing, on the external electronic device, functions mapped to state information of the external electronic device and user inputs;
controlling the external electronic device to execute a function corresponding to the first command;
receiving second state information of the external electronic device, the second state information including information indicating an different application running on the external electronic device or information indicating a different function;
receiving a second user input identical to the first user input
determining a second command different from the first command based on the second state information and the second user input; and
controlling the external electronic device to execute a function corresponding to the second command.

* * * * *